May 17, 1966  R. G. HOLMAN  3,251,722
METHOD OF AUTOMATICALLY APPLYING A VARIABLE THICKNESS
ELASTOMERIC LAYER ON PNEUMATIC TIRE CASINGS
Filed May 1, 1962  23 Sheets-Sheet 2

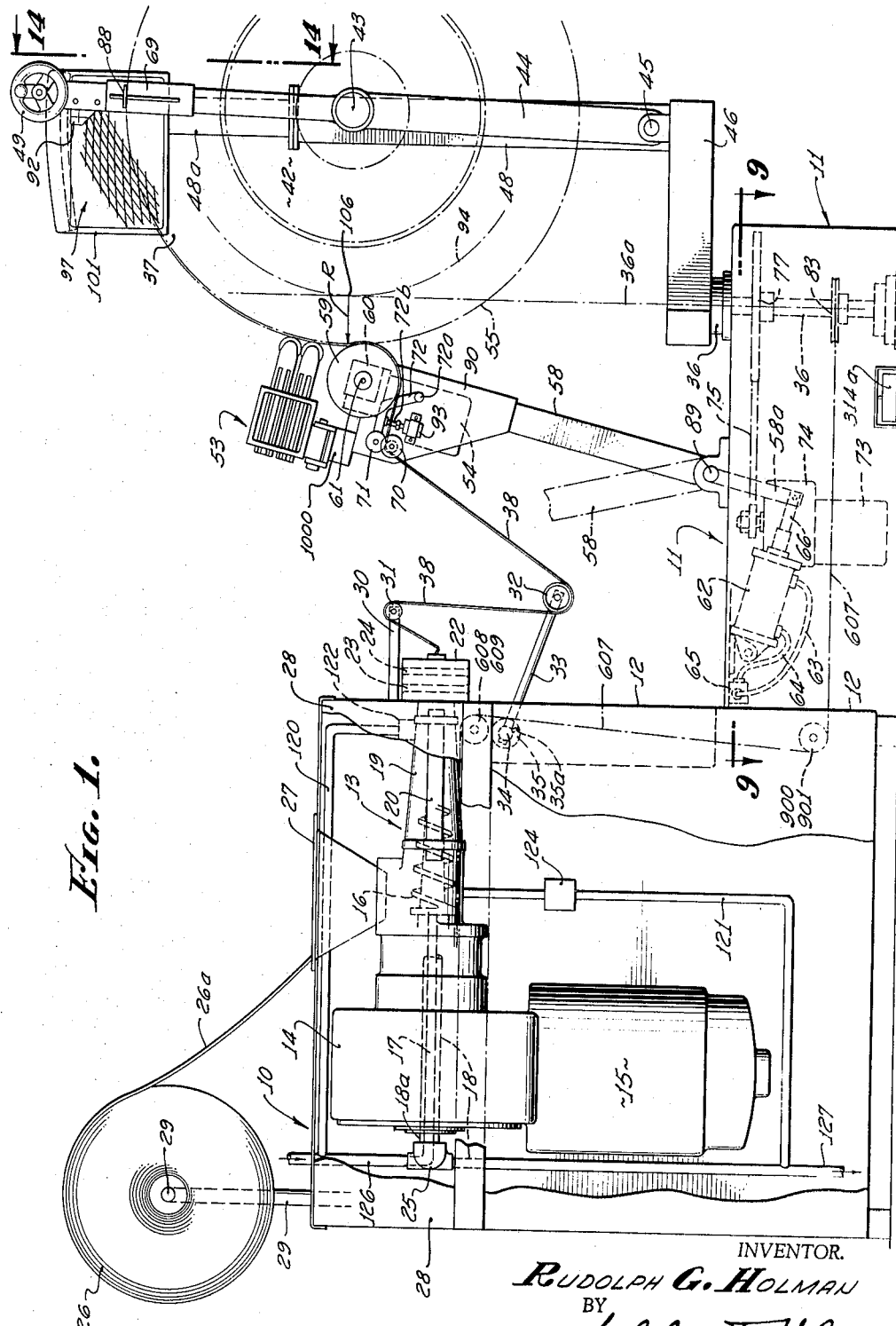

INVENTOR
RUDOLPH G. HOLMAN
BY
Nicholas T Volk
HIS Attorney.

May 17, 1966  R. G. HOLMAN  3,251,722
METHOD OF AUTOMATICALLY APPLYING A VARIABLE THICKNESS
ELASTOMERIC LAYER ON PNEUMATIC TIRE CASINGS
Filed May 1, 1962  23 Sheets-Sheet 3

INVENTOR.
RUDOLPH G. HOLMAN
BY
Nicholas T Volk
HIS ATTORNEY.

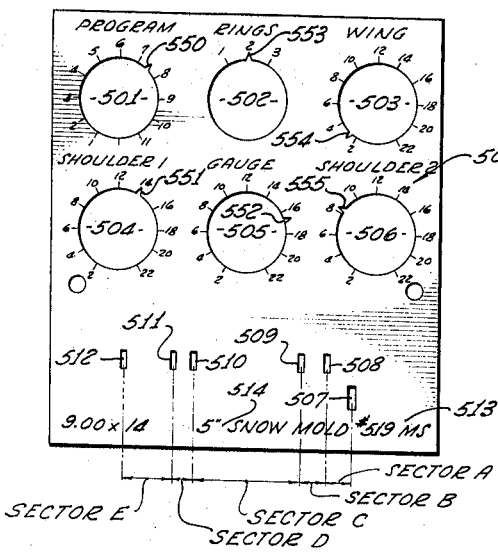
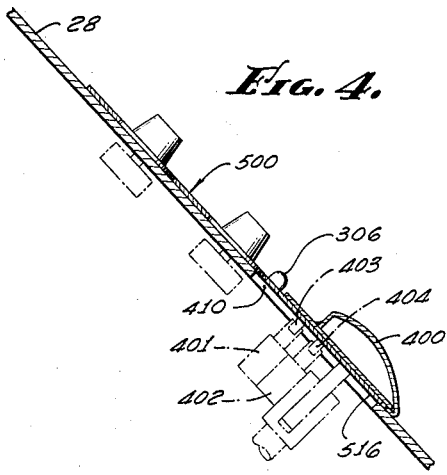
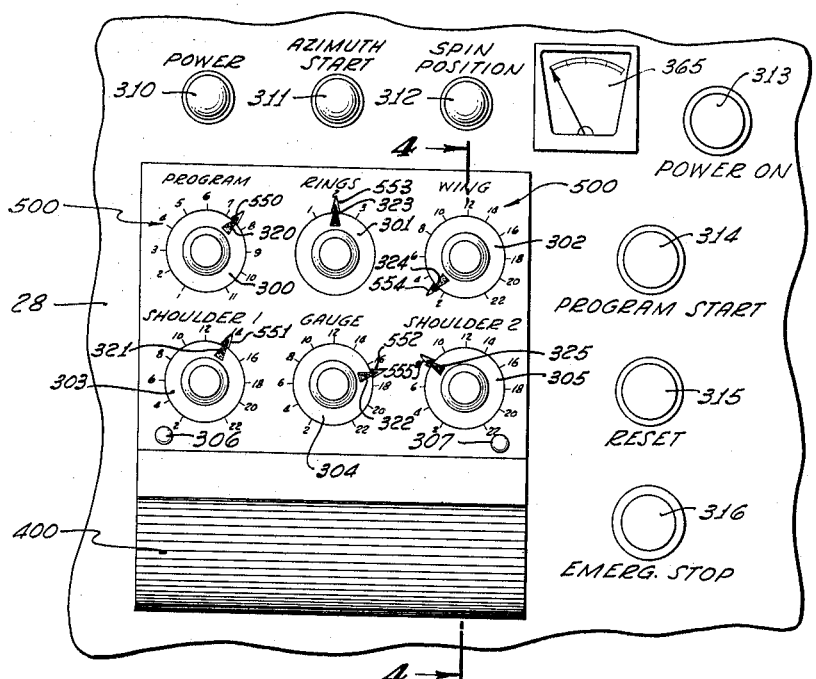

May 17, 1966

R. G. HOLMAN 3,251,722

METHOD OF AUTOMATICALLY APPLYING A VARIABLE THICKNESS
ELASTOMERIC LAYER ON PNEUMATIC TIRE CASINGS

Filed May 1, 1962

INVENTOR.
RUDOLPH G. HOLMAN
BY Nicholas T Vohr
HIS ATTORNEY.

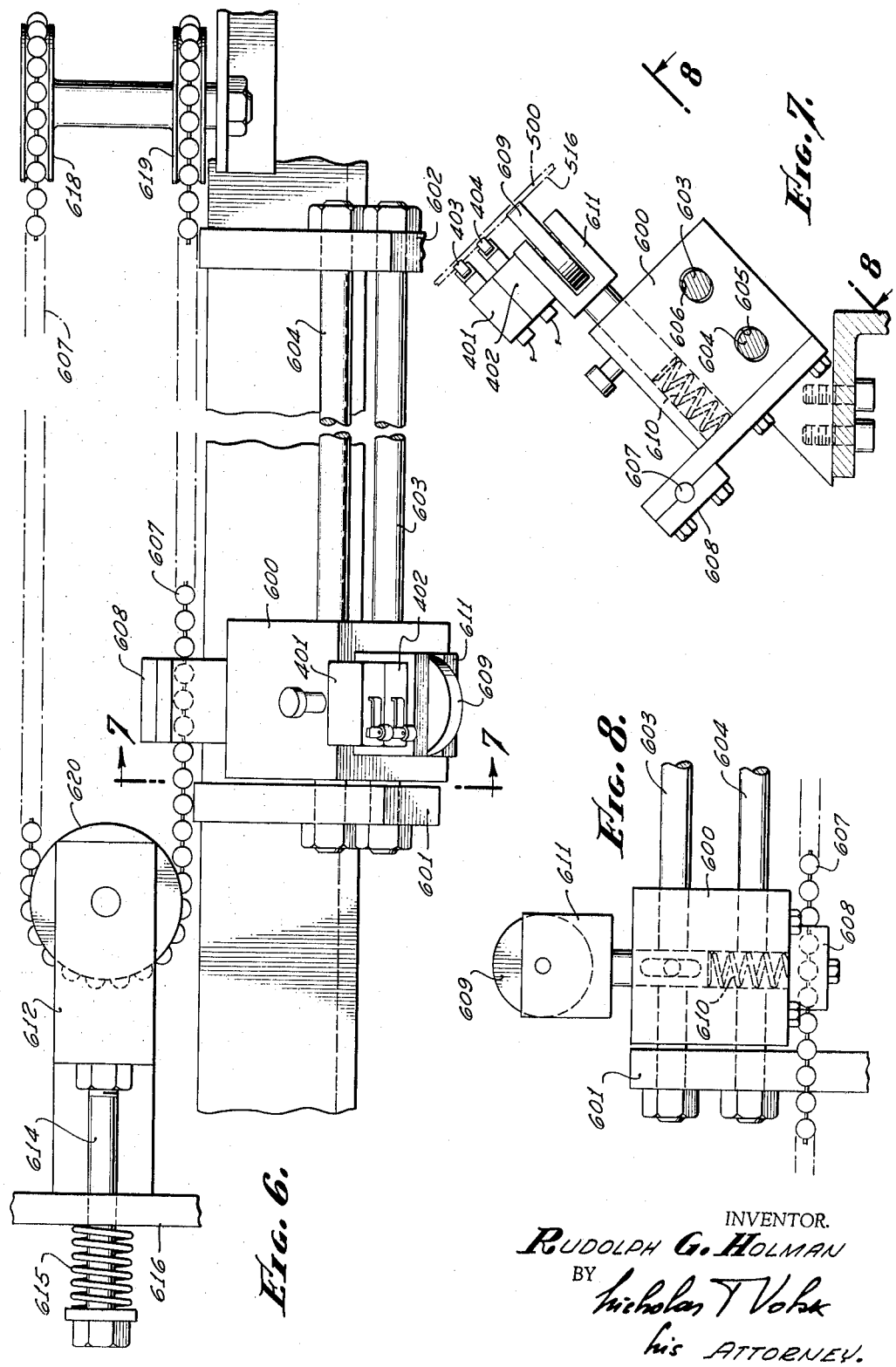

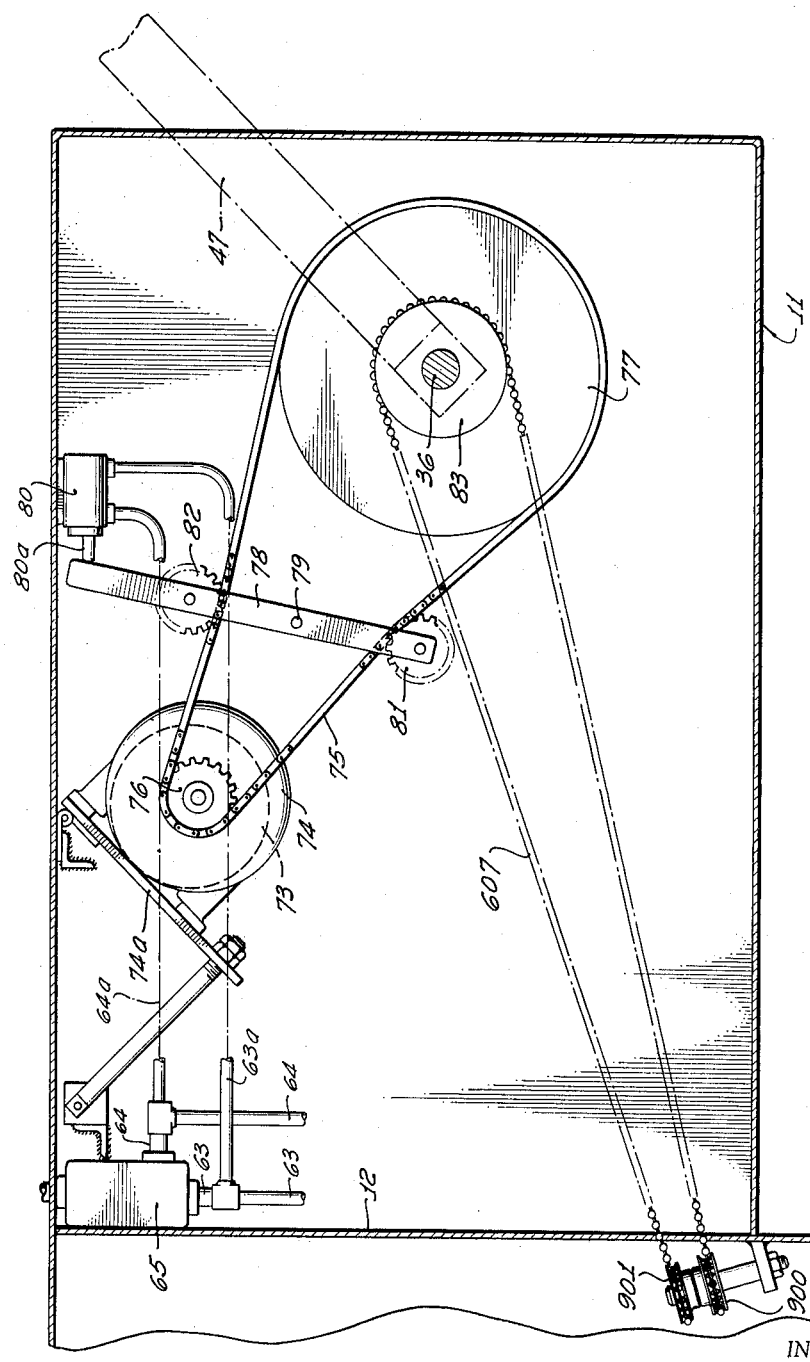

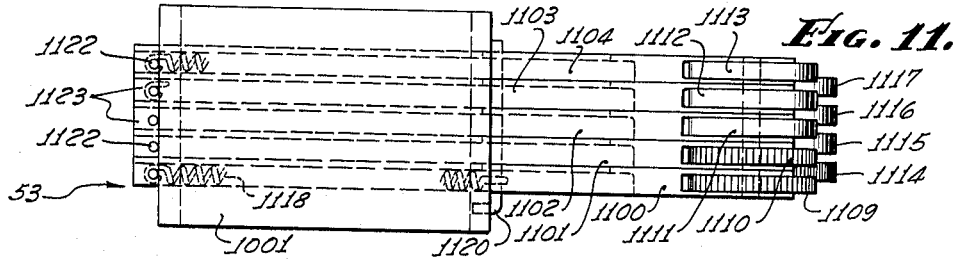
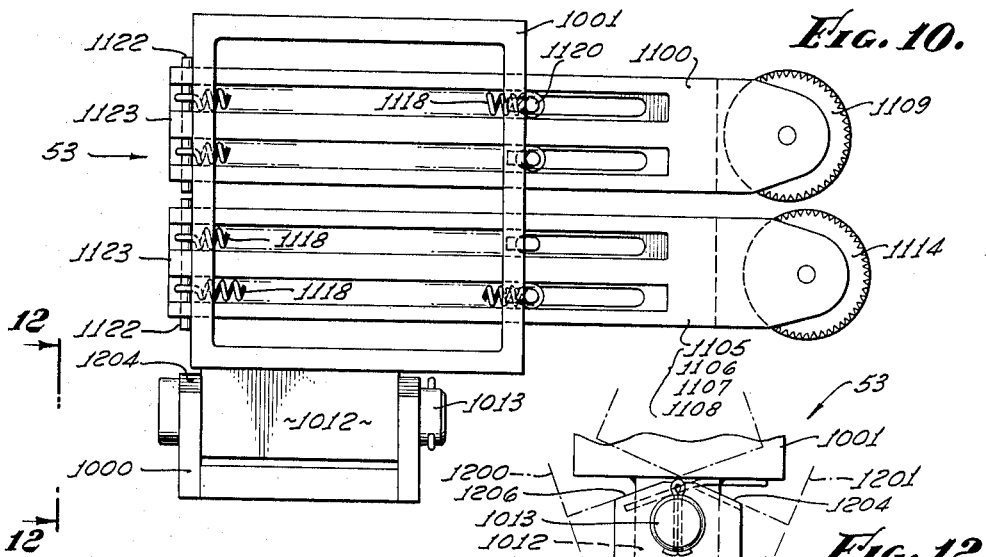
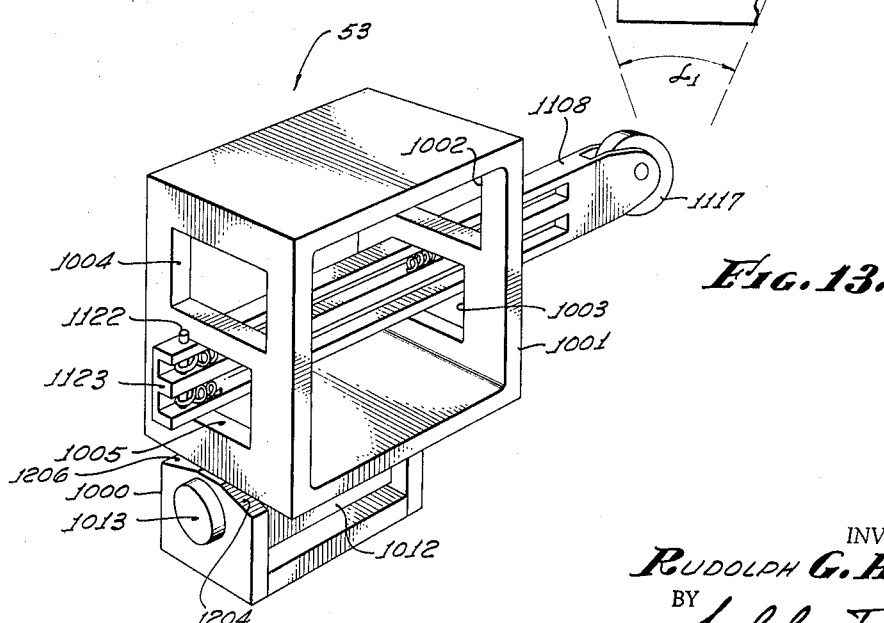

INVENTOR.
RUDOLPH G. HOLMAN

May 17, 1966 R. G. HOLMAN 3,251,722
METHOD OF AUTOMATICALLY APPLYING A VARIABLE THICKNESS
ELASTOMERIC LAYER ON PNEUMATIC TIRE CASINGS
Filed May 1, 1962 23 Sheets-Sheet 10
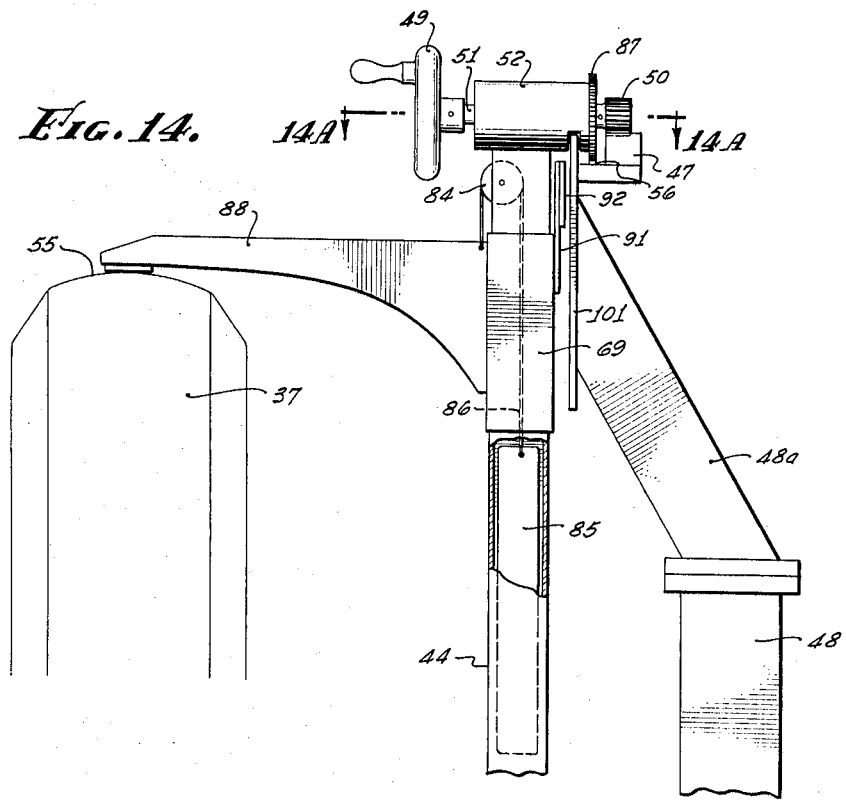
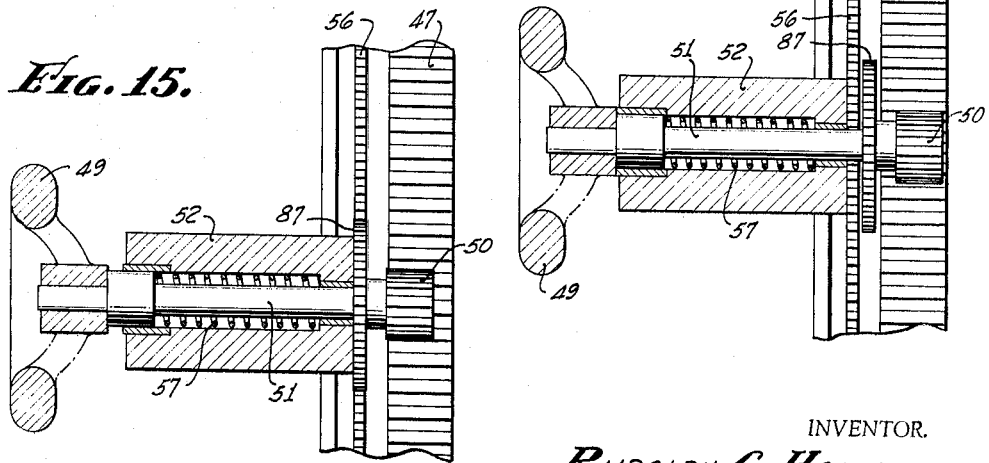
INVENTOR.
Rudolph G. Holman
BY
Nicholas T Voku
HIS ATTORNEY.

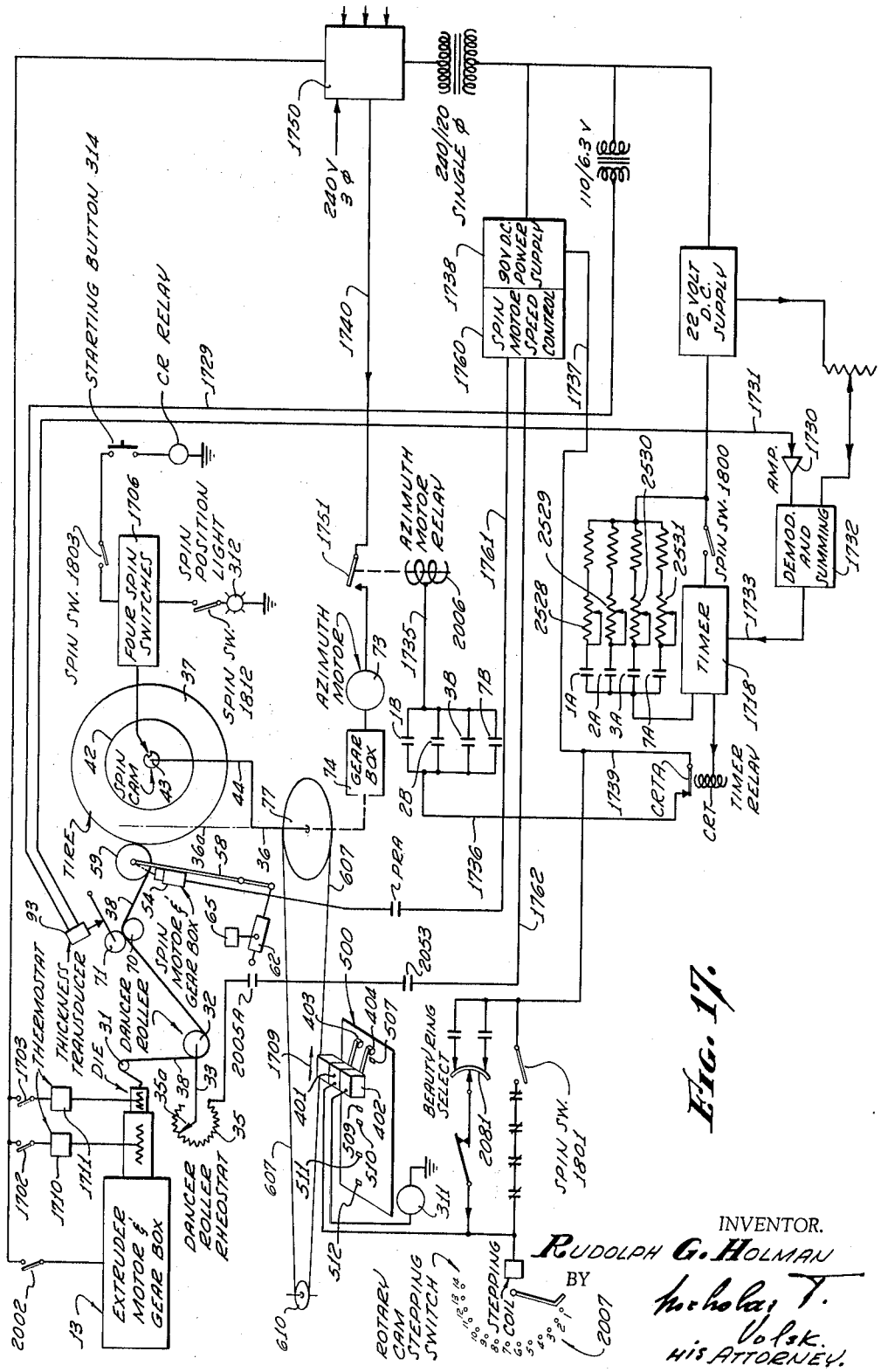

May 17, 1966
R. G. HOLMAN
3,251,722
METHOD OF AUTOMATICALLY APPLYING A VARIABLE THICKNESS
ELASTOMERIC LAYER ON PNEUMATIC TIRE CASINGS
Filed May 1, 1962
23 Sheets-Sheet 12
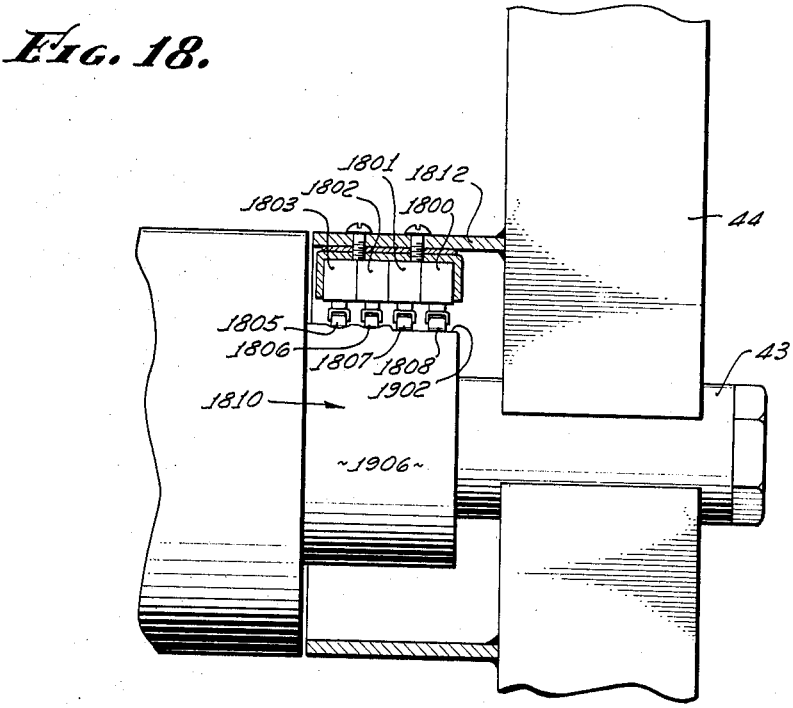
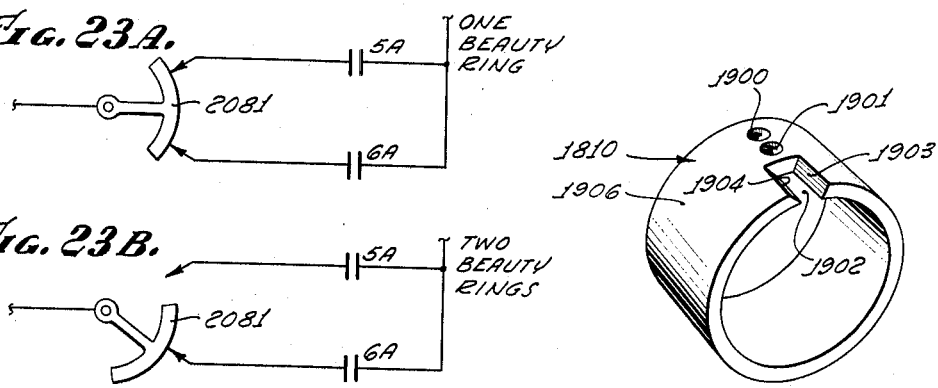
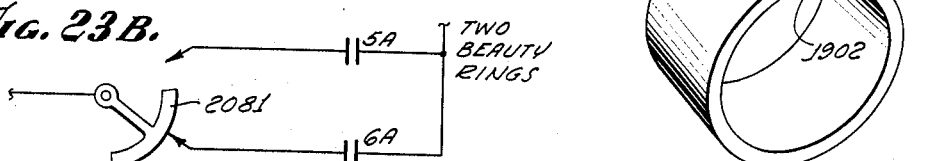
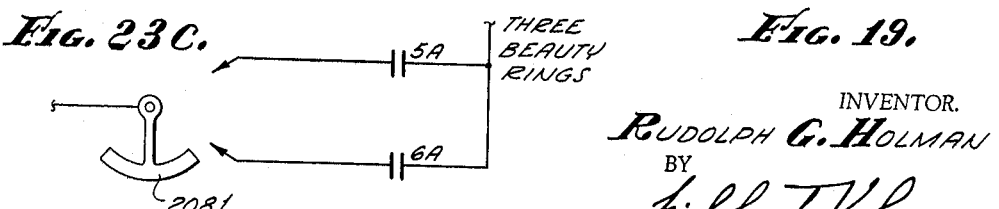
INVENTOR.
RUDOLPH G. HOLMAN
BY
Nicholas T Vukan
HIS ATTORNEY.

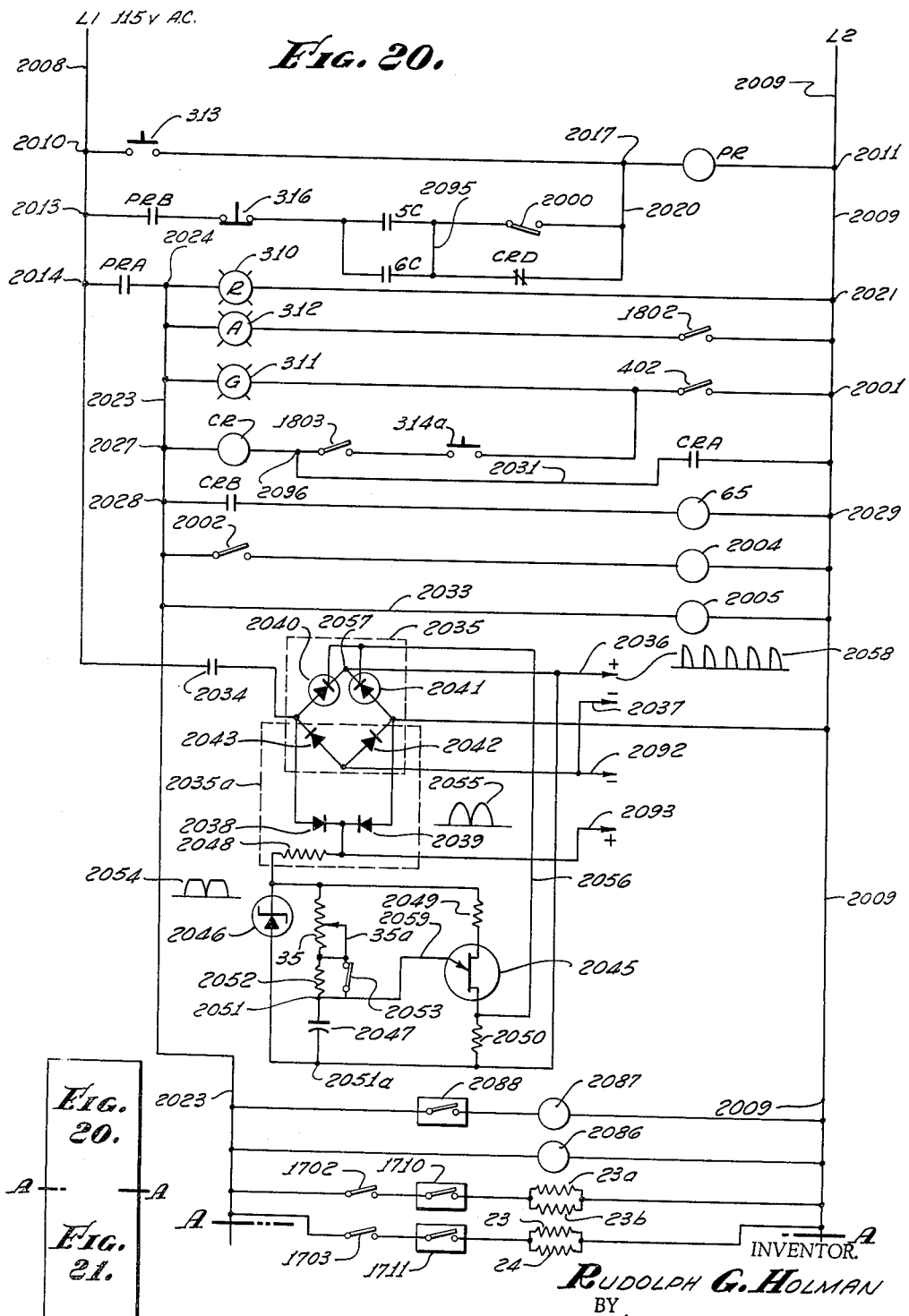

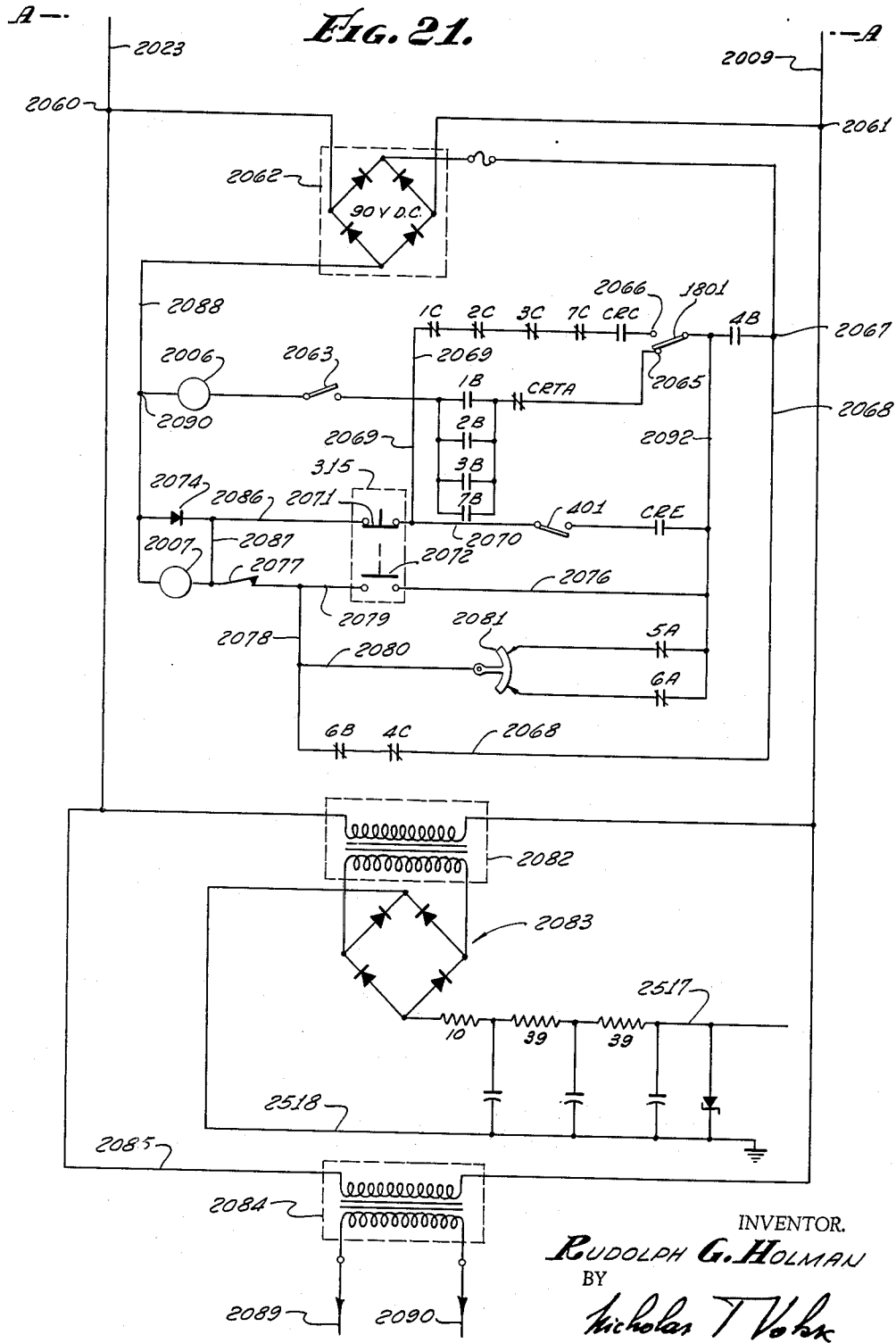

INVENTOR.
RUDOLPH G. HOLMAN
BY Nicholas T Vohr
HIS ATTORNEY.

May 17, 1966    R. G. HOLMAN    3,251,722
METHOD OF AUTOMATICALLY APPLYING A VARIABLE THICKNESS
ELASTOMERIC LAYER ON PNEUMATIC TIRE CASINGS
Filed May 1, 1962    23 Sheets-Sheet 16

INVENTOR.
Rudolph G. Holman
BY
Nicholas T. Vohr
HIS ATTORNEY.

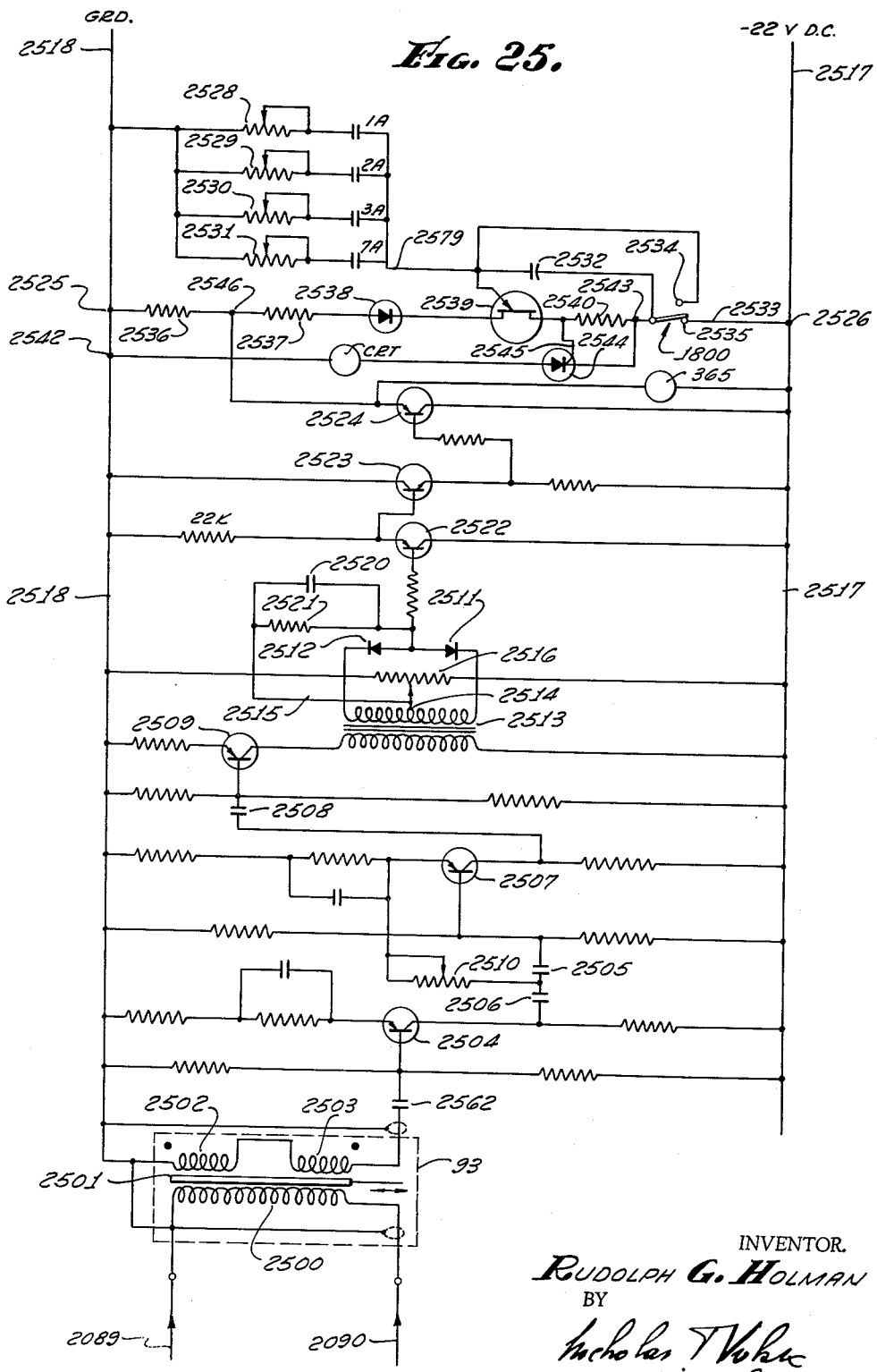

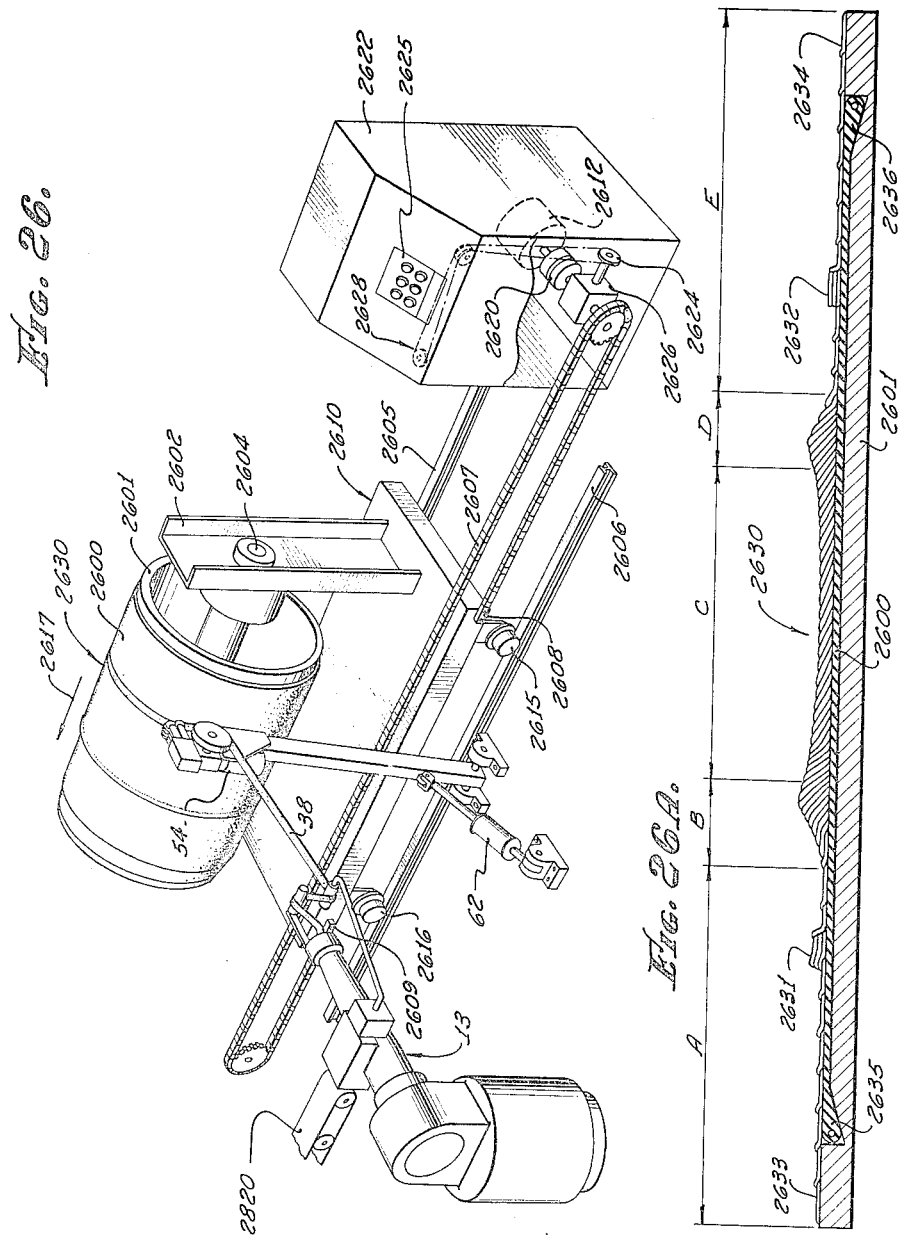

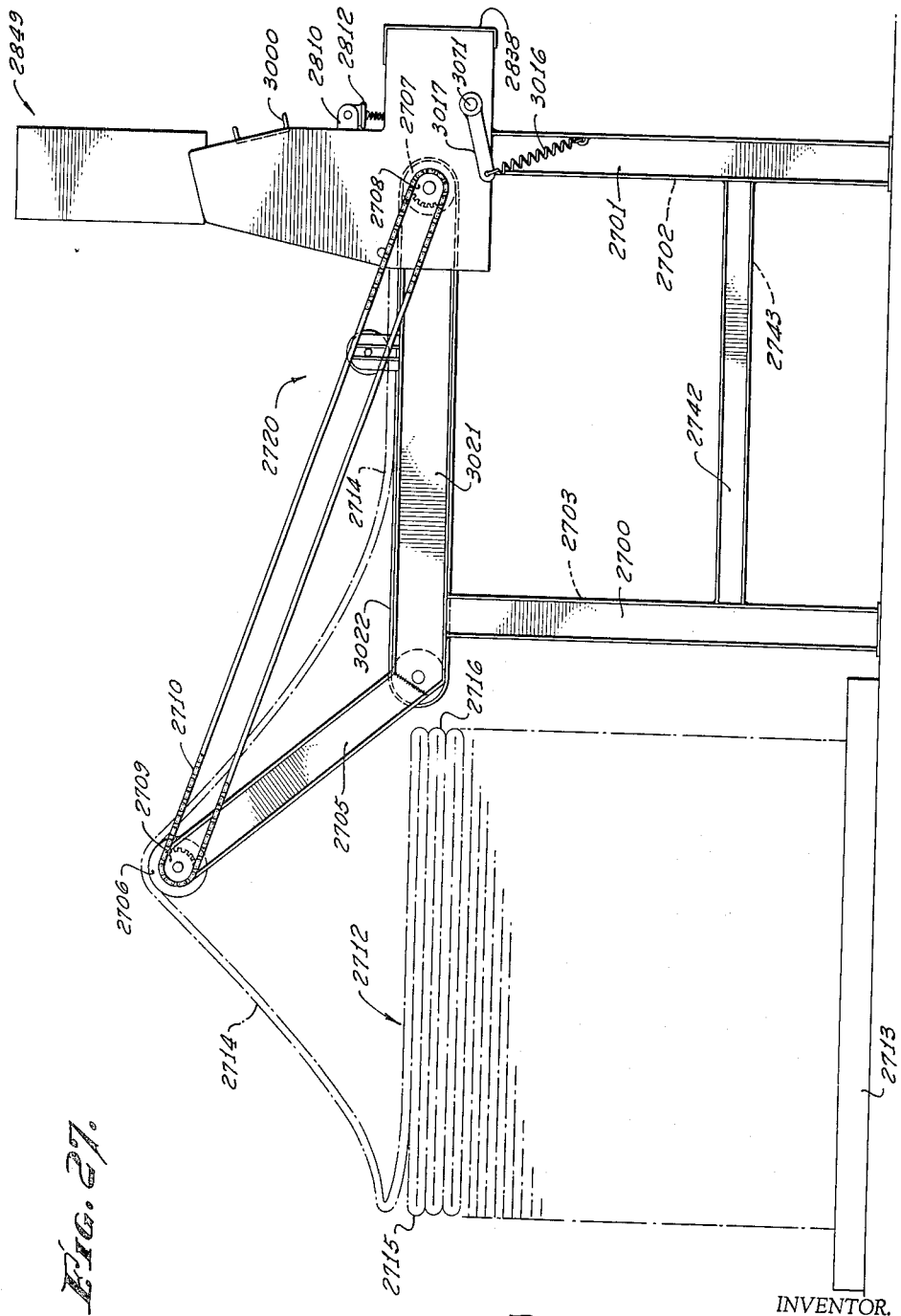

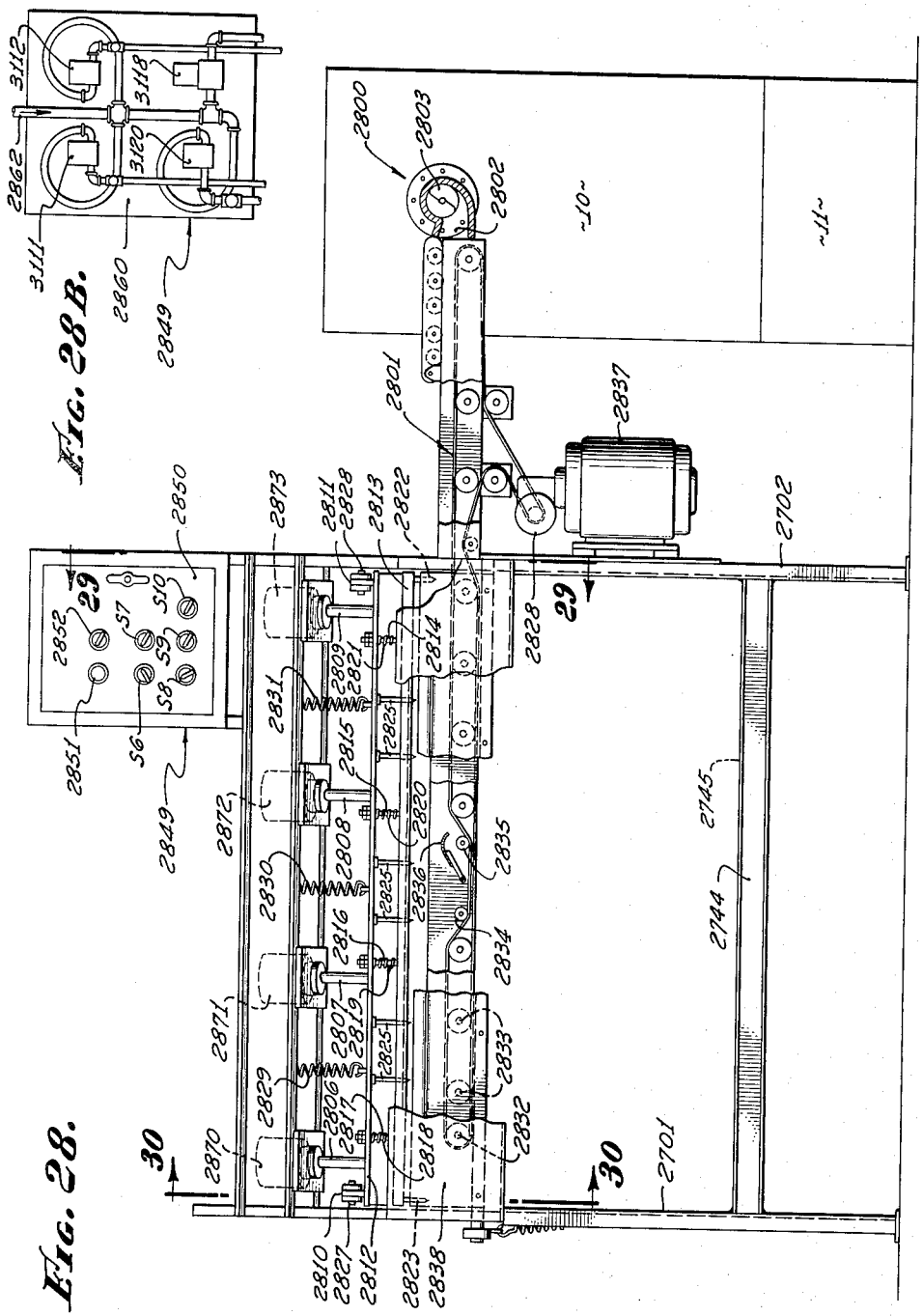

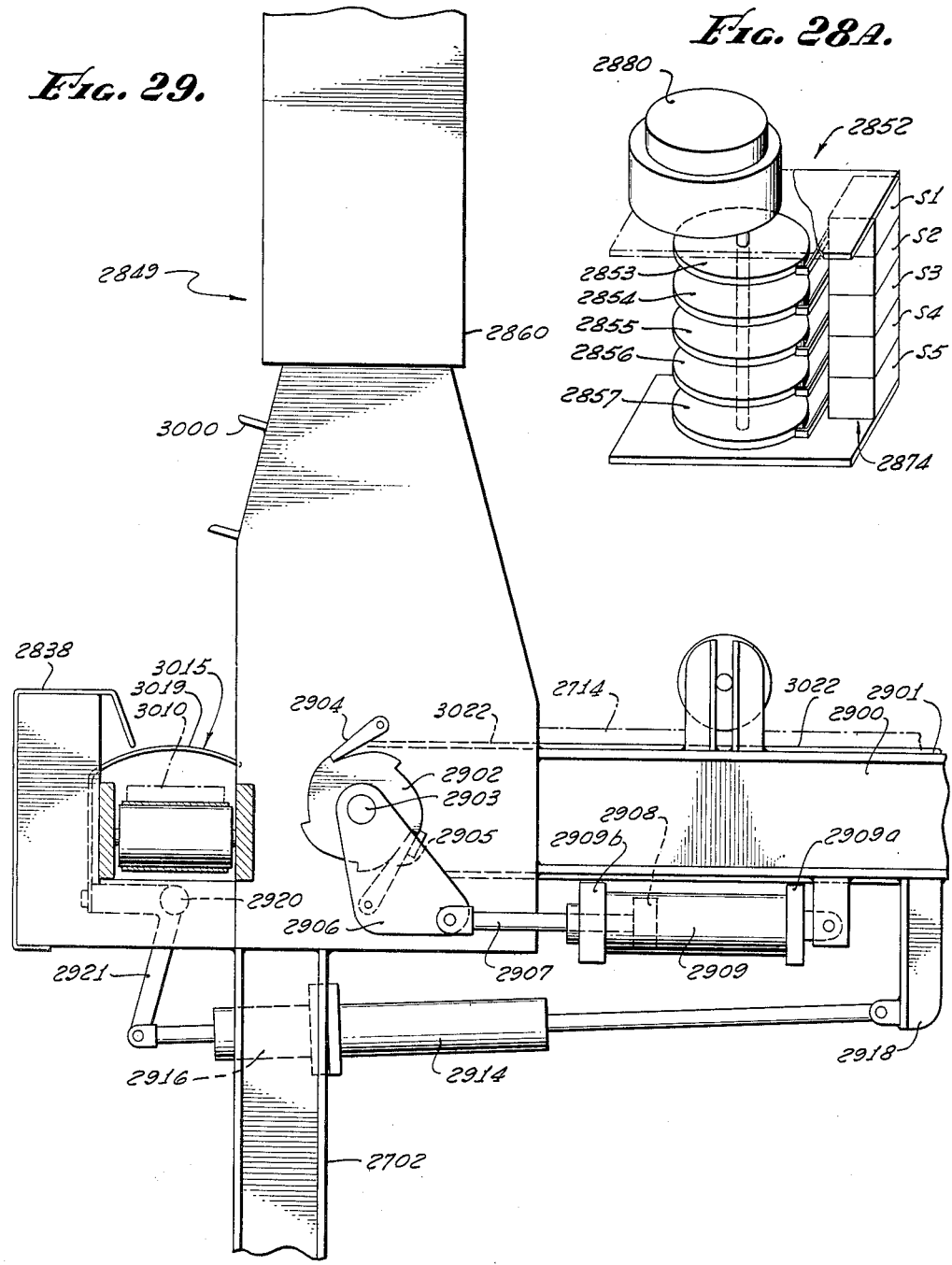

INVENTOR.
Rudolph G. Holman
BY
Nicholas T Vohr
HIS ATTORNEY.

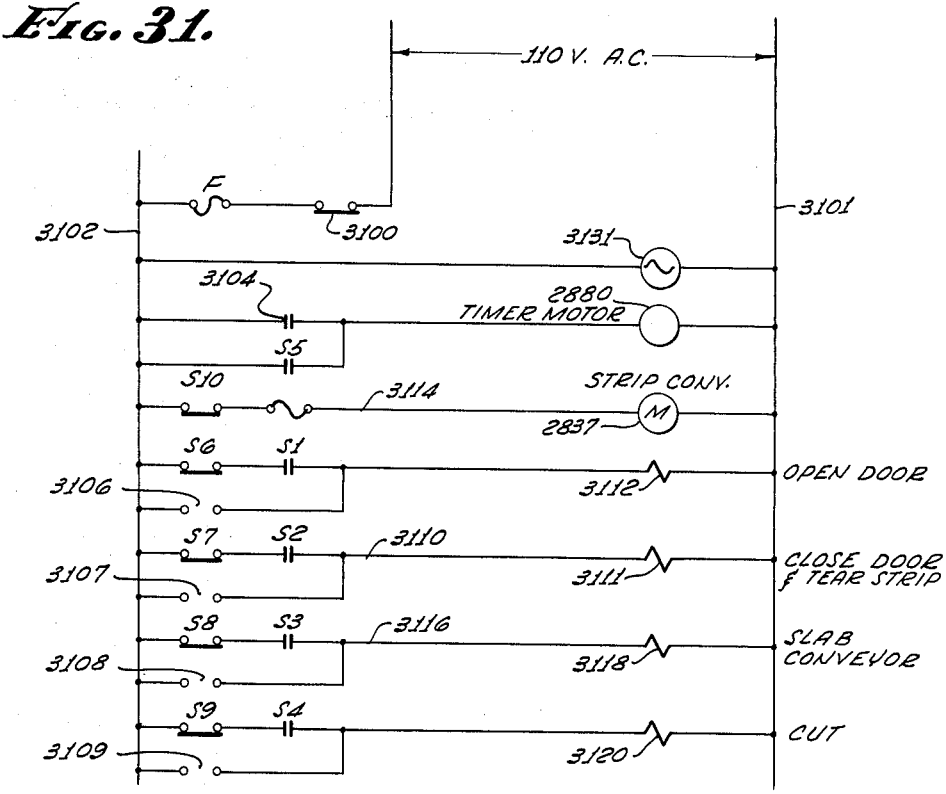

United States Patent Office 3,251,722
Patented May 17, 1966

3,251,722
METHOD OF AUTOMATICALLY APPLYING A VARIABLE THICKNESS ELASTOMERIC LAYER ON PNEUMATIC TIRE CASINGS
Rudolph G. Holman, Santa Ana, Calif., assignor to W. J. Voit Rubber Corp., a corporation of California
Filed May 1, 1962, Ser. No. 196,542
4 Claims. (Cl. 156—130)

This invention relates to machines and methods for winding an elastomeric material on a casing of a pneumatic vehicular tire in the course of its original manufacture, or for retreading used pneumatic tires.

The invention will be described in connection with the retreading of used tires first, and it then will be followed with the description of applying elastomeric material to a casing of a new tire in the course of its original manufacture.

At the present time, it is necessary for a retreader to carry a large stock of tread rubber, or continuously order special different sizes from a near-by supplier, if such is available, which would be suitable for different sizes of tires and matrices. Since there is a very large number of tire sizes, and even one given tire may require a different size tread rubber, depending upon the nature of retreading specified by the customer, it becomes necessary for a tire retread shop to carry a large amount of tread rubber, or depend on prompt deliveries from a local supplier. This poses a large number of problems: First, it is difficult for a small retread shop to carry a very large amount of stock, and further, the shelf life of uncured rubber is limited. Also, local suppliers are available only in very few industrial centers and even then, they cannot be expected to supply such small retail orders at a moment's notice. There are many additional disadvantages relating to the present day retreading methods, such as relatively high cost of tread rubber per pound because of required special extrusions, then mounting of the extruded rubber on polyethylene backing with an expensive soft rubber tacking layer under the tread rubber, packing of individual pieces of tread rubber in shipping boxes, and, insofar as the end product is concerned, there is the unavoidable splice produced at the matching of the two ends at the completion of one turn, and resulting unbalance of the tire. There is also an ever present danger of having air pockets between the casing and the tread rubber, etc.

According to this invention, a relatively thin ribbon of natural or synthetic rubber, or a combination of the two, or other elastomeric material, produced by a local extruder, which constitutes a part of the machine, is wound at a predetermined and controllable rate on the pneumatic tire casing which has been previously properly buffed. At the beginning of the automatic winding process, the free end of the locally extruded, hot, tacky and very pliable ribbon, which has a temperature between 150° F. and 200° F. upon its extrusion, is manually secured by adhesion to a sidewall of the casing, which is the only manual step in the process. From then on the winding is continued under the control of an electronic programmer until a predictable variable thickness layer of uncured elastomer has been automatically applied to the buffed surface of the tire. The variable thickness layer is obtained by winding, as it will be called here, a "variable pitch composite spiral" on the casing. The nature of this variable pitch composite spiral will become more apparent from a later, more detailed description of this spiral in connection with the drawings. Suffice it to say at this time that it is composed of two spirals, one having a zero pitch (a special case of a spiral, in which case, actually, there is no spiral), and the other spiral having a normally constant pitch, but for a variable length of time, with the end product being equivalent in its overall effect to a conventional variable pitch spiral. Such special, composite spiral composed of a long sector of a zero pitch spiral and a shorter sector of a constant pitch spiral, has been restored to in order to simplify the electronic programmer for automatically depositing a variable thickness layer, having very exact, desired dimensions on a casing, and to deposit such layer during a single winding cycle rather than a plurality of winding cycles. Thus, the entire ribbon winding cycle is completed during a single transverse path, or pass, of the ribbon across a casing as differentiated from a plurality of paths and a plurality of passes and a plurality of superimposed layers of ribbon known to the prior art. In this manner, the tire being retarded can be built up by depositing a variable thickness single layer of uncured elastomer ribbon to any desired extent to fill completely and exactly the space, or gap, between the inner surface of the matrix and the outer buffed surface of the casing. It is this exact filling of this gap that is indispensable for obtaining proper adhesion and elimination of any air pockets in the subsequent compression molding. Upon completing of the winding cycle, the casing is compression molded in conventional manner to produce a tread of proper depth, partially resurfaced sidewalls, and beauty rings, when such are desired, all positively bonded to the casing. The locally extruded ribbon thus not only eliminates the necssity of having large stocks of tread rubber, but it also reduces the initial cost of the elastomer because of the elimination of all prior special size extrusions, elimination of the soft rubber layer, elimination of polyethylene backing, of special packing in individual boxes, large amount of paper work, special shipping, etc. Also the elastomer, when extruded, has a temperature of from 150° F. to 200° F. and, at this temperature, it has optimum viscosity and tackiness for positive stiching and adhesion to a compoundly curved surface of the tire casing so that the end product is a product of the highest quality, without any air pockets, and very positive bonding, all of which are indispensable not only from the point of view of long wear, but also the point of view of tire safety.

It is, therefore, an object of this invention to deposit a variable thickness layer of exact, predictable dimensions on a tire casing by winding a variable pitch composite spiral.

It is an additional object of this invention to provide novel methods and machines for converting a continuous slab or sheet of elastomer into an extruded ribbon and then applying the ribbon to a casting of a new or used pneumatic tire for depositing a variable thickness layer of elastomer on top of the casing by means of a single layer of the ribbon, the ribbon following a path of a variable pitch composite spiral for obtaining a variable thickness layer.

It is an additional object of this invention to provide the winding method of the above type controlled by an electronic programmer which automatically controls the operation of the machine by means of a program card specifically programmed for a casing and a matrix of given sizes and for the desired and fully predictable shape, and thickness of the layer of elastomer to be deposited on the casing.

Still another object of this invention is to provide a method of automatically winding a ribbon having a thickness T and a width W, with W$\gg$T, in which a variable thickness layer is deposited on a casing during a single transverse travel, called here an azimuth travel, of the ribbon across the casing by varying the precentage of overlap between the respective succeeding and preceding turns from 100% overlap to 10% overlap.

It is an additional object of this invention to provide the methods of the above type in which the azimuth movement is a start-stop movement, taking place during each spin revolution of a casing, the programmer varying and determining the length of time during which the azimuth movement is on and off during each spin revolution.

The novel features which are believed to be characteristic of this invention, together with the further objects and advantages thereof, will be better understood from the accompanying drawings, in which several embodiments of the invention are illustrated by way of several examples.

Referring to the drawings:

FIG. 1 is a side view of the machine suitable for retreading used tires;

FIG. 3 is a plan view of the control panel;

FIG. 4 is a side view, partly in section, of the control panel illustrated in FIG. 3, the view being taken on line 4—4 illustrated in FIG. 3;

FIGS. 5 and 5A are plan views of the two types of a control card used for controlling the operation of the machine;

FIG. 6 is a plan view of a mechanism used for moving two azimuth card-sensing, or card-scanning, switches which sense the perforations or deformations in the punched, or deformed, cards after their insertion into the machine;

FIG. 7 is a side view, partly in section, taken along line 7—7 illustrated in FIG. 6, of the carriage used for moving two azimuth card-sensing switches;

FIG. 8 is another side view, taken along line 8—8 FIG. 7, of the carriage for azimuth switches;

FIG. 9 is a top plan view, taken along line 9—9, FIG. 1, of an azimuth motor and of the mechanisms actuated by the azimuth motor;

FIG. 10 is a side view of the stitcher;

FIG. 11 is a top view of the stitcher;

FIG. 12 is the rear view, taken in the direction of arrows 12—12, FIG. 10, of the connection between the bottom portion of the stitcher and of that portion of the frame which supports the stitcher, the remaining portions of the stitcher and of the frame being broken away;

FIG. 13 is a perspective view of the frame of the stitcher and of one stitching arm;

FIG. 14 is a side view, taken in the direction of arrows 14—14, FIG. 2, of two columns used for supporting the casing wheel and a hand wheel for adjusting the azimuth turning radius of a casing;

FIG. 15 is a sectional plan view taken along line 14A—14A shown in FIG. 14, of a hand wheel, its pinions, and two racks engaging the respective pinions;

FIG. 15A is a sectional plan view, identical to FIG. 14A, but with the two pinions in an unlocked position;

FIG. 17 is a simplified block diagram of the machine and of its control system;

FIG. 18 is a side view, partly in section, of that portion of the tire wheel and its axle which also includes four "spin" switches;

FIG. 19 is a perspective view of the spin switch actuator, or cam, mounted on and rotated by the tire wheel and having cut-outs for actuating the four spin switches of FIG. 18 during each revolution of the tire wheel;

FIGS. 20 and 21 are those two portions of the schematic diagram of the programmer which control the operation of the spin and azimuth motors, of the stepping switch and of the timer circuit;

FIG. 22 is a diagram illustrating the manner in which FIGS. 20 and 21 should be matched with respect to each other along line A—A for obtaining the above portion of the programmer;

FIGS. 23A, 23B and 23C are plan views of three different positions of a beauty ring selector switch used in the programmer;

FIG. 25 is the remaining portion of the schematic diagram of the programmer, this figure illustrating the electronic timer circuit and a feedback circuit which jointly control the interval of time during which the azimuth motor rotates during each spin revolution of the casing;

FIG. 26 is a perspective view of a machine suitable for making new tires in accordance with the disclosed methods;

FIG. 27 is a side view, taken in the direction of arrows 27—27, FIG. 28, used for chopping a sheet of rubber into strips and then feeding such strips into the extruder of the ribbon winding machine illustrated in FIGS. 1, 2 and 26;

FIG. 28 is an end view, taken in the direction of arrows 28—28, FIG. 27, of the chopping machine;

FIG. 29 is a side view, partly in section, taken along line 29—29, FIG. 28, of that portion of the chopping machine which includes air-operated actuators;

FIG. 31 is a schematic diagram of relays used for controlling the operation of the chopping machine;

FIG. 32 is an explanatory table used for aiding the understanding of the sequence of operation of the relay system shown in FIG. 31.

A VARIABLE PITCH COMPOSITE SPIRAL

Figure 1B:
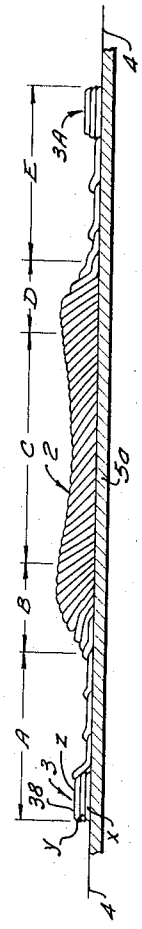
FIG. 1B is a transverse section of a layer of elastomer applied to a casing but developed along a straight line.

Before proceeding with a more detailed description of the winding method disclosed here, it would be helpful to define some of the terms which will be used in describing the method. The word "pitch" in mechanical engineering and machine engineering, means a distance from any point on the thread of a screw to the corresponding point on an adjacent thread measured parallel to the longitudinal axis of the screw. Thus, the pitch of a screw is also the distance advanced on a screw in one revolution of the screw. Screws may have a constant pitch or a variable pitch. When an extruded ribbon is wound on a casing which is rotated at a constant rate around, as it will be called here, its spin axis, which is its normal axis of rotation, and is simultaneously moved at a constant rate in "azimuth," which is the lateral movement of the casing along the spin axis, the path followed by the ribbon is a constant pitch spiral. When the rate of spin is constant and the rate of the azimuth motion is variable, then the ribbon follows a variable pitch spiral. In all of the above examples, it was assumed that the spin rotation and the azimuth motion are continuous motions, and therefore, all one had to do to change the constant pitch spiral to the variable pitch spiral was to make either of the two motions, or, in one private case, both motions, variable speed motions in order to obtain a variable pitch spiral.

The simplest practical automatic ribbon-winding machine, capable of depositing a variable thickness layer by varying the pitch of a spiral, is the one in which the rate of spin is made constant and then only the rate of the azimuth movement is varied. That this is true, follows from the fact that in such machine and its control system, the number of variables is reduced to an irreducible single variable.

There are two methods available for varying the azimuth movement in such a machine. One is to make the azimuth movement continuous and to vary its rate which would produce a known, conventional variable pitch spiral. The second method is to make the speed, or the rate, of the azimuth movement constant, which normally produces a constant pitch spiral as long as the spin is constant, and vary the length of time during which the azimuth rotation is permitted to take place during each spin revolution of the casing. According to this last method, the constant speed azimuth movement produces a constant pitch spiral so long as such movemnet continues, and when such azimuth movement is made equal to zero, i.e., stopped altogether, while the spin still continues, then the pitch will become equal to zero and all subsequent turns will be wound in a single plane and will overlap each other 100%. This latter case is also called here, for convenience of subsequent description, as a spiral in which the pitch is equal to zero.

If the azimuth movement takes place during each spin revolution at a constant azimuth speed, but for a variable azimuth rotation period (variable duration) during each spin revolution, with the azimuth rotation period being a shorter period than the time period required for one complete 360° spin revolution, then the path followed by the ribbon during one 360° complete spin revolution, will include a large sector, say 300°, of zero pitch path and a complementary sector of 60° of a constant pitch spiral. According to the terminology used here, the two sectors combine to produce the previously mentioned composite spiral consisting of the above-mentioned two sectors. The term composite spiral, as used here, therefore, means a spiral which is composed of a longer zero pitch "spiral" sector, and a shorter true "spiral" which, in the disclosed system, is either a substantially or exactly constant pitch spiral sector. The disclosed system, therefore, is of the type in which the azimuth movement is a start-stop movement, as differentiated from a continuous variable speed movement, which also can be used to achieve the same end result.

The true spiral sector will be a constant pitch spiral if the spin speed and the azimuth motion are both constant, and the spiral will be a variable pitch spiral if either the spin speed is variable or the azimuth motion is variable. Since in the disclosed method, both the spin speed and the azimuth motion may be at times constant and at times variable, it follows that the resultant spiral may be either a constant pitch spiral or a variable pitch spiral. In view of the above alternatives, the true spiral will be referred to here as merely a true spiral for differentiating it from the zero pitch spiral. The latter may be called a spiral only in a mathematical sense in which the limit of the minimum pitch is equal to zero. All of the above will become more apparent from its more detailed subsequent description in connection with the drawings.

It should be noted here, firstly, that as long as the rate of the azimuth movement is constant, and secondly, as long as the azimuth movement period is shorter than the spin period, as in the 300°–60° example above, then the total lateral displacement of the ribbon during one spin revolution, i.e., the pitch, will be solely a function of the length of the azimuth period. This total displacement, and the pitch, will not be affected by the variation in the rate of spin as long as the azimuth period is shorter than the spin period. The variation in the rate of spin will merely affect the angle of deflection of the ribbon from a plane perpendicular to the spin axis but not the pitch. This is so because, by definition, pitch is a total lateral displacement during one spin revolution, and it does not matter whether such lateral displacement will take place within 10°, 100°, 200° or 360° of the spin revolution, as long as it does take place within the 360° of the spin revolution, which is always the case in the disclosed method. Actually, in the disclosed method, the maximum magnitude of the sector, i.e., its periphery, during which the azimuth movement takes place, is in the order of 30°, and therefore, is only a fraction of the 360°, i.e., one spin revolution.

Figure 1C:
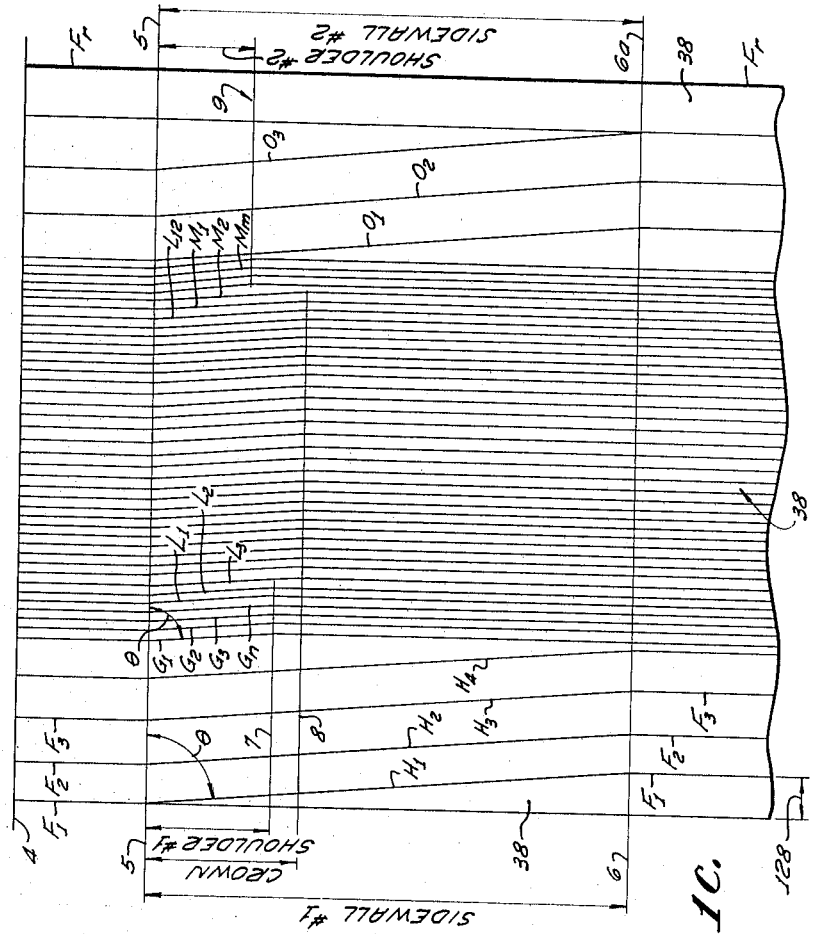
FIG. 1C is a plan view of that portion of a ribbon normally wound around a casing which illustrates azimuth displacement of the ribbon, as it is wound around the casing, which is produced with the start-stop azimuth rotation system disclosed in this application.
Figure 1A:
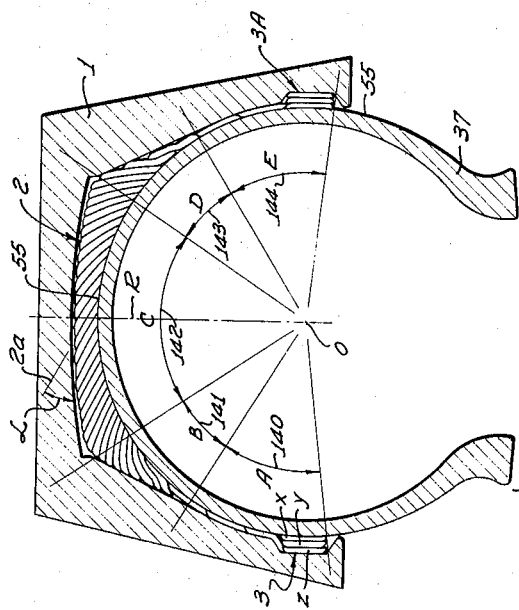
FIG. 1A is a transverse section of a casing illustrating a winding applied to the casing.

Proceeding now with a more detailed description of the variable pitch composite spiral path followed by the ribbon, FIG. 1A illustrates a transverse section of a pneumatic tire casing 37 with a variable thickness layer 2 of elastomeric ribbon wound on its outer surface and surrounded by a matrix 1. As illustrated in FIG. 1A, the deposited variable thickness layer 2 fills completely the gap between the casing 37 and the matrix 1. The variable thickness layer 2 is deposited during a single azimuth pass, i.e., a complete travel in azimuth of the casing during a complete winding cycle, and many simultaneous spin revolutions of the casing and by winding, in the course of this single azimuth pass and many spin revolutions, a continuous, variable pitch composite spiral which produces variations in the percentage of overlap, from 10% to 100%, between adjacent turns, and the concomitant variation in an angle of inclination $\alpha$ between the transverse lines, defining the transverse dimension of the ribbon, and the casing. The above is obtained, as stated previously, by varying the amount of the azimuth travel, in degrees, during each complete revolution of the casing around the spin axis. The programmer electromechanically subdivides the casing into a plurality of sectors, five sectors, A, B, C, D and E having been found sufficient from a practical point of view to produce the desired transverse pattern for completely filling the gap between the matrix and the casing. The sectors are: The two sidewall sectors A and E, the two shoulder sectors, and the crown sector C. The two sidewall sectors B and D, A and E may include scuff-preventing beauty rings 3 and 3a, which may have one, two or three layers of ribbon deposited on top of each other. The thickest part of the deposited layer is at the two shoulder sectors B and D, an intermediate, or a medium, thickness layer is deposited at the crown sector C, and the sidewall sectors A and E, outside of the beauty rings 3 and 3a, have the thinnest layers. Thus, by varying the percentage of overlap, and therefore, angle $\alpha$ between the surface of the casing and the transverse line corresponding to the width of the ribbon passing through the point of contact of the ribbon's edge with the casing (this line is in line 2a in FIG. 1B), it becomes possible to obtain a variable thickness layer with the ribbon having constant dimensions during one, or a single, transverse azimuth pass of the casing.

The thickness of the extruded ribbon 38, FIGS. 1 and 1C, may vary somewhat as a function of temperature and composition of the strips of stock fed into the extruder. The machine is provided with two adjustments for this purpose. The first one is in the programmer and the second one is in the extrusion die 22, FIG. 1. The programmer is provided with a transducer actuated by the ribbon and connected to a compensating circuit for regulating the operation of the machine so as to take into consideration and automatically and continuously correct for relatively minor variations in the thickness of the ribbon that may take place in the course of its extrusion. For larger initial adjustments and settings of the die for the desired thickness of the ribbon, the die is provided with a manually adjustable gate.

Referring now to FIGS. 1B and 1C, FIG. 1B illustrates the transverse section of elastomeric layer 2 deposited in accordance with the start and stop method on a casing, and developed along a straight line 4, which corresponds to the outer surface of a casing 5a, but developed into a straight line for a more convenient presentation of what is illustrated in FIG. 1C, FIG. 1C being the plan view of that portion of the winding which includes the lateral shift of the ribbon in azimuth. Since in making new tires, a casing 2600, FIG. 26, has the shape of a hollow, right cylinder with two open ends prior to its compression molding, FIG. 1B also corresponds, in part, to a transverse sectional view of the upper portion of a new tire casing 2600, FIG. 26, in the course of its manufacture with a variable thickness elastomer layer 2, FIG. 1B, deposited on the outer surface of such casing. For a more accurate view of this portion of the new tire casing, with a deposited variable thickness layer 2630, one is referred to FIG. 26A which, together with FIG. 26, illustrates the application of the disclosed new method to the making of new tires. In making new tires, sectors A and E extend beyond the beauty rings to provide sufficient amount of elastomer to cover the entire outer surface of the casing and also beyond the beads, so as to be wrapped around the beads after partial collapse of the tire building drum.

In FIG. 1B, which corresponds to retreading rather than to the making of new tires, the winding process begins with the winding of the left beauty ring 3, which includes, in this example, three layers X, Y and Z of the ribbon deposited on top of each other. As in FIG. 1A, the entire deposited layer also includes five sectors A through E.

FIG. 1C illustrates that portion of the pattern which is produced when there are simultaneous spin and azimuth rotations, and also when there is only spin and there is no azimuth rotation. In retreading old casings, the azimuth rotation is a rotational motion, and therefore, will be called as such. This is also true when the green, new casing is shaped as a semi-toroid. The top and bottom portions of FIG. 1C, terminating at the broken-off portions, correspond to that portion of the pattern which is produced when there is only the spin, and no azimuth rotation. The azimuth rotation in the disclosed start-stop system is either a reasonably constant (induction motor) or a constant rate of stepping (low speed synchronous stepping motor). Therefore, as it will become more apparent from an examination of FIG. 1C, the lines such as lines $H_1$–$H_4$, $G_1$–$G_n$, $L_1$, $L_2$–$L_{12}$, $M_1$–$M_m$ in FIG. 1C, which represent the visible longitudinal consecutive edges of the ribbon, are always parallel to each other when there is a constant speed spin rotation combined with the constant speed azimuth rotation (lines $H_1$–$H_4$, $G_1$–$G_n$, $L_1$–$L_{12}$, $M_1$–$M_m$, $O_1$–$O_3$ etc.). Accordingly, in drawing FIG. 1C, it was assumed that both rotations, i.e., spin and azimuth, for all practical purposes, are constant speed rotations. The ribbon edge lines are also parallel to each other when there is only a spin rotation (lines $F_1$, $F_2$–$F_r$). Lines $F_1$–$F_r$ correspond to the previously mentioned spin sector at which time the pitch is equal to zero. Therefore, all of these lines are perpendicular to the spin axis 43, FIG. 1. The radial planes passing through the spin axis 43, are represented by lines 4, 5, 6, 7, 8 and 9 in FIG. 1C, all of which are parallel to the spin axis.

Line 4 in FIG. 1C repersents the cut-off line which is produced across the winding by one of these transverse planes. Line 5 in FIG. 1C represents that instant in the ribbon winding process when the azimuth rotation begins in all five sectors. The programmer is arranged so that the azimuth rotation always begins at the same angular position of the casing, and therefore, such rotation will always begin at the instant line 5 on the casing, which is any imaginary line produced by the plane passing through axis 43. Line 5, however, is quite real from the point of view of the actual operation of the programmer, as will become apparent later because the timing of the programmer begins at this instant. Line 6 represents the instant when the azimuth rotation is stopped during the winding of the sidewall sector A and it has the same meaning as line 5. Since minimum amount of rubber is deposited on the sidewalls, the azimuth rotation continues for the longest period of time at the two sidewall sectors, and therefore, the distance between lines 5 and 6 is longer than between line 5 and other lines indicating the stopping the azimuth rotation in other sectors. For example, line 7 designates the termination of the azimuth rotation in section B, which is the first shoulder sector. The distance between lines 5 and 7 is much shorter than the distance between lines 5 and 6, which means that the azimuth rotation in the shoulder sector takes place only during a small fraction of one complete spin of the wheel. Because of such limited azimuth rotation, there is a very high percentage of overlap and a large amount of rubber is deposited in the shoulder sector, since the successive ribbon turns are almost directly superimposed over each other. The azimuth rotation interval of time is somewhat increased during the crown sector, with the result that line 8, corresponding to the crown sector, is below line 7. Line 9 is closer to line 5 than any other line. This interval corresponds to sector D, which is the second shoulder on the casing. Although sectors B and D are bisymmetrical and have substantially the same amount of rubber deposited in both sectors, they require slightly different intervals of time for azimuth rotation, as indicated by lines 7 and 9, with sector D requiring a slightly shorter period than sector B. This is due to the fact that there is a difference in the patterns that are followed by the ribbon in the two sectors, as illustrated in FIG. 1B. In sector B, there is first an increase and then a slight decrease in the thickness of the deposited layer, while in sector D, the thickness also increases slightly at the beginning of sector D and then decreases thereafter, but the rates are different, and the over-all pattern in sector D is the mirror image of the pattern in sector B. Therefore, sectors B and D require the use of separate potentiometer resistors in the timing circuit for achieving the above. Lines 6 and 6a are spaced the same distance from line 4, and therefore, it is possible to use the same elements in the programmer twice during each cycle, with these elements being used first to monitor sector A and then, later on, to monitor sector E. The lines produced by the edge of the ribbon between lines 4 and 5, and beyond lines 6, 7, 8, 9 and 6a, which are lines F, $F_1$, $F_2$–$F_r$, are parallel lines and they are perpendicular to lines 4 and 5, lines 4 and 5 in turn being perpendicular to the plane in which the winding takes place and parallel to the axis of rotation of the wheel. Lines $F_1$, $F_2$–$F_r$ are perpendicular to lines 4 and 5 because no azimuth rotation takes place during this interval of time, and therefore, the two edges of ribbon 38, FIGS. 1, 1A–1C, are at right angles to the spin axis 43, FIGS. 1 and 2. Only spinning around axis 43 takes place during this interval of time. The lines $G_1$, $G_2$, etc., are again parallel to each other but they form an angle $\theta$ with line 5, which is less than 90° because azimuth rotation does take place during these intervals of time. This angle $\theta$ is equal to the angle formed between lines 5 and $H_1$–$H_4$, which are the lines produced by the edges of the ribbon during the winding of the ribbon along sector A. Therefore, the edge of the ribbon produces an angle $\theta$ with line 5 in all sectors A through E, and this angle becomes equal again to 90° after the termination of the azimuth rotation.

In light of the above description of the pattern followed by the ribbon in the course of its winding on the casing, it does follow the path of a variable pitch composite spiral as represented by lines $F_1$–$F_r$, $H_1$, $H_4$, $G_1$–$G_n$, $L_1$–$L_{12}$, $M_1$–$M_m$, $O_1$–$O_3$, with the spiral following a path of uniformly and equally displaced from each other parallel lines during the spin only, as well as during the spin-and-azimuth motion, with the resulting pitch, if it continued for 360°, being equal to zero during the spin only and producing a uniform pitch during the spin-and-azimuth rotations, but the duration of such uniform pitch differing from sector to sector, except in the first and last sectors, i.e., the two sidewall sectors A and E.

Lines $F_1$, $F_2$, $F_3$–$F_n$, therefore, represent the previously mentioned zero pitch spiral which persists through the greater part of the revolution around the spin axle 43, and a fixed pitch forming an angle $\theta$ with axis 43, through the remaining small sector which completes one 360° turn around axle 43. The magnitude of the azimuth sector varies between 30° and 4° when the thickness of the ribbon is in the order of 0.1″ and the casings are passenger car casings. The magnitude of the azimuth sectors is a function of the thickness of the desired layer and of the thickness of the ribbon, and therefore, the magnitude of the azimuth sectors will vary in accordance with the magnitude of the above parameters. Accordingly, the 30°–4° values are merely illustrative for one set of conditions. Under such conditions the spin sector will vary from 330° to 356°.

In view of the nature of the pattern and the fact that the azimuth sector is smaller than 360°, it is not important whether the spin and azimuth rotations are constant speed or variable speed rotations, since there is ample time to introduce the total azimuth shift or displacement per one spin revolution, such as that designated by a numeral 128 in FIG. 1C, even if the spin speed changes very drastically. Therefore, spin speed actually varies at times quite widely if there is a variation in the speed of extrusion of ribbon 38, FIG. 1. The spin speed actually is controlled so as to be always equal to the speed of extrusion, and therefore, should be considered to be a variable speed. However, this variation in the spin speed does not affect the proper operation of the programmer in view of what has been stated above, i.e., the azimuth sector is a very small sector. The azimuth speed, however, should be controlled very precisely, which is accomplished here by using the synchronous stepping motor. This is described more in detail later.

RIBBON WINDING MACHINE

Figure 2:
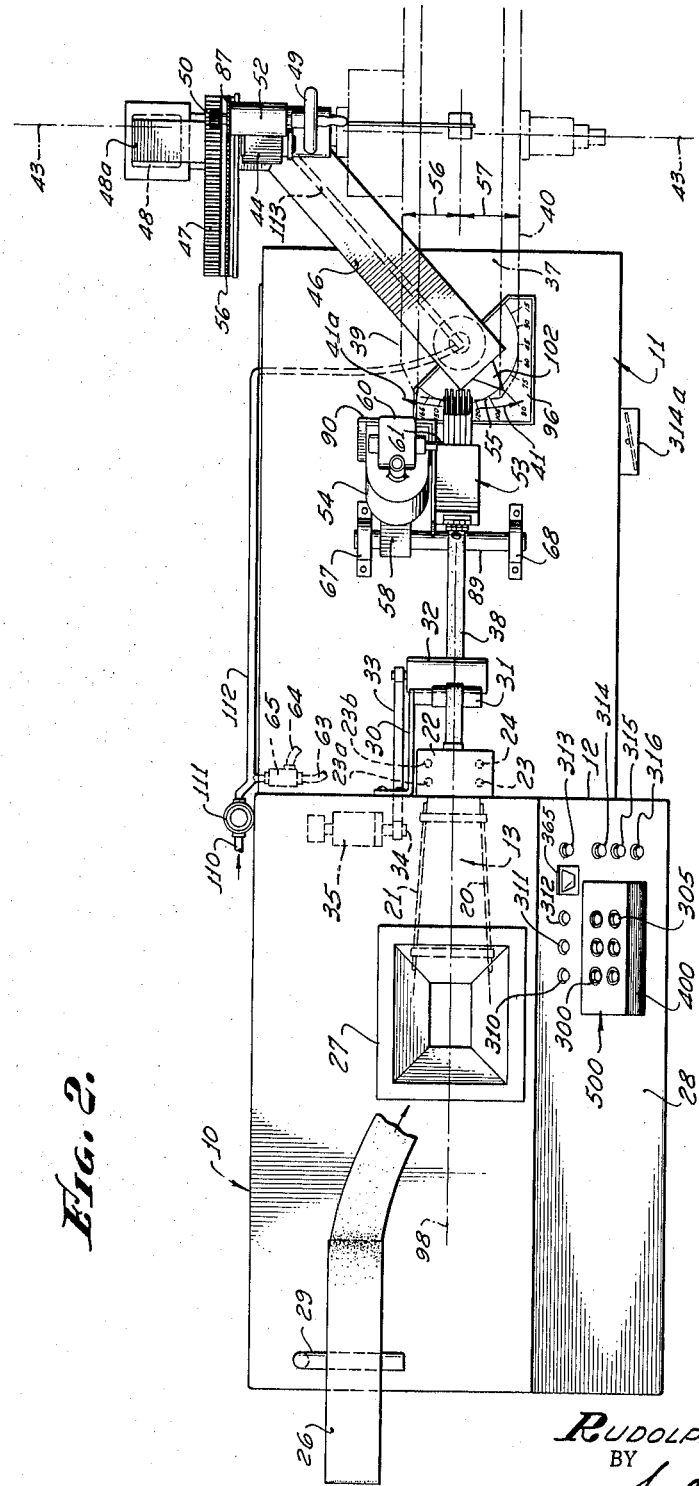
FIG. 2 is a plan, or top, view of the machine illustrated in FIG. 1.

Referring now to FIGS. 1 and 2, the machine is mounted in two box-like members 10 and 11, which are joined together along a vertical wall 12 of box 10. Box 10 is used for mounting an extruder 13, an extruder motor 15, a gear box 14, an electronic programmer, an electric power panel with its switches and fuses, compressed air piping and valves, and cooling water piping and valves. The extruder is provided with a screw 16. Screw 16 may be a hollow screw and, when this is the case, it is provided with a centrally located stationary pipe 17 mounted in the central bore 18 of screw 16. Pipe 17 is connected to a source of cooling water through a stationary coupling 25. Pipe 17 conveys water to the tip of the screw and then the cooling water is returned through the screw bore 18 and rotatable pipe 18a which is connected at one end to the extruder screw 16 and at the other end to a rotatable coupling in the pipe joint 25. In this manner, the cooling water enters pipe 17 and is discharged at the tip of the screw into the screw bore 18; it is then returned through a concentric duct which is formed between pipe 17 and the central bore 18, pipe 18a and coupling 25. In order to control the temperature of an elastomeric material during its extrusion when there is an exceptionally low ambient temperature, and in order to warm up the extruder jacket rapidly under such conditions, jacket 19 of the extruder may be provided with two electric heaters 20 and 21, which are strapped to two sides of jacket 19. Experience has shown that such heaters can be eliminated altogether.

The temperature of the extruder is maintained reasonably constant by means of a cooling system which introduces water into the extruder screw to avoid overheating and to maintain the temperature of the extruded ribbon in the range of 150° F. to 200° F.

The extruder barrel 19 is also provided with a water jacket for cooling the barrel after the extruder is put into operation. Experience has shown that the smoothness of the extruded ribbon is quite sensitive to the compounded viscosity and this viscosity can be controlled by regulating the temperature of the extruder at that level which produces the best smoothness in the extruded ribbon. Controlled water cooling accomplishes the above. Water enters jacket 19 through a flexible hose 120 connected to an incoming cooling water pipe 126 and leaves through a hose 121. A thermostat 122 is in series with pipe 120 and is partially imbedded in jacket 19 so as to be kept at the temperature of the jacket. A solenoid-operated valve 124 is connected in series with hose 121. Hose 121 is connected to an outgoing pipe 127. Valve 124 is automatically opened when the machine is started and is automatically shut off when the machine is stopped. Thermostat 122 controls the rate of cooling by regulating the amount of the cooling water flowing through the circuit.

The extruder terminates in a die member 22, which is also provided with a plurality of cartridge type electric heaters such as heaters 23, 23a, 23b and 24. All electric heaters are controlled by means of thermostats illustrated at 1710 and 1711 in FIG. 17. Box 10 is also provided with a funnel-shaped member 27, which is used for manually, or automatically, feeding the elastomer into the extruder by mounting a roll of stock ribbon 26 on an L-shaped support 29. An additional, alternative, and, for many applications, the preferred method of feeding the elastomer into the extruder, is illustrated in FIGS. 27–32 and will be described at the end of this specification. Box 10 is also provided with a control panel 28 of the programmer, which is used for mounting pushbutton switches for starting and emergency stoppoing of the machine, the potentiometer control dials, indicating lights, ribbon thickness meter, a program card for controlling the programmer and card-scanning switches on the back portion of the panel. The plan and side views of panel 28 are illustrated more in detail in FIGS. 3 and 4. Panel 28 is also provided with a hinged member 400, FIGS. 3 and 4, which is used for holding a card 500, FIG. 5, or card 520, FIG. 5A (when card 520 is used, the position of the control knobs is arranged in a single line to correspond to card 520) with the aid of springs, not visible in any of the figures, which hold the card under proper pressure against the front plate 28 of the panel. This pressure should be sufficiently high so as to resist effectively the counter-pressure exerted on the card by the two card-scanning, or card-reading, microswitches 401 and 402 and their rollers 403 and 404 which are also spring-biased for positive reading of the card. Panel 28 is provided with an opening 410 to permit the two microswitch rollers 401 and 402 to have a direct pressure contact with the bottom surface 516 (see FIG. 4) of the card for "reading" the card.

Box 10 is also provided with an idler roller arm 30 supporting an idler roller 31. A dancer roller 32 is also mounted on dancer roller arm 33 and arm 33 is connected to a shaft 34, and a potentiometer arm 35a mounted on shaft 34. The potentiometer arm 35a and its potentiometer 35 are used to control the speed of a direct current spin motor 54, FIGS. 1 and 2. Arm 35a also connects a high resistance in series with the armature of the spin motor 54 so as to stop spin motor 54 in case of an accidental breaking of ribbon 38. This will be described more in detail later in connection with the description of FIG. 20.

AZIMUTH RADIUS MECHANISM

Proceeding now with the description of that portion of the machine which relates to a rotational support for a casing 37 and its wheel 42, it is necessary to spin wheel 42 around its horizontal axle 43 and it is also necessary simultaneously to rotate casing 37 in azimuth around a vertical azimuth axis 36a. It is also necessary, before such simultaneous spin and azimuth rotations are started, to place the wheel and the casing in such a position with respect to the azimuth axis 36a and stitcher 53 and spin wheel 59 that the outer circumference 55 of the casing would be rotated around its approximate geometric center "O," FIG. 1A, with a proper radius during its azimuth rotation. The geometric center "O" should lie on the azimuth axis 36a and after the geometric center "O" is aligned with the azimuth axis 36a, the casing will have the desired azimuth radius R. The radius R should be equal to the external radius of casing 37 and especially to that portion of its external surface 55 which includes the five sectors A through E, FIG. 1A. Since this portion of the casing is not a perfect circle, the actual magnitude of radius R should be equal to the average value of the radii of the five sectors. As will be explained later, the magnitude of this radius is given to the operator of the machine on the program card 500 at 514 in FIG. 5, and on card 520 at 530 in FIG. 5A. Therefore, the position of the geometric center "O," and the position of the circular axis of casing 37 should be adjusted with respect to the azimuth axis 36a so that center "O" is lying directly on axis 36a and axis 36a is then also tangent to the circular axis 94 at point 106 of the casing. In this case, the casing may be considered to be a substantially circular tube with the circular axis 94, FIG. 1, passing through the centers "O" of such tubes. The outer surface 55 of the casing is then spaced from the vertical axis 36a by a distance equal to the radius R. Such proper spacing of the outer surface 55 from the azimuth axis 36a is necessary so as to produce proper, strictly bisymmetrical, distortion-free ribbon pattern on the casing. This portion of the machine is described below.

The pneumatic, torroidally shaped casing 37 is mounted on an expandable wheel 42, such as that disclosed in the U.S. Patent 2,960,130 to J. A. Smyser, issued November 15, 1960, and wheel 42 is mounted on a horizontal axle 43 supported by means of a pivoted azimuth arm 44, FIGS. 1, 2 and 14, pivoted on a pivot 45. Pivot 45 is mounted on the horizontal leg portion 46 of an L-shaped azimuth arm 46–48, which is fixedly mounted on the vertical azimuth shaft 36. The pivoted arm 44 can be rotated by means of a stationary rack 47 and a pinion 50, FIGS. 14, 15 and 15A, which illustrate, on an enlarged scale, the connections between the two azimuth arms 44 and 48. Rack 47 is mounted on top of the vertical column 48 of the L-shaped azimuth arm which has a slanted upper portion 48a. Column 48 is welded to the horizontal leg 46 of the arm. Pinion 50 is connected to a hand wheel 49. Wheel 49 is mounted on a rotatable shaft 51, FIGS. 15 and 15A, and shaft 51 is mounted in a hub 52. Hub 52 is welded to the top of the pivoted arm 44. Shaft 51 is surrounded by a coil spring 57 which normally keeps shaft 51 in the position illustrated in FIG. 15, i.e., shifted to the left. Two pinions, 50 and 87, are affixed to shaft 51 and rotate with shaft 51. Pinion 50 always engages rack 47 and pinion 87 engages rack 56 only when wheel 49 is shifted by spring 57 to the position shown in FIG. 15, at which time pinion 87 abuts against hub 52 and also is in mesh with rack 56. When pinion 87 is in mesh with rack 56, it interlocks the pivoted arm 44, with the vertical column 48 and then arm 44 cannot rotate, nor be rotated, around pivot 45. This is the position of the elements when it is desired to hold casing 37 and the casing wheel 42 in a fixed position with respect to the frame of the machine, for instance, when the machine is in operation. When wheel 49 is pushed in by the operator against the pressure of spring 57, pinion 87 disengages rack 56 and arm 44 can then be rotated around pivot 45, FIG. 1, in either direction for adjusting the position of the circular axis 94 so that it is tangent to the azimuth axis 36a for obtaining the desired azimuth radius.

Figure 16:
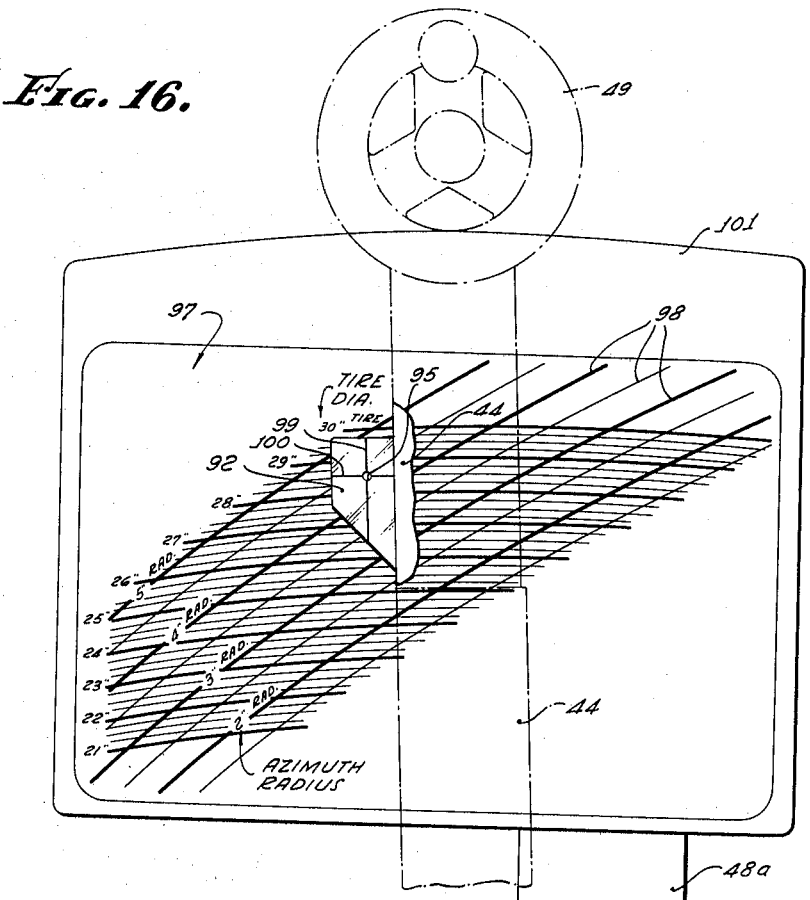
FIG. 16 is an enlarged front view of an azimuth radius scale which is also shown in FIG. 1.

This is accomplished by making the vertical azimuth axis 36a pass substantially through the center O, FIG. 1A, of casing 37. To obtain the latter, the operator first measures the outside diameter of the buffed casing 37 by placing an arm 88 over casing 37 and its outer surface 55 in the manner illustrated in FIG. 14. Arm 88 is slidably mounted on the pivoted arm 44 by means of a slidable sleeve 69. The arm and the sleeve are counterbalanced by means of a pulley 84, FIG. 14, weight 85 and a cable 86. Also mounted on sleeve 69 is a plate 91, FIG. 14, and a transparent indicator 92, FIGS. 1, 14 and 16, provided with two cross-hair lines 99 and 100, and a sighting orifice 95. The slanted portion 48a, FIG. 14, of column 48 is provided with a plate 101, FIGS. 14 and 16, and on the front of plate 101 is mounted a scale 97. Scale 97 has two sets of intersecting lines. The first set 98 indicates the outside diameter of the carcass as measured by arm 88, FIG. 14, and the second set of lines indicates the azimuth radius which is given to the operator on the face of a card 500, FIG. 5, at 514 of a card 520, FIG. 5A, at 530. These cards will be described more in detail later. For example, card 500 at 514 indicates that the azimuth radius for a 900 x 14 casing which is to be molded in a specal 900 x 14 "mud and snow" mold #519MS (these mold numbers are private serial numbers of various mold manufacturers such as Lodi of California, etc.), the number of the mold being also specified on the card, at 513, which produces a tread suitable for use on roads covered either with mud, ice or snow, should have a 5" radius. Card 520 at 530, indicates that the azimuth radius should be 3½" for a 6.70 x 15 casing in a 6.70 x 15 custom design mold #463F, specified at 541. Accordingly, the azimuth radius, in the main, is obtained by making it substantially equal to the radius of a circle which best approaches the cross-sectional locus of the outer surface of the casing and especially its sectors A–E.

Once the length of the azimuth radius has been obtained from the cards, the azimuth radius wheel 39 is turned until indicator 92 and orifice 95 coincide with the desired intersection of the two sets of lines. Wheel 49 is then released and it locks the pivoted arm 44 to the fixed vertical column 48 in the right position by means of pinions 87 and 50, and racks 47 and 56 in the manner illustrated in FIG. 15. The casting 37 then has the proper azimuth radius with respect to the azimuth axis 36a.

PROGRAM CARDS

It is necessary to digress here from the description of the machine in order to describe, if only briefly, the programmer cards 500 or 520 which are used for timing the operation of the electronic programmer, which, together with other elements of the programmer, control the operation of the entire machine.

Figure 5A:
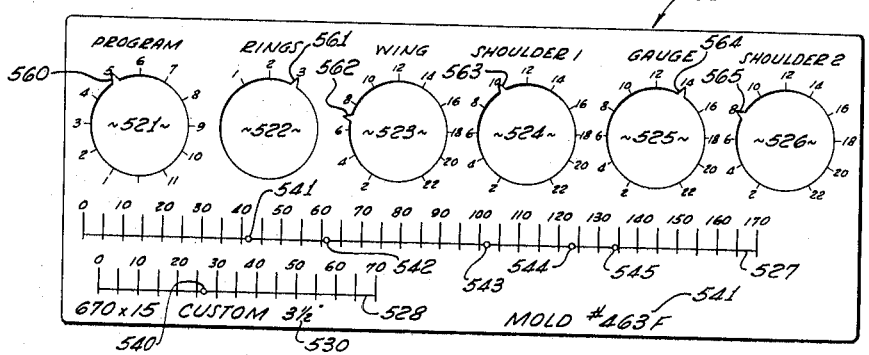

The two alternative versions of a card are illustrated in FIGS. 5 and 5A. In FIG. 5, the knob openings 501–506 are placed in two rows while in FIG. 5A they are placed in a single row, along one straight line. Card 520, therefore, is narrower and longer than card 500 and consequently, has the advantage of having longer linear scales 527 and 528. For this reason, card 520 represents the preferred version.

Both cards have six knob openings 501–506 in FIG. 5 and 521–526 in FIG. 5A. These knob openings are used for mounting the card over the corresponding knobs on the panel. These knobs correspond to the knobs 300–305 in FIG. 3, except that in the version illustrated in FIG. 5A, the six knobs are positioned along one straight line to accommodate openings 521–526 in the card. Card 520 is provided with appropriate scales 527 and 528 corresponding to the degrees from 15° to 165° of protractor 96, and also with the scales around each opening 521–526 for proper setting of the knobs.

Figure 5B:
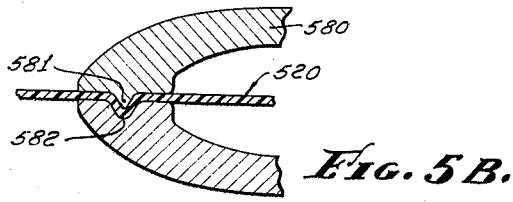
FIG. 5B is a sectional view of pliers used for making detents on the card of FIG. 5A.

FIG. 5B is a sectional view of the tip, or jaws, portion of pliers 580 with proper indentations 581 and 582 for deforming the card and thus produce five indentations 541–545 along scale 527 and one indentation 540 along scale 528. These indentations are then used for actuating the micro switches 401 and 402 in the manner described later and for subdividing the casing into five sectors A through E, illustrated in FIG. 1A.

In the same manner, card 500 is provided with six perforations 507–512 which are used in the same manner as the corresponding indentations 540–545 in FIG. 5A, i.e., to actuate the microswitches 400 and 401 which scan, or "read" the cards and in this manner, deliver electrical pulses for controlling or, in this case, sequentially timing, the operation of the programmer in the manner described later.

POTENTIOMETER, BEAUTY RING AND RESISTANCE NETWORK KNOBS

Once the azimuth radius and the matrix have been chosen, it is then necessary to set the four potentiometer knobs 302–305 to their proper positions so that the thickness of the deposited layer would fully fill the matrix. Knob 301 is set to the desired number of rings and knob 300 is set to the desired "program" number, the meaning of which will be described later. The information for setting the knobs 300 and 302–305 is obtained from the charts which indicate the thickness of the layers obtained in different sectors along the transverse dimension of the casing, with different settings of the potentiometer knobs 300, 302–305, FIG. 3, for any given radius. These charts are obtained in a purely experimental manner by calibrating four programmer potentiometers, which is achieved by operating the machine at a fixed radius and different potentiometer settings for succeeding runs of the machine, and then measuring the thicknesses of the deposited layers obtained with these runs. Such calibration runs are then repeated for different radius settings.

Potentiometer knobs 300, 302–305, which are provided with protruding pointers 320–325, will be described more in detail later in connection with the description of FIGS. 3, 25 and 25B. Suffice it to say at this point that these potentiometer knobs are used for adjusting the settings of four electronic timer potentiometers and one resistance network, which are used in an electronic timing circuit for adjusting the length of time interval during which the azimuth motor is operating. Therefore, from the prior description of FIGS. 1A–1C, it follows that the setting of these knobs directly determines the thickness of the elastomer layer deposited in any given sector A through E. Each sector, except the two sidewall sectors, which have one common knob, has its own knob for the adjustment of its potentiometer to control its individual thickness. The two sidewall sectors have a common knob because of the identity of the thicknesses and patterns produced at these two sidewall sectors. Therefore, the desired layer, filling the desired matrix in the manner illustrated in FIG. 1A, is obtained by using the proper azimuth radius matched with the corresponding proper settings for the potentiometer knobs 300, 302–305. It may be stated here that a given radius for a given casing and a given set of settings for the knobs 300, 302–305 will produce an exact pattern having the desired thickness in the respective sectors. Within certain limits, this exact pattern can be duplicated by using a slightly, but not markedly, different azimuth radius and, correspondingly, slightly different potentiometer knob settings which would compensate for the predictable change in pattern that is produced by either increasing or decreasing the radius. These charts indicate and confirm the predictable results that, for example, the thickness of the layer is increased with the decrease in radius and vice-versa, as long as all the knob settings remain constant. From the above, it follows that the desired pattern and thickness in any given sector can be obtained by setting the azimuth radius and the potentiometer knobs 300, 302–305 to their exact respective settings.

As mentioned previously, knobs 300–305 are provided with the projecting pointers 320–325 and cards 500 and 520 are also provided with corresponding notches 550–555 on card 500 and 560–565 on card 520 for accommodating the pointers when they are set or turned into proper angular positions. In this manner, it is possible to place the programmer cards 500 or 520 on their respective panels, such as panel 28 for card 500, only when knobs 300–305 are turned to their right positions indicated on the cards by the notches 550–555 and 560–565. The card notches, therefore, act as a "fail-safe" feature in setting the knobs. It is to be noted here that the cards are furnished to users of the machine by the manufacturer of the machine with the notches 550–555 and 560–565 and holes 507–512 or indentations 540–545 already provided in the cards, each card producing a proper variable thickness layer on a specific size casing specified on the card, which is to be retreaded in a specific matrix also specified on the card at 513 on card 500 and at 541 on card 520.

The notches 550–555 and 560–565 are punched on the cards by using the previously mentioned calibration curves for the four potentiometers and the resistance network, which is indicated in FIG. 5A as "program." The five sectors A through E are indicated on card 520 as "wing" for two sidewall sectors A and E, "shoulder 1" for sector B, "gauge" for sector C, and "shoulder 2" for sector D.

STARTING AZIMUTH POSITION AND CARD CALIBRATION

After the pivoted arm 44 is placed in proper position so that there is a proper azimuth radius and the potentiometer arms 300, 302–305 are properly set, it is then necessary to place the wheel in proper starting azimuth position. The top cover of box 11 is provided with a protractor 96 and the horizontal leg 46 of the azimuth arm is provided with a pointer 102 which is at right angles with respect to axle 43 of wheel 42. The protractor has a scale, as indicated in FIG. 2, from 15° to 165° with the longitudinal center line 98 of the machine being in line with 135° and pointer 102 pointing at 90° when the geometric axis of axle 43 points at 45°. This protractor is used for obtaining readings, in degrees, when they are used for punching, or indenting, in proper positions, the programming cards 500 or 520, the two scales 527 and 528 on card 520 being also calibrated in degrees. This card calibration is achieved by taking the angles 140 through 144, FIG. 1A, from the desired matrix and then making the indentations 541 through 545 by measuring off these angles on scale 527 which is calibrated in degrees. Indentation 540 on scale 528 corresponds to the desired initial position of the casing, at which point the winding cycle is to begin. The position of this indentaton corresponds to the position of line 145 in FIG. 1A. The correlation between the angles 140–144 and line 145 on one hand and the machine and the casing on the other hand is established by means of the protractor 96 and its pointer 102. It should be understood also that the linear travel of card-scanning microswitches 401 and 402, described more in detail below, is also properly correlated with respect to the angular travel of the azimuth shaft 36; thus, 1° of rotation of shaft 36 produces 1° of linear travel of the scanning switches 401 and 402 along their linear scales 527 and 528, these two scales being also calibrated in degrees.

From the description given above, it follows that the card calibration, or placing of indentations along the two angular scales 527 and 528, is obtained with the aid of the angles data obtained from the matrices and transfer of this matrix data onto the cards.

After the card has been properly marked, it is the card and its six perforations 507–512, FIG. 5, or indentations 540–545, FIG. 5A, that control the programmer and the entire operation of the machine.

Panel 28 is also provided with three lights 310, 311 and 312, and four push-button switches 313–316 which will be described later.

CARD SCANNING MICROSWITCHES

Two microswitches 401 and 402, FIGS. 4 and 7, are provided with two sensing rollers 403 and 404, which are used for sensing perforations 507–512 on card 500 or indentations 540–545 on card 520. Cards 500 and 520 may be made of any suitable material, such as aluminum or a plastic, such as polyvinyl chloride.

In order to move the microswitches 401 and 402 from one end of card 500 (or 520, FIG. 5A), to another in response to the azimuth rotation of the casing, the microswitches are mounted on a carriage 600, FIGS. 6, 7 and 8. Two stationary brackets 601 and 602 are mounted on the back of panel 28 and these brackets support two guide rods 603 and 604. Carriage 600 is provided with two openings 605 and 606 which are used for slidably mounting carriage 600 on the guide rods 603 and 604. Carriage 600 is clamped to a bead chain, or preferably, a flexible steel cable 607, by means of a clamp 608. Carriage 600 is also provided with a pressure roller 609 and compression spring 610. The two microswitches are mounted on a fork 611 of the pressure roller 609 and in this manner, the rollers 403 and 404 of the microswitches 401 and 402 continuously engage the adjacent bottom surface 506 of the card. In this manner, proper scanning of the perforations 507–512 or indentations 540–545, and actuation of the microswitches 401 and 402 is obtained by means of the information contained on the cards. The card scanning bracket 600 is moved along the length of the card by means of a chain, or preferably cable, 607 coupled to the azimuth shaft 36 and the azimuth motor 73 by means of pulleys 83 and 77, chain 75, gear box 74, FIGS. 1 and 9. Mounted on shaft 36 is a pulley 83 which rotates with shaft 36, and transmits the azimuth rotation of shaft 36 to the microswitch carriage 600 by means of cable 607. Cable 607 runs over idler rollers 900 and 901, 618, 619 and 620, FIG. 6, roller 620 being mounted on a slidable bracket 612. A bolt 614 and a compression spring 615, mounted on a frame member 616, keep cable 607 in tight engagement with the azimuth pulley 83 for faithful slip-free transmission and transformation of the azimuth rotation of shaft 36 to the linear movement of carriage 600 and the two microswitches 401 and 402. As mentioned previously, 1° of rotation of shaft 36 produces 1° movement of the microswitches 401 and 402 along their linear scales 527 and 528. These switches scan the punched card 500 or 520 in the manner described previously and actuate the programmer which, in turn, controls the intermittent actuation of the azimuth motor 73.

AZIMUTH MOTOR

Intermittent energization of the azimuth motor 73 is controlled by the programmer which will be described later. The azimuth motor 73 rotates the azimuth shaft 36 only in the clockwise direction as viewed in FIG. 2, i.e., in the direction of arrow 41a, FIG. 2. The counter-clockwise rotation of shaft 36 is obtained manually by releasing the chain drive 75 between the azimuth motor 73 and the smooth face pulley 77 (see FIG. 9) which is obtained by de-energizing a solenoid valve 65, and releasing air pressure in an actuator 80. Actuator 80 is connected to the solenoid operated air valve 65 by means of two pipes 64a and 63a. When solenoid of valve 65 is de-energized, the valve connects pipes 63 and 63a to an atmospheric pressure and pipes 64 and 64a to a high pressure with the result that the piston in actuator 80 and the piston rod 80a are shifted to the right as viewed in FIG. 9. The pivoted arm 78 rotates in a clockwise direction around a pivot 79, with the result that the pressure exerted on chain 75 by two sprocket wheels 81 and 82 is released and chain 75 then makes only a sliding contact with pulley 77. In this manner, shaft 36 becomes disconnected from the azimuth motor 73 and especially its gear box 74, which would otherwise prevent manual turning of shaft 36 in the counter-clockwise direction as viewed in FIG. 2, and as indicated by arrow 41. This manual rotation returns wheel 42 to its original position. Since the solenoid valve 65 is manually energized by closing a pushbutton switch 314 at the beginning of the winding cycle and is automatically de-energized by the programmer at the end of the cycle, the azimuth motor 73 remains mechanically connected to the azimuth shaft 36 throughout the entire duration of the winding cycle, but it is started and stopped electrically for variable and controllable periods of time by the programmer. Accordingly, the controlled clockwise rotation is produced by controlling or varying the length of time during which the azimuth motor 73 is energized and de-energized during each revolution of the casing around the spin axis, and, at the end of the ribbon-winding cycle, the azimuth motor is disconnected altogether mechanically from shaft 36 and electrically from its source of electric current, and wheel 42 is then manually returned to its original position. Therefore, in the disclosed system, the azimuth rotation, in principle, is not a variable speed rotation, but is a constant speed rotation but such rotation is for variable intervals of time, i.e., it is a start-and-stop rotation.

The azimuth motor 73 and its gear box 74 are mounted by means of a bracket 74a, FIG. 9, within box 11. As a compromise, the azimuth motor 73 may be a three-phase induction motor, which is geared down to approximately .85 r.p.m. through a gear box 74 and a sprocket chain drive 75 of the azimuth shaft 36. As has already been mentioned, it is preferable to use a stepping motor which turns through a fixed angle for each cycle. The stepping motors are multiple synchronous motors which are used as stepping motors. These motors are also known as slow speed synchronous motors having a large number of poles, such as 100 poles. One example of such motors is a family of "Slo-Syn" synchronous motors of the Superior Electric Company, Bristol, Connecticut, described in bulletin SE–L 2604. The advantage of such motor resides in the fact that the amount of the azimuth rotation can be controlled very accurately with the stepping motor while the induction motor has a variable time lag in starting and stopping. Stopping is especially unreliable because of erratic coasting of the motor after it is disconnected. The stepping motors lock instantly into a magnetic "hold" position after they are disconnected, thus eliminating any coasting.

STITCHER AND SPIN MOTOR ARM

Referring now to a mechanism which spins carcass 37 and stitches ribbon 38 onto surface 55 of carcass 37, this mechanism is mounted on an arm 58 which is pivoted around a shaft 89 mounted in two hubs 67 and 68. Arm 58 is non-rotatively mounted on a shaft 89 and shaft 89 is rotatively mounted in hubs 67 and 68. The arm has an upper part 58, supporting spin motor 54 and stitcher 53, and a lower part 58a connected to a push rod 66.

*Spin motor.*—Spin motor 54 is connected to a gear box 60 and gear box 60 is connected through a counter-shaft 61 to spin wheel 59 which spins casing 37 around horizontal axle 43 by engaging its outer periphery 55 under the pressure exerted on the wheel by arm 58. This pressure is supplied through arm 58 by an actuator 62 which is connected to a source of compressed air through pipes 63 and 64, which, in turn, are connected to a three-way solenoid-operated valve 65. The piston in actuator 62, when valve 65 is opened, rotates arm 58 in a clockwise direction, as viewed in FIG. 1, at the beginning of the ribbon-winding cycle for engaging the outer surface 55 of tire 37 with the tire-spinning wheel 59 and stitcher 53. When the ribbon-winding cycle is completed, the programmer automatically closes the three-way solenoid valve 65 which reverses the compressed air connections to actuator 62, thus rotating arm 58 at the end of the winding period in the counter-clockwise direction into the position shown by dotted lines in FIG. 1. The operation of the solenoid valve 65 by the programmer will be described later with the description of the programmer. Thus, arm 58 is swung into the ribbon-winding position by the actuator when the operator manually closes the pushbutton 314 at the beginning of the winding cycle and is automatically retracted to an idle position at the end of the winding cycle. Manual actuation of pushbutton 314 is desirable in order to start the actual winding cycle when the operator is ready and finds that the machine is also ready for properly starting the cycle. Accordingly, the actual moment when the winding cycle begins is controlled by the operator and not by the programmer. This is necessary because the cycle can be started, firstly, only when the extruder begins to extrude a smooth, even, uncurled and undistorted ribbon, and secondly, only after such ribbon is properly threaded manually through the machine by the operator. The very moment the operator threads the machine, he places it under the spin wheel 59 and stitcher 53 and at this moment, while still pulling on and collecting in his hands the free end of the rapidly extruded ribbon by extruder 13, he kicks the foot-kick switch 314a, FIGS. 1 and 2, which actuates valve 65. For the convenience of the operation, therefore, the preferred location of the switch 314 is that shown in FIGS. 1 and 2, as a foot-kick switch, rather than a hand operated pushbutton 314 located on panel 28. It is to be noted here before completing the description of the spin motor, that it can be mounted with an equal ease on column 44 and then connected through a gear box to the spin axle 43. The spin wheel 59 in this case, becomes an idler or a part of the stitcher 53.

*Ribbon thickness transducer.*—Arm 58 is also provided with an idler roller 70 and ribbon thickness gaging roller 71 which is supported by roller 70, and a ribbon 38 passing between the two rollers. Roller 71 is provided with an arm 72 pivoted on a pivot 72a and a plunger 72b terminating in a magnetic rod which operates a transducer 93. Transducer 93 furnishes an alternating current information signal which is used for continuous measurement of the thickness of the ribbon, and this signal is used in the compensating circuit which, in turn, controls the operation of the timing circuit in the programmer so that the timing circuit takes into consideration and continuously compensates for any minor variations in the thickness of ribbon 38. The timing circuit, in turn, controls the duration of the azimuth rotation period. This compensating circuit will be described more in detail later in connection with the description of FIGS. 25 and 25A.

STITCHER

The stitcher is illustrated more in detail in FIGS. 10, 11, 12 and 13, FIG. 10 being a vertical side view; FIG. 11 being the top view; FIG. 12 being the front elevational view of the bottom portion of the stitcher, and FIG. 13 being the perspective view. The stitcher is mounted on a bracket 1000, mounted on column 58 in the manner illustrated in FIG. 1. This column is also provided with a box-like member 90, which is used for mounting the spin motor, transducer 93, rollers 70–71 and bracket 1000 of stitcher 53. The connections between bracket 1000 and the frame 1001 of the stitcher are illustrated in FIGS. 10, 12 and 13. Frame 1001 is provided with a hub member 1012 which accommodates a pin 1013 passing through two holes in member 1000 and through hub 1012. The entire frame 1001 of the stitcher can swing freely around pin 1013 in the manner indicated by dotted lines 1200 and 1201 in FIG. 12. To stops shoulders 1204 and 1206 are provided on member 1000 to limit the swing of the stitcher in either direction. Because of such mounting of the stitcher, the stitcher aligns itself automatically with respect to the adjacent portion of the casing and of the ribbon deposited on the casing, as the winding operation proceeds.

The frame member 1001 of the stitcher is an open rectangular box, which is provided with four broached openings 1002, 1003, 1004 and 1005, which are used for accommodating, in a sliding engagement, nine slidable tensioned stitching arms 1100–1108, five arms 1100–1104 being mounted in two upper rectangular openings 1002 and 1004, and four arms 1105–1108 being mounted in two lower rectangular openings 1003 and 1005 in the stitcher frame member 1001. Each slidable stitcher arm 1100–1108 is provided with a stitching wheel such as wheels 1109–1117, the stitching wheels 1109, 1110 and 1114 being serrated, as illustrated in FIGS. 10 and 11, for increasing the pressure exerted by these wheels on the ribbon so as to obtain a more positive stitching of the edges of ribbon 38 to surface 55 of the casing upon its application to surface 55 by the spin wheel 59. All of the stitching arms 1100–1108 are tensioned by means of individual tension springs 1118. These spring are connected between a front rod 1120 mounted on frame 1001 and individual pins 1122 mounted in the rear end 1123 of each stitcher arm, thus obtaining the individual tensioning of the nine stitching arms.

As illustrated in FIG. 10, pins 1122 extend slightly above and below the rectangular openings 1004 and 1005, and therefore, prevent the sliding of the stitcher arms 1100–1108 beyond the extreme outward position illustrated in FIGS. 10, 11 and 13. Springs 1118 are in tension when all of the arms are in their extreme right position as viewed in FIGS. 11, 12 and 13. This tension increases many fold when the stitcher is swung into the stitching position by arm 58 and actuator 62. Sufficient air pressure is applied by the compressed air on the piston of the actuator connected to the push rod 66 so as to exert proper stitching pressure for obtaining very positive engagement between surface 55 of tire 37 and the spin wheel 59, as well as all of the stitching wheels 1109–1117, and the newly applied ribbon. Very positive stitching can be achieved quite readily at this instant, with the freshly extruded ribbon, because ribbon 38 has a temperature between 150° F. and 200° F. when it leaves the extruder and when it is stitched. Therefore, the ribbon's viscosity and tackiness are at their best at the moment the ribbon is stitched to the casing. The width of the five stitching rollers on top, as well as of the four stitching rollers on the bottom of the stitcher, is wider than the width of ribbon 38, illustrated in FIG. 11, and therefore, the first four bottom stitcher wheels 1114–1117 apply pressure to the surface which is wider than the width of the ribbon. The same is also true of the five upper stitching rollers 1109–1113 which apply the pressure over an even wider surface than the bottom stitching wheels. The bottom stitching wheels 1114–1117 are in a staggered position with respect to the upper stitching wheels 1109–1113, so that the entire combined width engaged by the bottom and top stitching wheels is stitched to the casing in a positive manner several times. It is also desirable to have the combined width of all the stitchers to be wider than the ribbon to insure the fact that proper and positive stitching is obtained over the entire ribbon, and especially its leading and lagging side edges, irrespective of the angular position of the stitcher and of the ribbon.

Each slidable stitching arm 1100–1108 can slide either forward or backward individually and independent of the position of the adjoining or any other stitching arm, and therefore, the entire stitcher with its slidable arms and rotatable stitching wheels, can adapt itself and conform to the irregular surface, as viewed in a transverse direction, which is produced when the ribbon is wound at an angle to the surface of the carcass.

The stitcher is arranged so that it can swing through a maximum angle $\alpha_1$, illustrated in FIG. 12, this angle being proportioned so as to enable the stitcher to be in the desired self-aligning position with respect to the surface of the casing as the casing travels along an arcuate path with respect to the stitcher and thus successively exposes first one sidewall, then the crown, and then the other sidewall of the tire to the stitcher. This angle is in the order of 60°–70°.

Figure 13A:
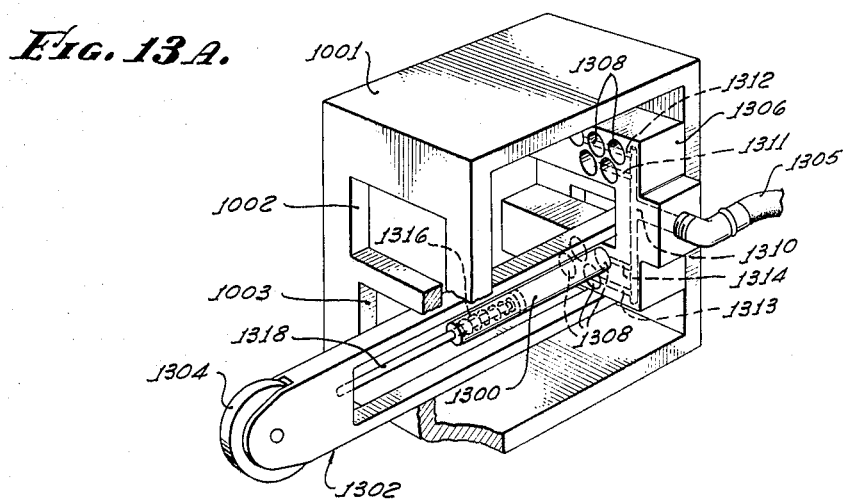
FIG. 13A is a perspective view of an alternative pneumatic stitcher.

*Pneumatic stitcher.*—Referring now to FIG. 13A, it illustrates a modified version of the stitcher. While in FIGS. 10–13 the stitcher arms resist pressure exerted on them by the casing by means of individual springs 1118, FIG. 13A, springs 1118 have been replaced with pneumatic actuators 1300 which actuate stitching arms 1302 provided with stitching rollers 1304. The stitching arms themselves are similar to those illustrated in FIGS. 10, 11 and 13, except that their dimensions are modified so as to conform them to the changes introduced in the stitcher. The total number of arms is identical as in FIGS. 10, 11 and 13, but to simplify the drawing, only one arm 1302 is shown in FIG. 13. Compressed air is introduced through a flexible hose 1305, which is connected to a distributor block 1306 provided with a plurality of cylindrical openings 1308, all of which receive their individual respective actuators 1300. Compressed air is supplied to the cylinders 1308 with the aid of ducts 1310–1314. Actuators 1300 and especially their respective cylinders are inserted into the cylindrical openings 1308 in block 1306, and they are then brazed to block 1306. Actuators 1300 are spring-biased by means of coil springs 1316 which return the actuators to their retracted position when pressure is reduced on the pistons connected to the push rods 1318. The piston-returning springs 1316 are so weak that their counter-pressure may be disregarded altogether here. Therefore, the pressure exerted on the casing and the ribbon is that due to a constant air pressure, irrespective of the position of the stitching arms and the degree of their forward travel when air pressure is introduced into cylinder 1300. Consequently, with the pneumatically actuated individual stitching arms, the stitching pressure is uniform all the time, irrespective of the relative positions of these arms. The pneumatic pressure can also be controlled by regulating the air pressure, thus allowing the stitcher to have the desired, adjustable, preset pressure applied to the actuators 1300, which in turn, apply a uniform preset desired pressure on all portions of the casing even though one stitching arm may extend very much beyond some other arm in the same stitcher. When such stitcher is used, it is connected to a source of compressed air through pipe 113, FIG. 2, which also supplies compressed air to wheel 42 for expanding the wheel and for simultaneously inflating the casing.

The remaining portions of the pneumatically actuated stitcher are identical to the corresponding parts of the spring actuated stitcher illustrated in FIGS. 10, 11 and 13, and therefore, they are similarly numbered in FIG. 13A and need no additional description.

SIMPLIFIED BLOCK DIAGRAM OF MACHINE AND PROGRAMMER

Referring to FIG. 17, it illustrates a simplified block diagram of the entire machine, with a large number of the individual electronic components of the programmer omitted. The purpose of this figure is to serve as an introduction to a more detailed description of the programmer.

In describing FIG. 17, it should be possible to proceed at once with the description of the functioning of the control system because all the mechanical elements of the machine have been described already. Beginning with extruder 13, the extruder is started by closing switch 2002 and spin motor 54 is started by closing contacts PRA. switches 1702 and 1703 are closed prior to the closing of switches 2002 and PRA for warming up the die and the jacket of the extruder. Upon starting the extruder, the raw stock is fed into the extruder for some time and is deposited on the floor of the machine until the extruder has been warmed up to the proper extent and it then produces a smooth, even ribbon. The ribbon is then threaded over an idler roller 31, dancer roller 32, ribbon thickness gauging rollers 70 and 71, and spin wheel 59. The ribbon is then tacked onto the sidewall of casing 37 simultaneously with the actuation of the valve relay 65, which swings stitcher and spin wheel arm 58 toward and against casing 37 in the manner described previously. Spin wheel 59 starts the rotation of casing 37 around the spin axis 43, which starts the winding cycle of the ribbon. Valve relay 65 can be actuated only after casing 37 is placed on the right spin and azimuth positions. The spin light 312 is connected to spin switch 1802, indicated in FIG. 17 in a block form at 1706. The spin switch 1802 becomes closed when contacts of the switch drop into a slot 1901 in collar 1810 illustrated in FIG. 18. This at once places wheel 42 and casing 37 in the right starting spin position, or a predetermined angular position with respect to spin wheel 42 and spin axis 43.

The four spin switches 1706, which are also shown at 1800–1803 in FIG. 18, perform four different functions: Spin switch 1802 acts as a means for identifying the right spin position by lighting the amber light 312; spin switch 1800 controls the operation of the timing circuit in FIG. 25; spin switch 1801 controls the operation of the azimuth motor 73 and of the stepping switch 2007 in FIG. 21, and spin switch 1803 controls the operation of a program starting relay CR in FIG. 20. All of these four spin switches 1800–1803 will be described more in detail in connection with the description of the programmer, FIGS. 20–25B.

Suffice it to say now that casing 37 and wheel 42 are placed in the right spin position by turning wheel 42 until all four spin switches 1800–1803 simultaneously close and the amber light 312 lights, which is connected in series with the spin switch 1802. Spin switch 1803 is connected in series with a program relay CR and a pushbutton 314. Both must be closed to start the operation of the programmer and of the entire machine.

The position of perforation 507 on card 500, or indentation 540 on card 520, acts as an identifying means for the right starting azimuth position through the actuation of microswitch 402 and lighting of the white light 311. The right spin position is obtained by manually spinning wheel 42 around the spin axis 43 until amber light 312 lights, and the starting azimuth position is obtained by manually turning the azimuth axis 36 until white light 311 lights. The proper starting spin position is necessary for proper timing of the programmer because the programmer, in part, is controlled by the four spin switches 1800–1803 and the proper starting azimuth position is necessary for starting the winding of the ribbon at the right place on the sidewall of the casing.

Once the spin and the azimuth lights have been actuated in the above manner, the machine is ready for winding ribbon 38 on casing 37, and the winding cycle is started by actuating solenoid-operated valve 65 which simultaneously admits compressed air to the two actuators 62 and 80 (see FIGS. 1 and 9). Actuator 62, through its piston rod 66, swings arm 58 into engagement with casing 37, with the result that spin wheel 59 begins to spin casing 37 around axis 43 at an angular velocity controlled by dancer roller 32. Therefore, the speed of spinning at all times is a function of the rate of extrusion of ribbon 38. Simultaneously, stitcher 53 stitches the ribbon and actuator 80, FIG. 9, rotates lever arm 78 counter-clockwise as viewed in FIG. 9, thus tightening chain 75 and mechanically connecting azimuth motor 73 to the azimuth axis 36. The actual azimuth rotation takes place only when the azimuth motor 73 is energized by the programmer. The mechanical connection, however, as stated before, is established at the beginning of the cycle and is broken by the automatic de-energization of valve relay 65, at the end of the cycle.

In this initial stage of the cycle, the azimuth motor relay 2006, FIG. 21, is not energized because the four contacts 1B, 2B, 3B and 7B of a stepping switch 2007, FIG. 21, are open and therefore, there is no azimuth rotation of the casing. Accordingly, the winding of the ribbon proceeds in a single plane (pitch is equal to zero) until a complete turn of the ribbon is wound in a single plane perpendicular to the spin axis 43. The number of turns wound in this manner is determined by the setting of the beauty ring selector switch 2081, FIGS. 21, 23A, 23B and 23C, which is preset manually to one of the three possible positions illustrated in FIGS. 23A, 23B and 23C. Depending upon the setting of switch 2081, either one, two or three scuff-preventing beauty rings are wound on the sidewall. The term "beauty ring," as used here, is a 360° turn of ribbon 38 deposited on casing 37 while wheel 42 is rotated only around spin axis 43, and there is no rotation of the wheel in azimuth. Therefore, if three rings are wound, they are superimposed on top of each other, and lie in a single transverse plane perpendicular to the spin axis 43. Such three turns are illustrated at X, Y and Z in FIGS. 1A and 1B.

Before proceeding with the further description of the sequence of the operation of the operating cycle, it is necessary to digress and describe some of the components used in the control system.

*Spin switches.*—The pivoted azimuth arm 44, which supports the horizontal shaft, or the spin axis 43 of the wheel, illustrated on an enlarged scale in FIG. 18, is provided with a stationary collar 1812, FIG. 18, and a rotatable spin switch cam 1810. The perspective view of cam 1810 is illustrated in FIG. 19. This cam is mounted on shaft 43 and rotates with shaft 43. The cam is provided with two depressions 1900 and 1901 and a slot 1902 having slanting sides 1903 and 1904. Four microswitches 1800–1803 are mounted on collar 1812. Collar 1812 is welded to arm 44, and therefore, it is stationary. Four switch actuating rollers 1805–1808 are positioned in line with the respective depressions 1900, 1901 and slot 1902 in collar 1810. Accordingly, all four spin switches become actuated simultaneously with each revolution of shaft 43.

The functions performed by these spin switches are as follows:

Spin switch 1800 controls the programmer's timer CR circuit by restoring a capacitor to its original no-charge state and it synchronizes the operation and starting of the azimuth motor at the same time with the starting of the charging cycle of the capacitor. Spin switch 1801 steps the stepping switch 2007, FIG. 21, during the beauty ring counts, and it also completes the circuit of the azimuth motor 73. Spin switch 1802 closes the circuit to the amber spin position light 312. Spin switch 1802 prevents starting of the programmer unless the tire is in the right angular spin position with all four spin switches 1800–1803 closed.

Although all four spin switches 1800–1803 become closed simultaneously, opening of switches 1800 and 1801 is delayed slightly because slot 1902, FIG. 19, is made wider than the two smaller depressions 1900 and 1901 used for closing the spin switches 1802 and 1803 while the wider slot 1902 is used for closing the spin switches 1800 and 1801. This is done in order to allow more time for the spin switches 1800 and 1801 to remain closed to insure that, in FIG. 25, the main capacitor 2532 in the timer circuit is fully discharged and the silicon controlled rectifier 2544 has sufficient time to restore itself to the non-conductive state at the end of each complete revolution of the casing around spin axis 43. Synchronization of the spin switches 1800 and 1801 synchronizes starting of the azimuth motor 73 with the starting of the charging cycle of the time capacitor 2532. An additional reason for making slot 1902 wider, and therefore, making the limits of operation of the spin switches 1800 and 1801 also wider, is to insure the fact that the rollers 1807 and 1808 are in the wider slot when the rollers 1805 and 1806 are in the narrower slots 1805 and 1806, the latter two being used for aligning all four spin switches.

With casing 37 thus being positioned in proper spin and azimuth positions, the winding cycle begins, and, as stated previously, either one of several beauty rings are wound, depending upon the setting of the beauty ring selector switch 2081, which is also shown in FIGS. 21 and 23. Upon completion of the beauty ring or rings, the stepping switch 2007, FIG. 21, is automatically stepped to position No. 6 (this will be discussed more in detail later), and such stepping of the stepping switch into position No. 6 at once begins the intermittent rotation of the azimuth axis 36.

*Timer.*—The azimuth rotation period is controlled by a timing circuit 1718. The timer itself is controlled by means of four potentiometers 2528–2531, FIG. 25 which are connected in parallel, and contacts 1A, 2A, 3A and 7A in series with these potentiometers, all of these contacts being a part of the stepping switch 2007, FIG. 21. The stepping switch 2007 closes one of the contacts at a time, depending upon the phase of the winding cycle, which includes five sectors A through E described previously in connection with FIG. 1A. Timer 1718 is also controlled by the ribbon thickness transducer 93, which is connected to a source of power over a conductor 1729 and to a transducer voltage amplifier 1730 over a conductor 1731. The voltage amplifier is then connected to a demodulator and summing network 1732, the output of which appears as a variable voltage on a conductor 1733. This variable voltage is used for changing the reference voltage of the resistance-capacitor combination used in the timing circuit 1718, and in this manner, timer 1718 is made continuously responsive to the thickness of the ribbon produced by the extruder. The output of the timer is impressed on a timer relay CRT, which has contacts CRTA connected in series with the normally open contacts 1B, 2B, 3B and 7B, and the azimuth motor relay 2006. These contacts are connected in series with conductors 1735–1737 and a power supply 1738. When contacts CRTA close, power from source 1738 is furnished to the azimuth motor relay 2006 over conductor 1737, conductor 1739, contacts CRTA, conductor 1736, one of the closed contacts 1B-7B, and conductor 1735. Upon the actuation of the azimuth motor relay 2006, contacts 1751 close and the azimuth motor 73 becomes connected to a source of three-phase power 1750 over a conductor 1740. The opening and closing of contacts 1751 by the azimuth relay 2006 is controlled by timer 1718, this timer closing and opening the circuit of the azimuth relay 2006 and contacts 1751 for variable intervals of time in the sectors A through E illustrated in FIG. 1A.

*Program card.*—The operation of the cards 500 or 520 in connection with the system disclosed in FIG. 17, is as follows:

When the stepping switch 2007 is advanced to position No. 6 (for description of the stepping switch 2007 see the description of FIGS. 24A–24E, given later), the azimuth motor 73 is energized for the timed intervals of time determined by the setting of timer 1718. Rotation of axis 36 produces longitudinal shifting of the microswitches 401 and 402 in one direction by motor 73 and manually in the opposite direction, which is illustrated by a double arrow 1709. The function performed by the microswitch 402 has already been described: it senses perforation 507 in card 500 and thus gives an indication that casing 37 is in the right azimuth position, which lights the azimuth light 311, FIG. 3. From then on, as the switches are moved from right to left, as viewed in FIG. 17, by the azimuth motor 73 and chain 607 along the length of card 500, switch 401 senses the first perforation 508 on card 500 (not visible in FIG. 17), which constitutes the termination of the maximum rate of the azimuth traverse used in winding the ribbon along sector A, FIG. 1A, and the beginning of the minimum rate of azimuth traverse which corresponds to the rate of traverse used in sector B, FIG. 1A. The end of the minimum rate of traverse actually takes place when sensor 403 of switch 401 falls into the perforation 508. The beginning of the minimum traverse than is obtained when sensor 403 leaves perforation 508 and is raised by the trailing edge of perforation 508.

The four additional perforations 509–512 are used for determining the intervals of time when the minimum rate of azimuth traverse is replaced by the nominal rate of traverse, then minimum rate, and then the maximum rate. After sensor 403 leaves perforation 512, there is the end of the maximum traverse and termination of the entire winding cycle. Beauty rings may or may not be wound at the second sidewall, as desired.

*Spin motor.*—The only remaining element that needs description in FIG. 17 is the circuit of the spin motor 54 which is connected to the spin motor speed control circuit 1760 over a conductor 1761 and contacts PRA. The spin motor speed control circuit 1760 is connected through a conductor 1762 and contacts 2005A to the potentiometer 35 having an arm 35a connected to the lever arm 33 of the dancer roller 32. As the dancer roller 32 is either raised or lowered by ribbon 38 in response to any change in the rate of extrusion, the lever arm 33 changes the setting of the potentiometer arm 35A, which in turn changes the voltage impressed on control circuit 1760 over conductor 1762. The spin motor speed control circuit, which will be described more in detail in connection with the description of FIG. 20, controls the direct current voltage impressed on the armature of the spin motor 54 and in this manner, varies the speed of this motor so that the rate of spin is always equal to the rate of extrusion of ribbon 38 by extruder 13.

The above circuit also includes contacts 2053 which are in series with conductor 1762 leading to the potentiometer 35. These contacts are opened and closed by the lever arm 33. When the dancer roller is raised by the loop of ribbon 38 to an abnormally high position, lever arm 33 opens contacts 2053. Contacts 2053 are connected in series with the unijunction transistor 2045 with the result that no current flows through the armature of spin motor 73 under such conditions, and rotation of casing 37 is stopped until contacts 2053 are closed again.

The second switch in this circuit is switch PRA which becomes closed when a power relay PR, FIG. 20, is actuated upon closing of pushbutton 313, FIG. 20. This relay has two sets of contacts PRA and PRB; contacts PRA, FIG. 20, connect the extruder motor magnetic switch 2004 and spin motor relay 2005, which in turn connect the extruder motor and the spin motor to their respective sources of power 1750 and 1738.

PROGRAMMER

Proceeding now with the description of the programming system, FIGS. 20–25B illustrate the schematic diagrams of the electronic programmer and its components which are used for programming the operation of the entire machine from manual starting to automatic stopping. The programmer controls two speeds of rotation: the spin rotation around the horizontal axis 43 produced by direct current spin motor 54. The spin rotation is always made equal to the rate of extrusion of the ribbon. The second controlled parameter is the length of time during which the azimuth rotation persists. This interval of time has been referred to earlier as the azimuth rotation period.

*Stepping switch.*—Before proceeding with the description of FIGS. 20 and 21 and of the entire control system it is necessary to describe its stepping switch 2007 because the twenty-one contacts (seven cams X three contacts per cam) of this switch are used in many parts of the programmer and the description of their mode of operation is essential for understanding the connections and the operation of the programmer. This switch is not illustrated in an assembled form in the drawings, because such switches are known to the art, but its essential parts such as the seven cams and cam-actuated contacts, are illustrated in FIGS. 24A–24E and its stepping relay 2007 is shown in FIG. 21.

The rotary stepping switch 2007 is of the type described and fully illustrated on pages 36–41 of Technical Bulletin 473 of the Automatic Electric Company of Chicago, entitled "Ready Stepping Switches," and designated by Automatic Electric as the "OCS Relay." It is a unidirectional rotary stepping switch operated by a single relay, which is relay 2007 in FIG. 21. The switch, as manufactured by Automatic Electric may have any number of cams up to eight cams. The seven cams used here comprise seven discs, such as disc 2400 in FIG. 24C, bolted together through two bolt holes 2410 and 2411, FIG. 24C, to make up a single cylindrical barrel which is rotated as a unit by relay 2007, FIG. 21, in response to a pulse impressed on relay 2007 when it becomes connected momentarily by various other elements of the programmer, to a full wave rectifier bridge 2062, FIG. 21, at which time it rotates the eight cams 10° for each energization and de-energization of relay 2007. A central hole 2412 is used for mounting all cams on a common axis.

Figures 24A, 24B:
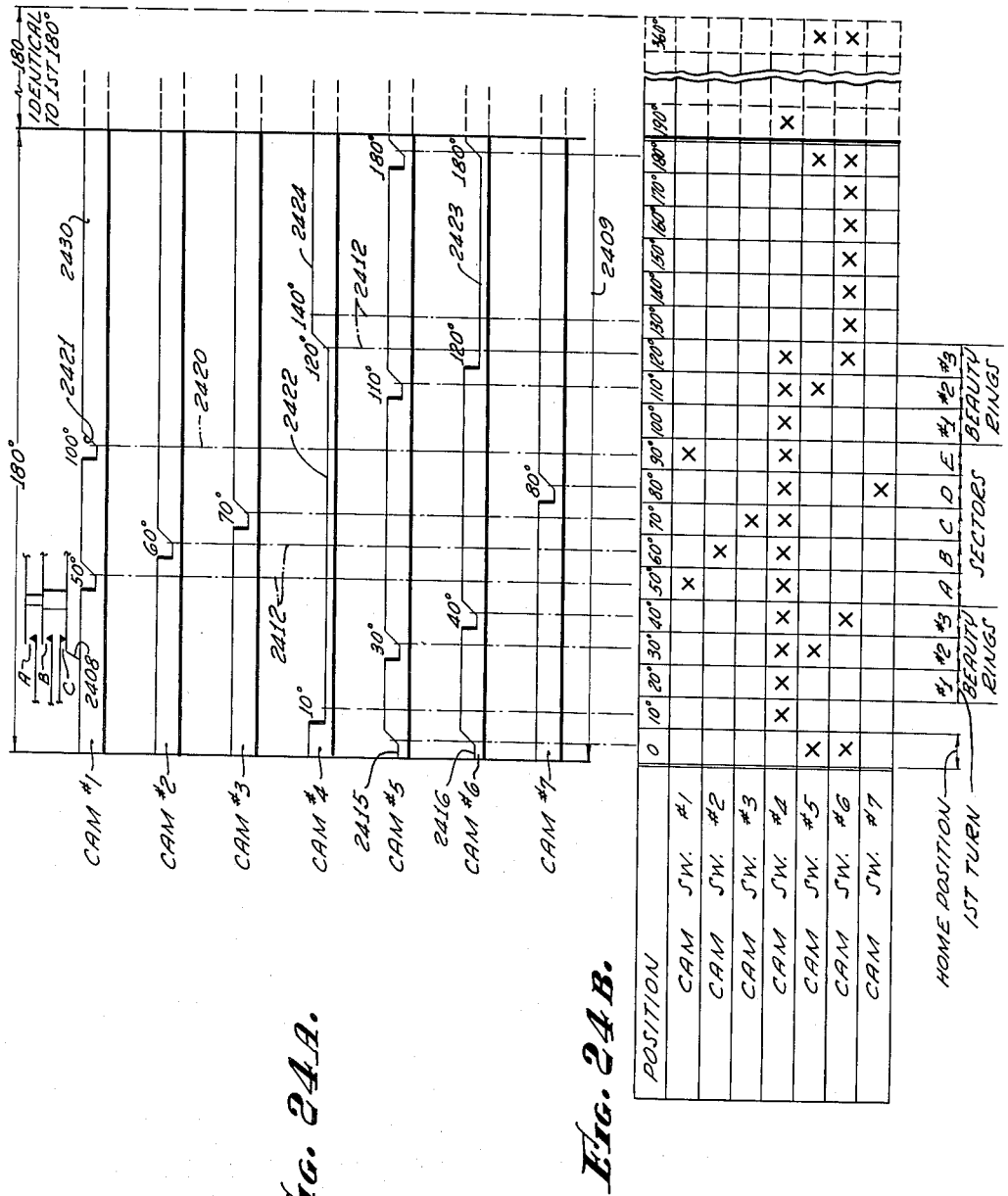
FIG. 24A is a development of the seven circular cams used in connection with a seven-cam rotary stepping switch, the seven circular cams having been developed along their respective seven, spaced and parallel straight lines for a better understanding of the functioning of these cams.
FIG. 24B is a table illustrating the sequence of operation of the rotary cam stepping switch.
Figure 24C:
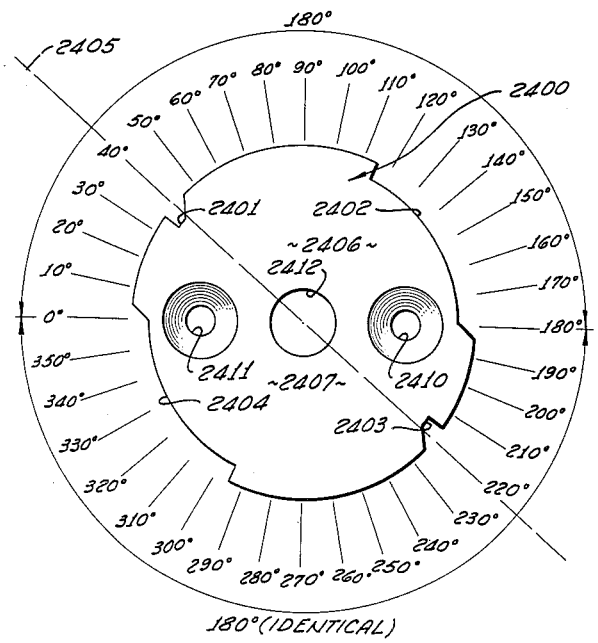
FIG. 24C is a side view of one cam used in the rotary cam stepping switch.

The side view of cam #6 is illustrated in FIG. 24C and the side view of the notched portions of all seven cams is also illustrated in FIG. 24A, where they are unfolded, or developed, along straight lines. All cams in the stepping switch are circular cams of the type illustrated in FIG. 24C, and each cam has its own notches spanning different degrees at the desired angular positions along the periphery of the cam. Cam #6 has notches 2401, 2402, 2403 and 2404. The cam can be divided into two identical halves along line 2405 bisecting the cam, with the notches on the upper side 2406 and on the lower side 2407 of the cam being identical to each other. This is due to the fact that the operation of the machine and programmer is completed during 180° rotation of the cams, and therefore, the succeeding 180° constitute merely a repetition of the same preceding cycle that has been obtained during the first 180°. The seven cams, #1 through #7, are developed along their individual straight lines in FIG. 24A and under each other in proper phase relationship. Since the first 180° of each cam are identical to the succeeding 180° (i.e., from 180° to 360°), only the first 180° of the cams are illustrated in full in FIG. 24A, and the remaining 180° are omitted except for the 190° and the 360° portions. Accordingly, in giving the description of the programmer and of the stepping switch 2007, it will be necessary to describe only the first 180°. FIG. 24A indicates that the notches in one cam differ in shape and phase when compared with the remaining cams so that there are no identical cams among the seven cams.

In order to explain the operation of the programmer and of the stepping switch, which is an integral part of the programmer, it becomes necessary at this time to explain the nomenclature that will be used in connection with the stepping switch and the programmer. Each cam operates three contacts in the manner illustrated in FIGS. 24A, 24D and 24E. As illustrated in these figures, when a metallic cam follower element 2408 is on the high portion of cam 2400 or cam 2430 in FIG. 24A, contacts C are closed and contacts A and B are open. As illustrated in FIG. 24E; when the cam follower 2408 is in a notch 2401, then contacts C are open and contacts A and B are closed. The three pairs of contacts A, B and C are electrically independent of each other, and therefore, each pair is capable of making and breaking their independent circuit. These contacts will be referred to in the schematic diagram and FIGS. 20 and 21 in the following manner: The cam will be referred to in accordance with its numerical order indicated in FIG. 24A as cams #1, #2, #3, #4, #5, #6 and #7. The cam will be mentioned first and the contact second. Therefore, for example, if one considers cam #1 and contacts A, B and C, the nomenclature of these pairs of contacts will be as follows: 1A, 1B, 1C numeral 1 referring to "Cam #1" and the letters A, B and C referring to the respective pairs of the switch contacts A, B and C illustrated in FIGS. 24D and 24E. For Cam #2, then, the nomenclature for the the switch contacts will be 2A, 2B, 2C, etc.

Directly below FIG. 24A, and in proper alignment with FIG. 24A, is FIG. 24B, which is an explanatory table indicating the various operating positions of the cam switches as they are operated by the six cams. The upper horizontal column indicates the angular position of all the cams and is numbered 0° through 360°. These 10° steps correspond to the division of the 360° periphery of each cam into 10° sectors, also illustrated in FIG. 24C. Vertical center lines 2412 and 2420 in FIG. 24A, indicate the mid-portions, or the center lines, of the respective 10° steps. The left side of the table has a table indicating the numbers of the cam switches, as cam switches #1 through #7. These are the cam switches which have three pairs of contacts operated by their respective cams #1–#7, such as the cam switches illustrated in FIGS. 24D and 24E. The term "cam switch #1," or "cam switch #2," etc., refers to all three contacts collectively as a single unit. The meaning of the crosses appearing in the table of FIG. 24B is as follows: In the first vertical column for 0°, there are two crosses which indicate that the cam followers 2408 of the cam switches #5 and #6 are in the notches 2415 and 2416, and therefore, contacts 5C and 6C are open and contacts 5A, 5B, 6A, 6B are closed. The same designations are used throughout all of the 360° of the seven cams. The crosses, therefore, indicate when the cam followers 2408 are in their respective notches. The absence of the crosses indicates that the cam followers 2408 are on the high portions of their respective cams. Since the cams and their notches and the high portions are properly aligned with the table (co-phased), all one has to do is to follow the vertical center lines 2412 or 2420 from the cams into the table and thus obtain the state of the respective switches, i.e., whether they are in a closed or open position at any given 10° step. The same information, obviously can be obtained directly from the developed cams #1 through #7 of FIG. 24A by also referring to the horizontal column "position" which indicates the 10° steps, from 0° to 360°. For example, if one examines the state of the switches at 90° position, along center line 2420, the cam followers of the respective switches are:

(1) Switches #1 and #4 are in notches 2421 and 2422 which is indicated by two crosses (X) in the table of FIG. 24B. It means that the contacts of cam switch #1 and cam switch #4 are in the state shown in FIG. 24E.

Figure 24D:
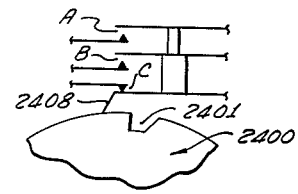
FIGS. 24D and 24E are two side views of three cam-operated contacts.
Figure 24E:
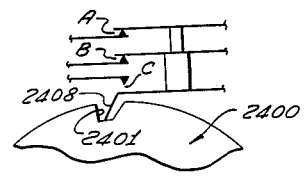

(2) Switches #2, #3, #5, #6 and #7 are on the high portions of their respective cams and therefore, the three pairs of contacts of each switch are in the state shown in FIG. 24D.

*Programmer relays and switches.*—Referring to FIGS. 20 and 21, they should be read here, with the description given below, as a single figure by matching them along line A–A shown at the bottom of FIG. 20, top of FIG. 21 and mid-portion of FIG. 22, which illustrates the manner in which these two figures should be combined. The programmer includes seven relays, which are relays PR, CR, 65 (relay 65 is also shown in FIGS. 1 and 2), 2004, 2005, 2006 and 2007.

Relay PR and a manually operated starting push-button 313 are connected across alternating current, 115 volt buss bars 2008 and 2009 between points 2010 and 2011. Push-button 313 is shunted by a circuit connected between points 2013 and 2017 which includes normally open contacts PRB of relay PR, a manually operated stop switch 316, parallelly-connected open contacts 5C and 6C of the stepping switch, contacts CRD of relay CR, a "broken tape" switch 2000, and a conductor 2020 which connects this circuit to a junction point 2017. The push-button stop switch 316 is a safety switch which is opened by the operator in case of any emergency or malfunctioning of the machine when it becomes necessary to manually stop the entire machine at once. Otherwise, when the machine and the programmer function properly, the entire machine is stopped automatically at the end of the operating cycle by opening the holding circuit of relay PR through the two circuits between points 2013 and 2017, which include contacts 5C and 6C of the cam switches #5 and #6.

The next circuit is the circuit which is connected between points 2014 and 2021 on the two busses 2008 and 2009. It includes the normally open contacts PRA of relay PR and a red pilot light 310. Light 310 indicates that the power is connected to the programmer. All of the succeeding circuits are connected between a common conductor 2023 and buss 2009, conductor 2023 being connected to a junction point 2024.

The circuits connected between busses 2023 and 2009, in the order in which they appear in FIG. 20, include the first circuit for the amber light 312 and the spin switch 1802 used for indicating the proper spin position of casing 37. The proper "spin position" is the position of wheel 42 when all the spin switches 1800–1803 of FIG. 18, are closed and the amber light 312 is lit.

The next circuit includes the green light 311 which indicates the proper azimuth position of casing 37. This light is connected in series with the azimuth switch 402 which becomes closed when the azimuth bracket 46–47 and wheel 42 are manually rotated to the proper starting azimuth position. This proper azimuth position is indicated to the operator when the azimuth switch 402 and its card sensing roller 404 drop into slot 507 of card 500.

The next circuit, beginning at the junction point 2027, includes a CR relay, spin switch 1803, a program starting push-button 314a and the azimuth traverse switch 402. Spin switch 1803 becomes closed at the same time all four spin switches 1800–1803 become closed.

CR relay and three switches 1803, 314a and 402 are connected in series between points 2027 and 2001. A conductor 2031 connected between a junction point 2096 and buss 2009 and the normally open CRA contacts of CR relay, shunt all of the above three switches. Switch 314a is the "kick" switch of FIGS. 1 and 2, which is actuated by the operator by kicking it into a closed position with his foot.

The next circuit is connected between points 2028 and 2029, and includes the normally open contacts CRB of CR relay and operated by a three-way compressed air valve solenoid type relay 65, which is also shown in FIGS. 1 and 2. Relay 65 is used for actuating the three-way air valve, which admits air to the two actuators 62, FIG. 1, and 80, FIG. 9. Therefore, relay 65 and actuator 62 are used for swinging arm 58, FIGS. 1 and 2, into engagement with casing 37 at the beginning of the cycle and out of engagement at the end of the cycle, while actuator 80 connects the azimuth motor 73 to pulley 77 at the beginning of the cycle and disconnects it from pulley 77 at the end of the cycle.

The next circuit includes switch 2002 and a relay 2004. Switch 2002 is manually operated toggle switch used for manually energizing and de-energizing a power relay 2004 which, in turn connects the extruder motor 15 to its source of three-phase power 1750, shown in FIG. 17. Switch 2002 is provided to enable one to disconnect extruder 13 and then operate the entire programmer with the extruder being idle. It is also possible to run the extruder alone, in which case the kick switch 314a remains open. This is desirable for warm-up periods to obtain a ribbon having a smooth texture and high temperature.

*Spin motor circuit.*—The circuit connected to a conductor 2033 includes only the spin motor relay 2005. Relay 2005 closes the only set of contacts 2034 of this relay, which connect two full wave rectifiers 2035 and 2035a to the armature and the field of the spin motor 54, FIG. 1, over conductors 2036, 2037, 2092 and 2093. The two full wave rectifier connections are such that rectifiers 2042 and 2043 are used as common rectifiers for the two full wave rectifier bridges 2035 and 2035a. The first full wave rectifier bridge includes diodes 2042 and 2043 and the silicon controlled rectifiers 2040 and 2041. This rectifier supplies a controlled direct current to the spin motor armature over conductors 2036 and 2037. The second rectifier includes diodes 2042, 2043, 2038 and 2039 which supply field current to the spin motor 54 over conductors 2092 and 2093, and it also supplies current to the dancer roller control circuit of dancer roller 32, FIG. 1.

The dancer roller circuit comprises a unijunction relaxation oscillator synchronized to the rectified wave impressed on this circuit by rectifier 35a. The circuit includes three parallelly-connected circuits: The first circuit includes a PN unijunction transistor 2045 connected in series with resistors 2049 and 2050; the second circuit includes a zener diode 2046, and the third circuit includes a dancer roller potentiometer 35, a high value resistor 2052, capacitor 2047 and a normally closed switch 2053. Also, the emitter electrode of transistor 2045 is connected to the junction point 2051 over a conductor 2059. The voltage output of the dancer roller circuit is used for controlling the voltage bias on the gate electrodes of the silicon controlled rectifiers 2040 and 2041 and these, in turn, control the speed of the spin motor by controlling the armature voltage through this motor. In this manner, the direct current spin motor 54 spins casing 37 at the same peripheral speed as the speed of extrusion of ribbon 38 by extruder 13. A ballast resistor 2048 is connected in series with the charging circuit, the zener diode 2046 and transistor 2045. Switch 2053 is the switch which is also controlled by the dancer roller 32, and is opened by the dancer roller 32 when it is in its extreme low position, which it assumes when it it is not supported by ribbon 38, i.e., when ribbon 38 accidentally breaks. If ribbon 38 breaks, dancer roller 32 opens switch 2053 and high value resistor 2052 becomes connected in series with capacitor 2047. This removes the potential impressed on the gate electrodes of the rectifiers 40 and 41 and they become non-conductive, which opens, in effect, the armature circuit of spin motor 54 and stops it. A voltage wave-form 2054 is impressed on the potentiometer 35-capacitor 2047 circuit and base one and base two of transistor 2045. This wave form is the rectified sinusoidal wave 2055 with its upper portion clipped by zener diode 2046. Diode 2046 becomes conductive at a predetermined point on wave form 2055. When the positive potential reached on capacitor 2047 exceeds the potential at the junction point between the emitter and base two of transistor 2045, capacitor 2047 discharges through transistor 2045 and resistor 2050. At the end of each half cycle, the voltage at base two of transistor 2045 will drop to zero, causing transistor 2045 to fire. Capacitor 2047 thus is discharged at the beginning of each half cycle and the firing circuit is thus synchronized with the source 2035a. The potential drop produced across resistor 2050, when capacitor 2047 discharges across transistor 2045, is impressed on the gate electrodes of the silicon-controlled rectifiers 2040 and 2041 over a conductor 2056. When the potential impressed on the gate electrodes is positive with respect to the common cathode connection 2057, either one or the other rectifier is fired with the result that a wave form 2058 is impressed on conductors 2036 and 2037. Only a controllable portion of each rectified half-wave, therefore, is impressed on the armature of spin motor 54, and the magnitude of this portion is controlled by the CR network, including the dancer roller potentiometer 35. In this manner, the spin motor rotates casing 37 at the same peripheral speed as the speed of extrusion of ribbon 38 by extruder 13.

The next circuit in FIG. 20 is that for controlling the temperature of the extruder barrel 19, FIG. 1. It includes a thermostat 2090 and a solenoid-operated valve 2091 which opens upon closing of contacts PRA by relay PR, which is also true of a solenoid-operated valve 2092 in the circuit for supplying cooling water to screw 16 of the extruder through pipes 126, 127, 17 and bore 18.

The last circuit for controlling the temperature of the extruder includes four heaters, 23, 24, 23a and 23b, thermostats 1710 and 1711 and switches 1703 and 1702 for controlling the temperature of the extruder die.

*Azimuth motor relay 2006 and stepping switch relay 2007.*—Referring now to FIG. 21, the top portion of this figure illustrates the next circuit connected between points 2060 and 2061 which includes a full wave rectifier 2062. Rectifier 2062 supplies direct current to azimuth relay 2006 and the stepping switch relay 2007. Direct current is used for operating stepping switch relay 2007 because a more positive operation, in terms of timing is obtained with direct current. Accordingly, the remaining portion of this circuit also is operated from direct current source 2062.

The azimuth relay 2006 is connected in series with a limit switch 2063, four parallelly-connected contacts 1B, 2B, 3B and 7B of the stepping switch, normally closed contacts CRTA of the timer relay CRT, FIG. 25, spin switch 1801 and contacts 4B of the stepping switch. Spin switch 1801 has contacts 2065 and 2066. When it is on contact 2065, it closes the circuit of relay 2006, and when it is on contact 2066, it is in series with the following circuit which begins at the junction point 2067 on buss 2068: Contacts 4B, spin switch 1801 on contact 2066, five serially connected contacts CRC, 7C, 3C, 2C, 1C, conductor 2069, normally closed contacts 2071 of the reset push-button 315, conductor 2086, conductor 2087, stepping switch relay 2007, and conductor 2088, which completes this circuit. Reset button 315 has two switches 2071 and 2072, switch 2071 being normally closed and switch 2072 being normally open. An arc suppressing diode 2074 is connected in series with switch 2071 and in shunt with relay 2007, which prevents false operation of relay 2007 by any transients.

*Card scanning circuit.*— One side of conductor 2070 is connected to conductor 2069, contacts 2071 and relay 2007 through conductor 2087; the other side of conductor 2070 is connected to the azimuth card reading, or scanning, switch 401, and then to the normally closed contacts CRE of relay CR. Accordingly, one of the six parallel circuits provided in the programmer is the all-important circuit CRE–401–2070–2071–2086–2087 and the stepping switch relay 2007, which includes the card scanning switch 401, which scans the sectors A–E perforations 508–512, FIG. 5, on card 500, or indentations 541–545 on card 520. As will be discussed more in detail later in connection with the description of the operating cycle of the programmer, it is this circuit that connects in succession, with the aid of the stepping switch and its relay 2007, the four potentiometers 2528–2531 in FIGS. 25 and 25B, in series with the timing circuit, one potentiometer at a time, and in this manner controls the duration of the azimuth rotation period. This in turn, controls the thickness of the deposited elastomer layer in the five sectors A through E, FIG. 1A.

The normally open switch 2072 of the reset button 315 is connected to a conductor 2076 on one side and to a self-interrupting contact 2077 of the stepping switch.

This circuit is used for manually resetting the stepping switch.

*Beauty ring circuit.*—The beauty ring selector switch 2081 is connected to relay 2007 over contacts 5A and 6A of the stepping switch and self-interrupting contacts 2077. Contacts 5A and 6A are closed when the stepping switch is in the "home" position, which corresponds to the 0° position in FIG. 24B. Conductor 2078 is also connected to conductor 2068 through contacts 6B and 6C, which are used for the initial stepping of the stepping switch from 0° to 10° position.

*Timer power source.*—A transformer 2082 supplies power to a full wave rectifier 2083, which in turn supplies direct current to the busses 2518 and 2517 in FIG. 25, after appropriate filtering through a standard filtering network. This rectifier supplies direct current for operating the timer circuit of FIG. 25.

*Transducer power supply.*—A constant voltage transformer 2084 is a step-down transformer which is connected across busses 2085 and 2009. This transformer supplies low voltage to the differential transducer-transformer 93, FIGS. 1 and 25, used for obtaining a voltage signal proportional to the thickness of ribbon 38, FIG. 1.

*Ribbon transducer circuit.*—Referring to FIG. 25, it illustrates the schematic diagram of that portion of the programmer which includes the azimuth timer circuit and the ribbon thickness compensating circuit. The latter is actuated by transducer 93 of FIGS. 1 and 17. This transducer is a differential transformer having a primary 2500, secondaries 2052 and 2053 and a movable core 2501 actuated by roller 71, riding on top of the ribbon, and arm 72 shown in FIG. 1. It is used for obtaining a voltage signal which is proportional to the variation in the thickness of the ribbon and then using this voltage for controlling or compensating the azimuth rotation period so that it is adjusted to take into consideration, or compensate for, the variations in the thickness and width of the ribbon as it is extruded from extruder 13. The position of core 2501 determines the degree of coupling between the primary winding 2500 and the two differentially connected secondary windings 2502 and 2503. The output of the transformer 93 is impressed on a transistor voltage amplifier 2504 through a capacitor 2562. The output of voltage amplifier 2504 is impressed through capacitors 2505 and 2506 and potentiometer 2510, on a second transistor voltage amplifier 2507, which in turn, impresses its output over a capacitor 2508 on a third transistor voltage amplifier 2509. The input circuit of the voltage amplifier 2507 includes a potentiometer 2510 which is used only for initial calibration and adjustment of the amplification that is desired on the three transistor amplifiers which are connected in cascade, and once their over-all gain is adjusted with the aid of potentiometer 2510, from then on the setting of potentiometer 2510 remains fixed. Potentiometer 2510 is adjusted first to produce a certain gain, such as 1.6 volts per 0.01″ change in thickness of the ribbon, and then this adjustment is followed by the adjustment of a potentiometer 2516 which is adjusted to produce the desired gain and a biasing voltage at a point 2546. The biasing voltage at point 2546 is instrumental in determining the voltage level to which the timing capacitor 2532 is charged and in this manner, controls the azimuth rotation period. The output of transistor 2509 is coupled to push-pull rectifier stages 2511 and 2512, which are coupled to the amplifier through a transformer 2513. The secondary of this transformer includes a central tap 2514 which is connected to a conductor 2515, and this conductor is also connected to a potentiometer 2516. Potentiometer 2516 is connected across the direct current busses 2517 and 2518. The output of transformer 2513, which represents the ribbon thickness intelligence signal, appears as a rectified signal on conductor 2515, and this signal is also combined with the direct current bias which is also impressed on conductor 2515 by the potentiometer 2516. The bias signal, and the intelligence signal are impressed on the capacitor-resistance signal integrating network 2520 and 2521, and the integrated signal is then impressed on the emitter follower stage 2522, which acts as a current amplifier.

The output of the latter is then impressed in succession on the two additional emitter follower stages 2523 and 2524, and the output of the latter is impressed at the junction point 2546 across that portion of the timer circuit which is connected between points 2525 and 2546.

In this manner, transducer 93 introduces a compensating variable potential into the timer circuit, this potential varying as a function of the variations in the thickness and width of the ribbon as it is extruded by extruder 13. This variable potential is used to compensate, and alter the potential which is impressed by D.C. busses 2518–2517 across the timer circuit by the amount proportional to the changes in the thickness of the ribbon. This will be described more in detail later.

*Timer circuit.*—The timer circuit includes four potentiometers 2528, 2529, 2530 and 2531, which are connected in series with respective contacts 1A, 2A, 3A and 7A of the stepping switch. These potentiometers are connected one at a time by the stepping switch in series with the timing capacitor 2532, which is also connected in series with the spin switch 1800, and a conductor 2533, which completes the charging circiut of capacitor 2532 across the busses 2517 and 2518. The spin switch 1800 is switched to contact 2534 at the end, or completion, of one complete revolution of the spin shaft 43. Therefore, the timing capacitor 2532 is fully discahrged at the end of each spin revolution. Immediately upon leaving depression 1902 in sleeve 1810, FIGS. 18 and 19, the spin switch 1800 is returned to its position on contact 2535, and therefore, the charging cycle of capacitor 2532 is started again. The timing circiut also includes a series circuit between points 2525 and 2526. This circuit includes resistors 2536, 2537, 2540, diode 2538, a PN unijunction transistor 2539, switch 1800, and conductor 2533. A relay CRT and a silicon controlled rectifier 2544, having a gate electrode 2545, are connected in series between points 2542 and 2543. Voltmeter 365 is connected across the output of transistor 2524 and is calibrated in thousandths of an inch to indicate directly the thickness of the extruded ribbon.

*Operation of timing circuit.*—The operation of the timing circuit is as follows: Only one of the stepping switch contacts 1A, 2A, 3A and 7A is closed at any given time by the stepping switch and its relay 2007, FIG. 20, and therefore, only one potentiometer is connected to the charging circuit of capacitor 2532 at any given time. The connected potentiometer controls the length of time it takes to charge capacitor 2532 to the potential which produces the "breakdown" of transistor 2539. The sequence of operation of the timing circuit is illustrated in FIG. 25A. The vertical line 2560 indicates that instant when the spin switch 1800 transfers its contact to contact 2535, as shown in FIG. 25, which corresponds to switch 1800 leaving depression 1902 and being lifted to the cylindrical surface 1906 of cam 1810. Switch 1800 then remains on the cylindrical surface 1906 for the remaining spin revolution of axis 43. During a short interval of time illustrated by the spacing between lines 2561 and 2562, at the end of the revolution, switch 1800 is on contact 2534 which takes place when roller 1808 is in cam depression 1902. A complete 360° revolution of axis 43 takes place between lines 2560 and 2562. Capacitor 2532 becomes charged to that potential 2569 which produces the "breakdown" of transistor 2539 as shown by line 2563 in FIG. 25A. At the moment charging of capacitor 2532 begins, which is indicated by line 2560 in FIG. 25A, the circuit between points 2525 and 2543 carries only a reference current which biasses the emitter junction of transistor 2539 to a positive potential determined by the voltage across this circuit. As mentioned before, this voltage, in part, is controlled by transducer 93. The state of this circuit, therefore, determines the potential that is impressed on the gate electrode 2545 of diode 2544 and it also determines the potential impressed on the emitter of the PN unijunction transistor 2539 which has to be overcome in order to make the emitter current to flow. When capacitor 2532 is being charged, no current flows through the coil of relay CRT because the potential impressed on the gate electrode 2545 renders rectifier 2544 non-conductive. The charging of capacitor 2532 proceeds until the potential appearing across capacitor 2532, which is impressed on the emitter of transistor 2539, is greater than the internal reference voltage at the emitter junction of transistor 2539 at which time transistor 2539 conducts. Transistor 2539 has negative resistance characteristic, and therefore, when it is made conductive, its resistance immediately is lowered between the emitter and base 1, with the result that capacitor 2532 is discharged through transistor 2539 and resistor 2540, impressing a positive pulse on gate electrode 2545. This positive pulse makes rectifier 2544 conductive and relay CRT becomes energized, which opens the normally closed contacts CRTA in FIG. 21, connected in series with the azimuth motor relay 2006. Relay 2006 becomes de-energized which in turn de-energizes azimuth motor 73. Therefore, azimuth motor 73 remains energized between lines 2560 and 2563 in FIG. 25A, and this is illustrated by a rectangular wave 2564 in FIG. 25A. Azimuth motor 73 then remains de-energized between lines 2563 and 2562, whereupon it becomes energized again.

After the completion of the discharge of capacitor 2532 through transistor 2539 and resistor 2540, relay CRT remains energized until spin switch 1800 is transferred from contact 2535 to contact 2534 which takes place momentarily at the end of one revolution of the spin shaft 43. This interval of time is shown at 2565 in FIG. 25A. Energization of relay CRT is illustrated by a rectangular wave 2566. Transfer of switch 2535 to contact 2534 short-circuits capacitor 2532 to insure the fact that the charging of this capacitor is always started from the point of complete discharge, thus insuring the proper functioning of the timing circuit. Transfer of the spin switch 1800 from contact 2535 to contact 2534 also de-energizes relay CRT which closes contacts CRTA in FIG. 21, but such closing of contacts CRTA does not produce energization of relay 2006 and of the azimuth motor 73 at this time, because the spin switch 1801 is now open, which opens the circuit of azimuth relay 2006, FIG. 21. This will be described more in detail later in connection with the description of FIGS. 20 and 21. Opening of switch 1800 also allows the silicon controlled rectifier 2544 to recover its ability to block forward voltage and stop flow of current through rectifier 2544 and relay CRT.

It is to be noted that capacitor 2532 is being repeatedly charged and discharged between closing and opening of relay CRT, i.e., between lines 2563 and 2561 in FIG. 25A. This is illustrated by the saw-tooth waves 2568. This is due to the fact that transistor 2539 now acts as a relaxation oscillator. However, such repeated charging and discharging of condenser 2532 has no effect on relay CRT because diode 2544 once made conductive, remains conductive until its circuit is open, which takes place when switch 1800 is transferred to contact 2534. Therefore, as illustrated by the rectangular wave 2566, relay CRT remains energized during this interval of time until spin switch 1800 opens this circuit and makes diode 2544 again non-conductive and relay CRT de-energized at line 2561 in FIG. 25A.

In light of the description of the timing circuit and what is illustrated in FIG. 25A, relay CRT becomes energized when capacitor 2532 discharges through transistor 2539 and resistor 2540 and switch 1800 on contact 2535. Relay CRT then remains energized until the spin switch 1800 is open, which de-energizes relay CRT and restores the resistance of diode 2544. The azimuth motor 73 is energized as long as relay CRT is de-energized and therefore, the azimuth motor 73 is energized during that period when capacitor 2531 is being charged through its charging circuit to the emitter voltage at which time the silicon controlled rectifier 2544 is turned on again.

*Reference potential.*—It is also necessary now to describe the role that is played by the reference potential that is introduced at point 2546 of the timing circuit by transistor 2524 and the compensating circuit controlled by transducer 93, which in turn is controlled by the thickness of the ribbon. As the ribbon gets thinner, the potential introduced by transistor 2524 at point 2546 becomes more negative, which in turn reduces the potential between points 2546 and 2526 to the extent determined by the reference potential, with the result that the reference voltage impressed on the base 2 electrode of the PN unijunction transistor 2539, to which capacitor 2532 is charged before the emitter electrode conducts current, is proportionately lower. Therefore, capacitor 2532 reaches a discharging stage in a shorter period of time. This is the interval 2567 in FIG. 25A, which is equal to the azimuth rotation period. This, in turn, means that the azimuth motor is energized for a shorter period of time during one spin revolution of the carcass, and therefore, more rubber is being deposited on the casing because of the decrease in the timer period during which the azimuth motor remains energized. This decreases the pitch of the variable pitch composite spiral wound on the casing. Reverse conditions take place when the ribbon becomes thicker.

Figure 25B:
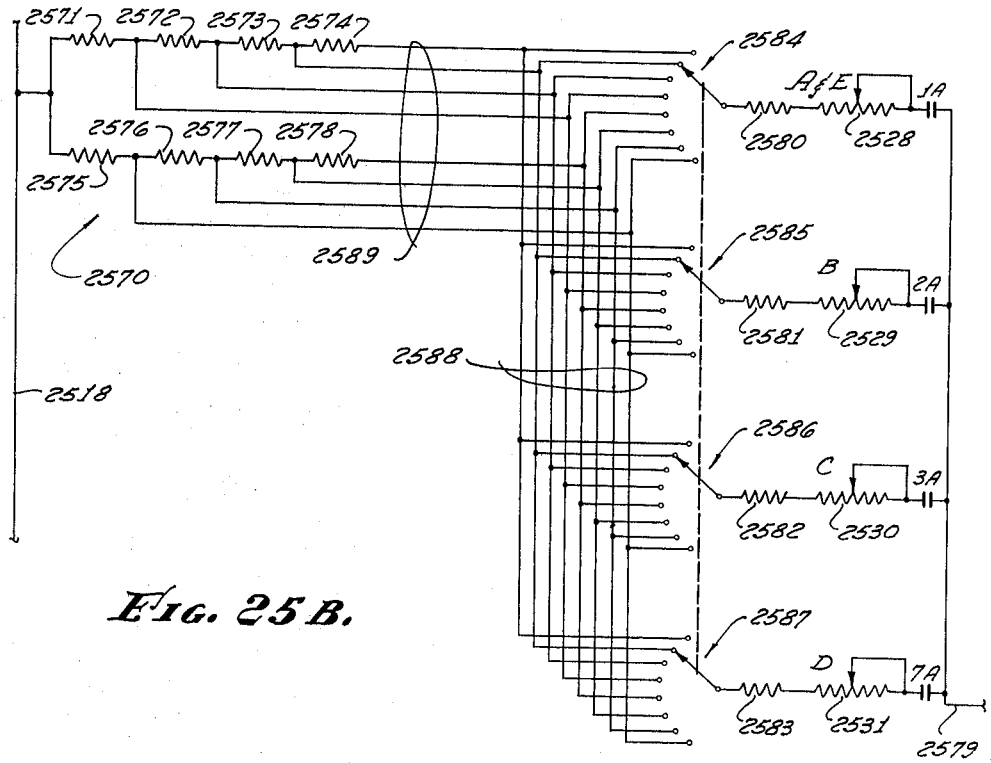
FIG. 25B is an alternative schematic diagram of a resistance network and switches for expanding the range of the timing circuit illustrated in FIG. 25, FIG. 25B fitting into FIG. 25 along two matching lines M—M and N—N shown in FIG. 25.
Figure 25A:
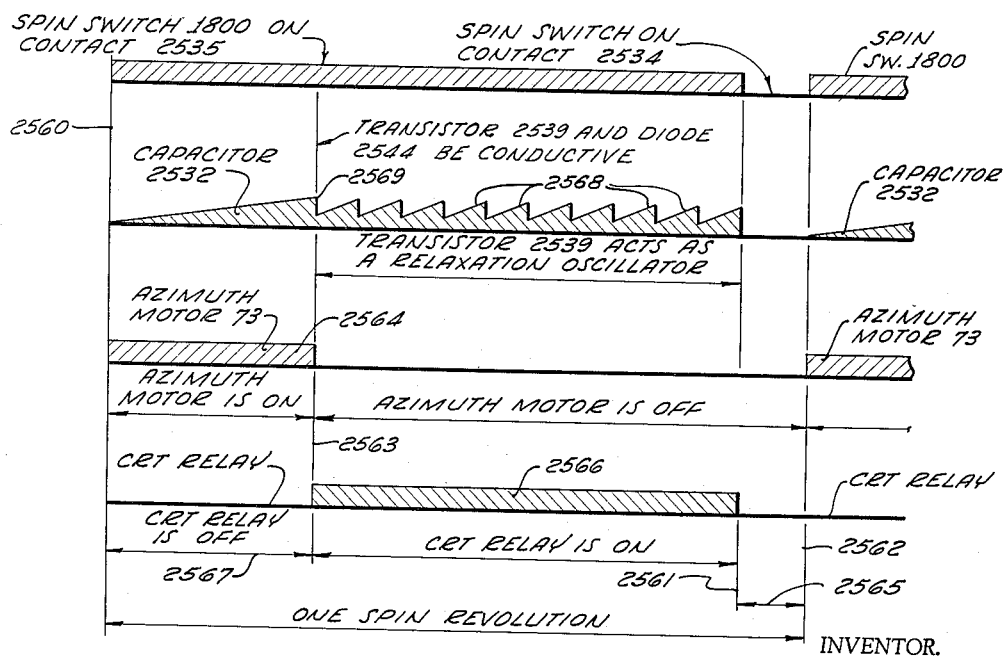
FIG. 25A is an explanatory figure illustrating the wave forms and sequence of operation of the timer and circuits controlled by the timer.

FIG. 25B illustrates a resistance network 2570 which has a plurality of resistors 2571–2578 which can be connected in various combinations in series with potentiometers 2582–2513, which correspond to the similarly numbered potentiometers in FIG. 25. These potentiometers are connected on series with a conductor 2579 on one side and to a buss 2518 on the other side. Also connected in series with this circuit and potentiometers 2528–2531, are fixed resistors 2580–2583 and selector switches 2584–2587. Switches 2584–2587 are used for selecting any desired combination of fixed resistors 2571–2578 connected to the selector switches over conductors 2588 and 2589. The potentiometers 2528–2531 are arranged so that the upper potentiometer 2528 is for sectors A and E of the casing 37, and the last potentiometer 2531 is for sector D. The maximum values of potentiometers 2529, 2530 and 2531 are made so that a maximum of 1° azimuth rotation is obtained with these potentiometers while potentiometer 2528 has a total resistance value so as to produce maximum azimuth rotation in the order of 2°. The fixed resistors 2581–2583 then each has a value to give deflection in the order of 2° for sectors B and D and in the order of 201/2° for sector C, which corresponds to resistor 2582. Resistor 2580 is made so as to give an azimuth rotation in the order of 5°. The network resistors 2571–2578, in combination with the potentiometer resistors and fixed resistors 2580–2583, will then give a resistance value which would produce an azimuth rotation anywhere from 30° to a fraction of 1°, depending upon the setting of the selector switches 2584–2587. By manipulating these selector switches 2584–2587, it is then possible to obtain a large variety of values for the azimuth rotation sectors.

The operation of the network illustrated in FIG. 25B in all other respects, is identical to the operation of the similarly numbered potentiometers 2528–2531 which have been already described in connection with the description of FIG. 25, and therefore, no additional description of the operational cycle is necessary.

The introduction of additional resistances and switches thus extends the range of the timer circuit and enables one to obtain finer adjustments with the potentiometers.

OPERATION OF THE PROGRAMMER

The operation of the programmer illustrated in FIGS. 20, 21 and 25, is as follows:

The manually-operated starting push button 313 is depressed, which energizes relay PR and closes its two contacts PRB and PRA. Closing of contacts PRA energizes busses 2023 and 2009 with the result that the full wave rectifier 2062 becomes also energized and impresses direct current voltage on the stepping switch relay 2007 which at once steps the stepping switch one 10° step from 0° position, or from the home position to the 10° position, both illustrated in FIG. 25B. The circuit of the stepping switch relay 2007 is completed through the self-interrupting contact 2007, conductor 2078, 2068 and the closed contacts 6B and 4C, these contacts 6B and 4C being illustrated in column 1 of FIG. 24B as being closed at 0° position of the stepping switch. The self-interrupting contacts 2077 become open upon energization of relay 2007 and in the course of the stepping operation of the switch from 0° to 10°, contacts 6A, 6B and 4C open and 4A, 4B and 6C close.

When the spin switch 1801 is transferred to contact 2065 at the beginning of the first spin revolution, the azimuth relay 2006 remains de-energized because contacts 1B, 2B, 3B and 7B at this time are all open, and therefore, there is no azimuth rotation. Therefore, the machine winds the first beauty ring, which is always present irrespective of the position of the beauty ring selector switch 2081.

It should be noted here that relay 2007 must be first energized and then de-energized to rotate the stepping switch through a single 10° step. Energization of relay 2007 merely cocks the ratchet stepping arm but does not produce any actual rotation of the cams. De-energization of relay 2007 releases the stepping arm and it then rotates the ratchet and the cams.

Stepping of the stepping switch one 10° step from 0° position to 10° position, according to table 24B, also closes contacts 5C and 6C, and opens contacts 5A, and 5B, 6A and 6B, with the result that the circuit between points 2013, 2017 and 2011 in FIG. 20 becomes energized through normally closed contacts CRD of relay CR, which are also in series with the circuit. This circuit is the relay locking circuit for relay PR, and therefore, this relay becomes locked for the duration of the entire winding cycle of the machine, until 190° position is reached in FIG. 24B, at which time the cam follower of the cam switches #5 and #6 will again slip into the grooves of their respective cams, with the result that contacts 5C and 6C become open, thus unlocking relay PR.

Closing of the circuit of relay PR and closing of its contacts PRA, energizes red light 310, which indicates that power is connected to busses 2023 and 2009. It also energizes the amber and green lights 312 and 311 if the spin switch 1802 and the azimuth switch 402 are in the closed position, as they should be at this time if the operater has placed casing 37 in the proper azimuth and spin start positions.

Energization of buss 2023 energizes the spin motor relay 2005, which closes the circuit of the spin motor with the result that the spin motor begins to rotate. As mentioned earlier, toggle switch 2002 is normally closed, which connects power to extruder relay 2004 and it becomes energized, connecting power to extruder motor 15.

After a hot, smooth ribbon begins to be extruded by extruder 13, the ribbon is threaded through the machine by placing it over roller 31, under dancer roller 32, between rollers 70 and 71 and under spin wheel 59. Immediately after placing the ribbon under the spin wheel 59, the program starting kick switch 314a is kicked into the closed position by the foot of the operator, which at once energizes relay 65. Closing of the kick switch 314a energizes relay CR through spin switch 1803, which is now closed and the azimuth switch 402, which is also closed. Closing of this circuit closes contact CRA and CRB of this relay. Closing of contact CRA completes the self-locking circuit of relay CR, while closing of contacts CRB energizes the solenoid operated valve 65, which admits compressed air to the actuators 62, FIG. 1, and 80, FIG. 9. Piston 62 at once moves the piston arm 66 to the left as viewed in FIG. 1, with the result that arm 58 engages the sidewall of the tire, and thus, simultaneously upon touching the surface of the sidewall, automatically attaches the ribbon to the outer edge of the sidewall and stitches it to this sidewall. Stitcher 53 also engages the stitched ribbon and the sidewall, and therefore, proper stitching of the ribbon to the surface of the tire is established. The operator has a free end of the ribbon in his hand at this time, and this free end is torn off after it has been stitched, and returned to the hopper of extruder 13. In this manner, starting of the winding cycle is established.

Returning once more to the circuit connected between points 2013 and 2017, it should be noted that it also includes switch 2000, which is now closed because the dancer arm 33 now is in a proper raised position, and is held in this raised position by ribbon 38. Therefore, the holding circuit of relay PR is now established through the now closed ribbon switch 2000, and this takes place at the time of threading of ribbon 38 into the machine. Normally closed contacts CRD become open upon energization of relay CR which takes place upon closing of the program starting kick switch 314a. Accordingly, if through some accident, tape 38 is broken, it opens the tape switch 2000, which de-energizes relay PR, and de-energization of this relay opens its contacts PRA and PRB, which de-energizes the entire machine.

Proceeding with the description of the programmer, when the stepping switch is in its 0°, or "home" position illustrated in FIGS. 24A and 24B, only cam switch #4 is in its notch 2422 in FIG. 24A and all of the remaining cams are in the high cam positions. Therefore, all of their contacts are in the position shown in FIG. 24D, with all contacts C closed, and all contacts A and B open. At the same time, switch #4 has its three contacts in the position illustrated in FIG. 24E, and therefore, contacts 4A and 4B are closed and contact 4C is open. Accordingly, contact 4B, which is now closed, completes the circuit through the stepping switch relay 2007, which circuit is as follows: Point 2067 on buss 2068, now closed contact 4B, spin switch 1801, which is now on contact 2066, closed contacts CRC, closed contacts 7C, 3C, 2C, 1C of the cam switches Nos. 7, 3, 2 and 1; conductor 2069, closed switch 2071, conductor 2086, conductor 2087, relay 2007 and conductor 2088, which completes the circuit across rectifier 2062.

It is necessary to digress for a moment at this time and explain more in detail as to why contacts CRC and the spin switch 1801 are connected in series with each other in the above circuit. When casing 37 is manually turned so as to place it in the proper spin position, which is the position when all four spin switches 1800–1803 are closed, such turning of the casing may produce more than one closing and opening of the spin switches, because of back and forth rocking of casing 37 by the operator in the course of its initial turning of the casing into proper spin position. The spin switches, in such case, may produce a number of pulses and to prevent false operation of the stepping switch by the pulse generated in this manner by the spin switch 1801, contacts CRC of relay CR are placed in series with spin switch 1801 and since contacts CRC remain open until relay CR is energized, a false operation of the stepping relay 2007 is prevented. Also, improper operation of the entire programmer is prevented since this circuit will remain open as long as the casing is in a position which is other than the proper spin position.

Immediately after spin wheel 57 engages casing 37, casing 37 begins its spinning, and all four spin switches 1800–1803 are transferred to their second set of contacts. Spin switch 1801 now is on contact 2066, which opens the stepping relay 2007 circuit. The stepping switch is then turned from the 10° position to the 20° position. At this time, the operating circuit is the circuit between points 2067 and 2090. It includes the azimuth relay 2006, the limit switch 2063, contacts 1B, 2B, 3B and 7B, the normally closed contact CRTA of the timer relay CRT in FIG. 25, switch 1801 and contacts 4B. The circuit of the timer relay CRT is closed as long as the timing capacitor 2532 is charging, and therefore, its contacts CRTA are now also closed. At 20° position, contacts 1B, 2B, 3B and 7B are all open and the azimuth relay 2006 remains open and the azimuth motor remains de-energized. Therefore, a beauty ring is wound around the periphery of casing 37 at the beginning of the cycle. The programmer is arranged so that either one, two or three beauty rings can be wound at the beginning of the cycle, the number of the rings actually wound depending upon the setting of the beauty ring selector switch 2081. The three possible positions of this switch are illustrated in FIGS. 23A, 23B and 23C, where it is also indicated that when this switch is in the position illustrated in FIG. 23A, then only one beauty ring is wound, and two beauty rings are wound when it is in the position illustrated in FIG. 23B, and finally, three beauty rings are wound when it is in the position illustrated in FIG. 23C.

*Five circuits for relay 2007.*—The operation of the programmer at this phase is predicated on the fact that the circuit of the stepping relay 2007 may be completed over five parallel circuits.

The first circuit is over conductors 2068 and 2078, contacts 4C, 6B, and self-interrupting contacts 2077.

The second circuit is over contacts 4B, conductor 2092, contacts 5A or 6A, beauty rings switch 2081 and conductors 2080 and 2078.

The third circuit is over contacts 4B, conductors 2092, 2076, switch 2072, conductor 2079, and self-interrupting contacts 2077.

The fourth circuit is over conductor 2092, contacts CRE, azimuth card scanning switch 401, switch 2071 and conductors 2086 and 2087.

The fifth circuit is over contacts 4B, spin switch 1801 on contact 2066, contacts CRC, 7C, 3C, 2C, 1C, switch 2071 and conductors 2086 and 2087.

The functions performed by the above five circuits are as follows:

The first circuit, over conductor 2068, etc., merely steps the stepping switch from its 0°, or "home" position to the 10° position at the very beginning of the cycle.

The second circuit, having the beauty ring switch 2081, determines the number of beauty rings desired, depending on the setting of switch 2081 by the operator.

The third circuit is used for manual resetting of the steeping switch 2007 to its original position in case one wishes to do so because of some unexpected malfunctioning of the machine. By depressing push button 315, switch 2072 closes, switch 2071 opens and therefore, relay 2007 can then be operated only through the reset circuit 2076–2072–2077. After the stepping switch reaches the 130° position, contacts 4B open but contacts 4C and 6B close. The reset circuit becomes automatically disconnected, but the first circuit becomes closed and operates the switch to its final home position corresponding either to 0° or 190° position.

The fourth circuit scans the card and the sector indentations on the card, and in this manner, with the aid of the card, and with the aid of the stepping switch, switches into the timer circuit the desired potentiometer. These potentiometers 2528–2531, in turn, determine the thickness of the deposited layer in the respective sectors A–E, FIGS. 1A, 1B and 1C. Therefore, this circuit may be called the thickness controlling circuit which controls the thickness of the deposited layer.

The fifth circuit, having contacts CRC 7C, 3C, 2C, 1C, etc., counts the number of the spin revolutions being made by casing 37 with the aid of the spin switch 1801, and steps the stepping switch by energizing relay 2007.

*Beauty ring cycle.*—If in the second circuit, switch 2081 is placed into the open circuit position, illustrated in FIG. 23C, then it will require three complete revolutions of casing 37 and wheel 42 to step the stepping switch from the 20° position to the 50° position at the end of the third revolution, i.e., when the spin switches 1800–1803 are all back in the notches 1900–1902. And during all of the above three revolutions and three positions—20°, 30° and 40°—the azimuth motor will remain disconnected because contacts 1B, 2B, 3B and 7B remain open. In the fourth poistion, when the stepping switch is in the 50° position, the cam switches #1 and #4 are both in the low, or notched portions of their respective cams #1 and #4 and therefore, the circuit to the azimuth motor relay becomes closed through contacts 1B. Accordingly, winding of the ribbon on the first sidewall sector A, FIG. 1C, begins with the stepping switch being at the 50° position. It therefore follows that the beauty ring sectors of the stepping switch are the 20°, 30° and 40° sectors.

Proceeding now with a more detailed descrpition of the beauty ring cycles, in order to produce beauty ring No. 1, the programmer should have the azimuth motor always disconnected during the first spin turn. The azimuth motor is disconnected during the first spin turn because the stepping switch is in the 10° position during the first 360° spin of wheel 42, and therefore, only the cam switch No. 4 is in the notch 2422 of its cam #4. Therefore, when switch 1801 is on contact 2066 at the very beginning of the revolution, and contacts CRC close upon depression of the starting kick switch 314a, contacts 1C, 2C, 3C and 7C are all closed, switch 2071 is closed and the stepping relay 2007 is energized simultaneously with the closing of switch 314a. Because of the spin rotation of the casing, the spin switch 1801 is immediately transferred to contact 2065. This opens the fifth circuit, relay 2007 becomes de-energized, and rotates all of the cams to the 20° position. Upon completion of the first 360° spin of wheel 42, the spin switch 1801 again is transferred to contact 2066, at which time relay 2007 is again energized and after the spin switch 1801 leaves contact 2066 because of the spin rotation, it is transferred again to contact 2065, which opens the circuit of relay 2007 and steps the stepping switch from the 20° position to the 30° position. Again, there is no azimuth rotation because the azimuth relay 2006 still remains de-energized because of the open condition of contacts 1B, 2B, 3B and 7B.

If switch 2081 is in the one beauty ring position, which is the position illustrated in FIGS. 21 and 23A, contacts 5A are closed, and contacts 6A are open, with the result that a circuit is now established for the stepping relay 2007 over the now closed contacts 4B, conductor 2092, closed contacts 5A, switch 2081, conductors 2080 and 2078, closed contacts 2077, relay 2007 and conductor 2088 which completes the circuit. This energizes the stepping relay 2007, whereupon the self-interrupting contacts 2077 open and step the stepping switch to the 40° position. At this point, contacts 6A close, which completes again the second circuit for energizing relay 2007 through the beauty ring sector switch 2081, but over contacts 6A rather than contacts 6A, and relay 2007 turns the stepping switch from the 40° position to the 50° position. During all of the above stepping, the azimuth motor relay 2006 remains de-energized because contacts 1B, 2B, 3B and 7B remain open, and therefore, there is no azimuth rotation. Accordingly, if switch 2081 is in the position illustrated in FIGS. 21 and 23A, only one beauty ring is produced, because the stepping switch is stepped very quickly from the 20° position to the 50° position automatically, and upon reaching the 50° position, there is the beginning of that operation of the entire programmer which corresponds to the winding of ribbon 38 in sector A of the casing.

If it is now desired to produce two beauty rings, then the selector switch 2081 is placed into the position illustrated in FIG. 23B, at which time sector 2081 is connected only to contact 6A. Contact 6A remains open when the spin switch is in the 10°, 20° and 30° positions. At the end of the first spin revolution, switch 1801 is on contact 2066 and again returns to contact 2065 at the beginning of the second spin revolution, with the result that the stepping switch steps from the 20° position to the 30° position. At the 30° position, cam 5 closes contacts 5A, but since sector 2081 of the switch is now connected only to contacts 6A, no circuit is established through this switch to the stepping relay 2007, and therefore, the second beauty ring is wound until the completion of the revolution and transfer of the spin switch 1801 again to contact 2066 and then to contact 2065, which again energizes and then de-energizes relay 2007 with the result that the stepping switch is stepped from the 30° position to the 40° position. In this position, contact 6A is closed, and therefore, relay 2007 becomes immediately energized through contact 6A and switch 2081, whereupon the self-interrupting contacts 2077 open the circuit and produce the next step of the stepping switch from 40° to 50°, whereupon the winding of the two beauty rings is completed, and the programmer is in that position which corresponds to the winding of the ribbon on the sidewall sector A.

If beauty ring selector switch 2081 is in the position illustrated in FIG. 23C, it does not make any contacts with the contacts 5A and 6A, and therefore, it becomes necessary for the spin switch 1801 to make three complete excursions from contact 2065 to contact 2066, and back to contact 2065, and this can be accomplished now only by wheel 42 making three complete revolutions, i.e., by winding a three-layer beauty ring.

Thus, the operation of the beauty ring selector switch 2081 is made possible because of the fact that contacts 1C, 2C, 3C and CRC all remain closed during this phase of the operation of the programmer, since cams #1, #2, #3 and #7 have no notches on their cams in these 10° through 40° sectors. Also, there are no indentations on card 500 and moreover, the card scanning switches 401 and 402 are at a standstill because there is no azimuth rotation, and switch 401 remains open. Therefore, the only two parallel circuits that may be operative during the beauty ring winding phase are the second and fifth circuits. Accordingly, the operation of the beauty ring selector switch 2081 is either to bypass or not to bypass first the 30° position and then the 40° position of the cams when no more than one beauty ring is desired. When two beauty rings are desired, then the bypass beauty ring selector switch 2081 is in the position of that in FIG. 23B, and it bypasses only the 40° position, and when it is in the three beauty ring position illustrated in FIG. 23C, it does not bypass the 30° and 40° positions.

In this manner, it is possible to wind either one, two or three layer beauty rings at the beginning of the cycle.

*Operation of programmer in sectors A–E.*—Upon the completion of the beauty ring operation, irrespective of the number of beauty rings wound, the stepping switch is in the 50° position, at which time the cam switches #1 and #4 are in the notched portions of their cams. Therefore, contacts 1C are open and contacts 1A are closed. Contacts 1B are in series with the azimuth relay 2006 and contacts 4B. Therefore, the azimuth relay 2006 is energized over its circuit, and connects the azimuth motor through contacts 1751, FIG. 17, to the source of power 1750. This circuit is controlled directly by the timing circuit of FIG. 25, because of the presence of contacts CRTA which are normally closed when relay CRT is not energized. The operating cycle of relay CRT is shown in FIG. 25A. From the prior description of FIGS. 25 and 25A, it may be remembered that this relay has its contacts CRTA closed when the timing capacitor 2532 is charging. Therefore, the interval of time during which the azimuth motor 73 is energized is controlled directly by capacitor 2532 and the four potentiometers 2528–2531. Since only contacts 1A and 1B are closed at this time, contacts 1A connect potentiometer 2528 to the timer circuit and this potentiometer establishes the maximum azimuth travel illustrated by lines $H_1$, $H_2$, etc., in FIG. 1C. The azimuth rotation, therefore, continues from line 5 to line 6 in FIG. 1C. Contacts 2A, 3A and 7A are now open, and therefore, the B, C, D and E sector potentiometers 2529, 2530 and 2531 are disconnected from the timer circuit by the stepping switch. At the end of each spin revolution, the spin switch 1800, FIG. 25, is transferred from contact 2535 to contact 2534 to short-circuit capacitor 2532. The operation of the machine through sector A, FIG. 1C, continues in the above manner until the card-scanning switch 401, FIGS. 21 and 4, in the fourth circuit, becomes momentarily closed when the card-scanning roller 403, FIG. 4, falls into perforation 508 and then is opened after leaving this perforation. The scanning switch 401 then steps the stepping switch from the 50° position to the 60° position, terminating the winding cycle in sector A. The total duration of this winding cycle through sector A, therefore, is determined by the lateral position of perforation 508 on card 500.

In the 60° position, cams #2 and #4 have notches which close at this time, contacts 2A, 2B, 4A and 4B and open contacts 1A, 1B, 2C and 4C. Therefore, potentiometer 2528 is disconnected and potentiometer 2529 connected in series with the charging circuit of capacitor 2532, thus making the charging interval of capacitor 2532 shorter and the time of energization of the azimuth motor also shorter, causing an increase in the thickness of the deposited layer of elastomer in sector B.

The sequence of operation of the programmer in the succeeding sectors C, D and E, is identical to that in sectors A and B. The card-scanning switch 401 continues scanning the card until all sectors have been scanned. Sector E begins when the scanning switch 401 is lifted from perforation 511 and ends when switch 401 leaves perforation 512. The stepping switch relay continues to be under the exclusive control of the fourth circuit, which includes contact CRE, and the card-scanning switch 401, switch 401 closing the circuit every time it encounters a perforation in the card, and again opening the circuit after it leaves the perforation, thus energizing the stepping switch relay 2007 every time switch 401 traverses the card perforation. During this card-scanning there is also a sequential closing of contacts 1B, 2B, 3B and 7B, and again of contacts 1B at the end of the cycle, with the result that the four potentiometers 2528, 2529, 2530 and 2531, and then again potentiometer 2528, become connected in sequence to the timing circuit in FIG. 25. The same potentiometer 2528 is used for monitoring the azimuth rotation during sector A as well as during sector E, and therefore, the azimuth rotation in sectors A and E is identical.

From the above description, it follows that in FIG. 24B, sector A corresponds to the 50° position; sector B corresponds to the 60° position; sector C to the 70° position; sector D to the 80° position, and sector E to the 90° position. The stepping switch cams which control the programmer during this winding of the ribbon in sectors A through E are cam #1 for sector A; cam #2 for sector B; cam #3 for sector C; cam #7 for sector D; and once more, cam #1 for sector E. During this phase of operation of the programmer, i.e., when the winding progresses from sector A through sector E, the azimuth motor relay 2006 is periodically energized in the manner shown in FIG. 25A through contacts CRTA and contacts 1B, 2B, 3B and 7B, and again 1B, the above enumerated contacts being closed in sequence in the manner described above so as to connect proper resistance potentiometer in the timing circuit.

When the programmer winds the ribbon through all the sectors A–E, the spin switch 1801 and its operation at the end of each spin revolution, has no effect on the stepping switch relay 2007, and therefore, the useful function that this switch performs at this time resides in the fact that it connects the azimuth relay 2006 in series with the fifth circuit at the beginning of each revolution. The circuit that controls the stepping switch at this time is the fourth circuit, including the scanning switch 401, and therefore, the duration of each sector A–E is determined solely by the spacing of the perforations on card 500. Thus, for example, sector E begins when the scanning switch 401 is lifted from perforation 511, and it ends when switch 401 leaves perforation 512 and, as mentioned previously, this corresponds to the 90° position in FIG. 24B. The stepping switch is stepped to the 100° position at the completion of sector E.

In the 100° position, only cam #4 has a notch, which is the long notch 2422. Notch 2422 is as long as the entire ribbon-winding cycle. All the remaining cam followers are on the high portions of their respective cams at 100° position. This means that the control of the stepping switch relay now is again transferred to the first circuit, including contacts CRC, 7C, 3C, 2C and 1C. This circuit is controlled by the spin switch 1801, which produces a single step of the stepping switch for each complete revolution of wheel 42. Therefore, it corresponds exactly to that phase of operation of the programmer which was previously recited in connection with the 10° and 20° positions of the stepping switch, i.e., the programmer completes the remaining portion of that turn which was started at the time of closing spin switch 1801, of the ribbon lying on the casing in a single plane perpendicular to the spin axis which is equivalent to beauty ring No. 1 described previously.

The programmer, therefore, is so arranged that it winds one, or two, or three beauty rings at the beginning as well as at the end of the cycle, the 100° position on the stepping switch corresponding to the first beauty ring; the 110° position corresponding to the second beauty ring, and the 120° position corresponding to the third beauty ring if the beauty ring selector switch 2081 is set for three beauty rings.

It is possible to wind an identical number of beauty ring turns on both sidewalls if the beauty ring selector switch 2081 is allowed to remain in the same position at the beginning as well as the end of the cycle. However, it is also possible to manually change the setting of this switch while the machine is winding B, C and D sectors, and therefore, a different number of turns can be produced at the beginning and at the end of the winding cycle.

Upon the completion of the second beauty ring winding cycle, the stepping switch is shifted to the 130° position, at which time it is only the cam switch #6 that is in notch 2423 of cam #6, all of the remaining cam switches being on the high positions of their respective cams, including switch #4, which now is lifted by cam #4 from its notch 2422 to the high position 2424 of this cam, with the result that contacts 4C now become closed. Contacts 6B also become closed, and therefore, closing of these two sets of contacts, 6B and 4C, closes the first circuit to the stepping switch, which includes conductor 2068, now closed contacts 4C, 6C, conductor 2078, self-interrupting contacts 2077, the stepping relay 2007, and conductor 2088. This is the circuit which produces a continuous and very fast stepping of the stepping switch relay 2007 until this circuit is interrupted. Therefore, the stepping switch at this time, is transferred almost instantaneously from the 130° sector to 140°, 150°, 160°, 170°, 180°, and then 190° sector, at which time the above circuit is interrupted because contacts 5C and 6C become open. It is the opening of contacts 5C that disconnects all power from the entire programmer, with the result that the entire programmer comes to rest. In order to produce the above, it becomes necessary to disconnect from busses 2008 and 2009 the circuit of relay PR, which is connected across these busses between points 2013 and 2011. To disconnect this circuit, contacts 5C as well as contacts 6C must be opened, and they are opened at the end of the winding cycle at the 0° and 190° positions, which are the two identical homing positions. Therefore, the entire winding cycle is terminated and the machine, with its programmer, comes to rest automatically at the end of the winding cycle. The above means that all of the relays become de-energized, including relay 65, which controls the operation of the actuators 62, FIG. 1, and 80, FIG. 9. The compressed air connections to these cylinders become reversed by the three-way valve 65, with the result that the stitcher and the spin wheel arm 58 are returned to its original position indicated by dotted lines in FIG. 1, i.e., the position which swings the spin wheel 59, and stitcher 53 away from casing 37. This means that casing 37 immediately comes to rest. The extruder motor 15 also becomes disconnected because de-energization of relay PR opens contacts PRA, which disconnect power from bus 2023, thus disconnecting the extruder. Therefore, all of the elements of the machine come to rest.

MACHINE FOR MAKING NEW TIRES

FIG. 26 is a perspective view of a machine suitable for depositing a variable thickness layer on a casing 2600 of a new tire in the course of its original manufacture. The casing 2600 is mounted on a collapsible drum 2601 of known construction, which is rotatably mounted on an axle 2604 held by a column 2602. It is rotated around axle 2604 by means of the spin motor 54 as in the earlier figures. In FIGS. 1 and 2, the azimuth motor 73 rotates casing 37 around vertical azimuth axis 36, because casing 37 has the shape of a toroid. In FIG. 26, the casing has the shape of a hollow right cylinder, and therefore, it is necessary to obtain the longitudinal azimuth shift or movement of the casing along, or in the direction of, its spin axis. To obtain such transverse linear "azimuth" shift, drum 2601 and its carriage 2610 are provided with four wheels 2615 and 2616 (only two are visible) which are mounted on two rails 2605 and 2606, which are parallel to axle 2604. Accordingly, drum 2601 and its entire carriage 2610 are shifted along rails 2606 and 2605 by means of a chain 2607. Ends 2608 and 2609 of chain 2607 are connected to carriage 2610. The chain is rotated by a motor 2612 which corresponds to the azimuth motor 73 in FIGS. 1 and 2, and it is this motor that produces the lateral, or transverse "azimuth" movement of drum 2601 and its carriage 2610. Extruder 13 corresponds to the similarly numbered extruder in FIGS. 1 and 2, and ribbon 38, produced by the extruder, is wound on casing 2600 in the same manner is illustrated in FIG. 1A as the drum and its carriage are shifted laterally in the direction of an arrow 2617. Upon the completion of the winding cycle, the azimuth motor 2612 is automatically disconnected in the same manner as described previously, de-energizing additionally, in this case, an electrical clutch 2620, which corresponds in its function to the relay-operated three-way valve 65 and cylinder 80 in FIGS. 1 and 9, whereupon the carriage 2610 is manually returned to its original position. The azmiuth motor 2612 is mounted in a cabinet 2622, and this cabinet includes the programmer identical to that illustrated in FIGS. 20, 21 and 25. As in the earlier figures, a suitably calibrated card 2625, such as those illustrated in FIGS. 5 and 5A, is used for controlling the machine. The card advancing mechanism 2628 is similar to that illustrated in FIGS. 1, 6, 7, 8 and 9. It is connected to a pulley 2624 driven by the azimuth motor 2612 when the azimuth motor is connected by means of the electrical clutch 2620 to the pulley gear drive 2626.

The operation of the machine illustrated in FIG. 26 otherwise is identical to the operation of the machine illustrated in FIGS. 1-25.

The pattern produced in this case is illustrated as a cross-section of the upper portion of casing 2600, drum 2601 and a variable thickness layer 2630 having two beauty rings 2631 and 2632. The two sidewall portions 2633 and 2634 extend beyond the based portions 2635 and 3636 to provide a layer of rubber which generally is wrapped around the beads after the outer portions of drum 2601 are collapsed so as to permit concave rollers to wrap the overhanging rubber layers 2633 and 2634 around their respective beads 2635 and 2636.

Upon completion of this operation, the drum is collapsed completely and the casing is ready for compression molding.

As in FIGS 1A-1C, the casing is subdivided into five sectors A-E, which were described in conjunction with the description of similar sectors at the introductory part of the specification.

In FIG. 26, there is also illustrated a portion of the conveyor 2820 which feeds the elastomer from the chopping machine illustrated in FIGS. 28 through 32 described below. As in the case of FIG. 1, the elastomer can be fed into the extruder as a ribbon 26a from a roll 26 mounted on strand 29. The machine, illustrated in FIGS. 28-32, represents the preferred method in large scale operations, because of very marked economics.

COPPING MACHINE

Referring now to FIGS. 27-31, they illustrate the previously-mentioned chopping machine which is used for feeding the elastomer into the extruder of the ribbon-winding machines of FIGS. 1-26 at the rate called for by the extruder.

In FIGS. 1 and 2, the raw stock is fed into extruder 12 from a spool 26, mounted on pipe 29. When the machines of the type disclosed in FIG. 1, and especially in FIG. 26, work continuously, the rate of extrusion and the speed of winding the ribbon on a casing, and furnishing the elastomer in the most economic manner, become matters of great economic importance. The elastomer then should be supplied in the most effective and cheapest manner possible, even though it may require the use and initial cost of a special machine. FIGS. 27-31 illustrate the most economical method of feeding raw stock into the extruder under the above conditions with the aid of such special machine.

Referring to FIG. 27, a raw stock is fed into the chopping machine directly from a pallet 2713 which supports a slab 2712 of an elastomer. Slab 2712 is produced by a combination of a Banbury mixer with a calendering machine, or a Banbury mixer with an extruder and a die which produce a continuous sheet or slab 2714. Slab 2714 is stacked on pallets 2713 as stacks 2712, which are produced by bending slab 2714 upon itself in a zig-zag manner, such bends beings illustrated at 2715 and 2716. Slab 2714 is fed into a chopping machine 2720 by a stepping conveyor where it is chopped into segments 3010, illustrated in FIGS. 29 and 30. Segments 3010 are then fed into the extruder 2800 by means of a conveyor belt 2801 at a rate which is controlled by the rate of extrusion of ribbon 38 by extruder 2800. Extruder 2800 is provided with a side opening 2802 and a screw 2803 for receiving the chopped-off segments 3010.

Figure 30:
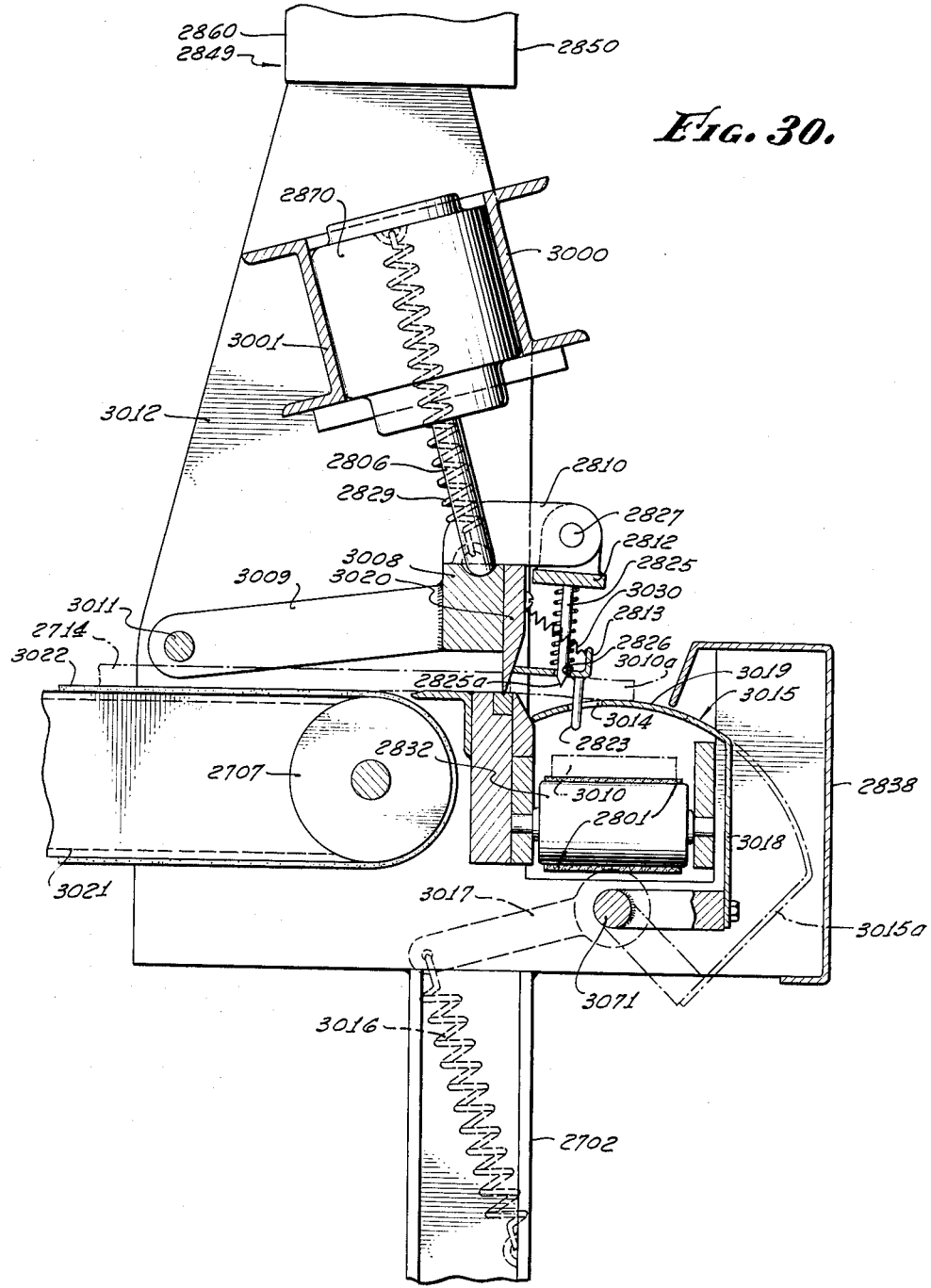
FIG. 30 is a transverse sectional view, taken along line 30—30, FIG. 28, of that portion of the chopping machine which includes a knife, air-operated knife actuators, portions of two conveyors and a rotatable shutter.

Referring now once more to FIG. 27, the chopping machine 2720 includes four legs 2700-2703, which are appropriately braced with braces 2742 and 2743, FIG. 27, and 2744 and 2745, FIG. 28, and U-shaped cross beams 3001 and 3000 welded to the upper portions of the front legs 2701 and 2702 of the machine. Beams 3000 and 3001 are used for supporting four pneumatic actuators 2870, 2871, 2872 and 2873 (such as "Roto-chambers" of Bendix-Westinghouse Automotive Air Brake Company), which are provided with push rods 2806-2809 hingedly connected to a cross bar 3008 supported by means of two pivoted arms 3009. Only one of these arms is visible in FIG. 30. Arm 3009 is pivoted on a frame member 3012 by means of a pivot 3011. The cross bar member 3008 is also provided with a knife 3020 and two brackets 2810 and 2811 which are used for hingedly supporting two cross bars 2812 and 2813. Cross bar 2813 is suspended from cross bar 2812 by means of a plurality of stops bolts 2814-2817 which are provided with coil springs 2818-2821 so that cross bar 2813 can travel up and down with respect to cross bar 2812 when it is subjected to an upwardly acting pressure during the chopping stroke of knife 3020, at which time bar 2813 is pressed against the cut-off segment 3010a of slab 2714 in the manner illustrated in FIG. 30. Cross bar 2813 normally is held against knife 3020 by a plurality of springs, such as spring 3030, which return the cross bars 2813 and 2812 to their normal position shown in FIG. 30 after they are swung away from knife 3020 by the swinging door 3015 in the manner which will be described later. Cross bar 2813 is also provided with pins 2822 and 2823 with their upper ends welded to cross bar 2813. Pins 2822 and 2823 pass through openings 3014 in the swinging door 3015 when the cross bars 2813 and 2812 are in their lowered position illustrated in FIG. 30. Door 3015 is held in the closed position illustrated by solid lines in FIG. 30, by means of a spring 3016 and a lever arm 3017. Door 3015 is pivoted on two pivots, pivot 3071, FIG. 30, on one side and a pivot 2920, FIG. 29, on the other side. The door is provided with a vertical wall 3018 and an arcuate horizontal shelf portion 3019 which receives the cut-off strip 3010a in the manner illustrated by dotted lines in FIG. 30. In FIG. 30, knife 3020 has cut off from slab 2714 a segment 3010a. During the cutting interval, this segment is simultaneously pierced by a plurality of pins 2825. The upper ends of pins 2825 are welded to the cross bar 2812 and the lower ends are provided with sharp ends 2825a which pass through orifices 2826 in cross bar 2813 when knife 3020 and the cross bars 2812 and 2813 are lowered by the actuators 2870-2873. At the same time, fingers 2822 and 2823 pass through the openings 3014 in the swinging door 3015 in the manner illustrated in FIGS. 28 and 30, with the result that when the swinging door 3015 is swung into the intermediate position, which is approximately half-way between the closed position shown by solid lines in FIG. 30, and a wide open position shown by dotted lines in FIG. 30, segment 3010a is torn away from knife 3020 by the combined action of door 3015 and cross bar 2813, if it happens to stick to the adjacent side of knife 3020. This freeing of segment 3010a from knife 3020 is obtained by rotating the cross bars 2812 and 2813 around their pivots 2827 and 2828 with the aid of the swinging door 3015 when door 3015 is rotated to its intermediate position by a tandem actuator 2914-2916. After the actuators 2870-2873 have been de-energized, the knife is lifted and returned to its upper position by means of springs 2829, 2830 and 2831 with the results that segment 3010a is freed of its engagement with cross bar 2813, and after door 3015 is rotated to the wide open position, segment 3010a is then deposited on a conveyor belt 2801. Conveyor belt 2801 is mounted on rollers 2832, 2833, etc., including idler rollers 2834 and 2835 which depress conveyor belt 2801 in the manner indicated in FIG. 28 so as to provide room for a lever arm 2836 which actuates contacts 3104, FIG. 31, and normally closes the circuit of timer motor 2880. If a strip 3010 rests on top of switch lever 2836, it opens contacts 3104, which stops the operation of the machine after it completes its normal operating cycle, i.e., lowering of knife 3020 chopping off segment 3010a, and returning knife 3020 to its lifted position. This will be described more in detail later in connection with the description of the control system, FIGS. 31 and 32.

Conveyor belt 2801 is driven by a motor 2837 which is mounted on leg 2702 of the frame, and is provided with a pulley 2828. The machine is also provided with a cover member 2838 which surrounds the swinging door 3015 in the manner illustrated in FIGS. 28 and 30. The frame of the machine is also provided with two horizontal cross members 2900 and 3021 which are used for supporting a table top 2901 and a conveyor belt 3022 which is advanced periodically by means of a ratchet wheel 2902 mounted on a pivot 2903 and provided with a lock-in pawl 2904 and a ratchet advancing pawl 2905. Pawl 2905 is pivoted on a bracket 2906 and bracket 2906 is pivotally mounted on pivot 2903. Bracket 2906 is connected to a push rod 2907 connected to a piston 2908 mounted in a cylinder 2909 which is used for periodically actuating ratchet 2902 and in this manner, periodically advances sheet 2714 by a distance corresponding to the width of segment 3010a. Door 3015 is connected to two tandem-connected compressed air actuators 2914 and 2916 which are hinged on one side to a bracket 2918 and also hinged to a lever arm 2921 welded to the pivot 2920 of door 3015.

The chopping machine is provided with a control box 2849. The front face 2850 of the box 2849 is used for mounting an indirect light 2851, a power switch 2852 and five manually operated switches S6–S10, which will be described more in detail later in connection with the description of the schematic diagram, FIG. 31.

FIG. 28A illustrates a rotary switch 2852 mounted on a bracket 2874. The switch is provided with a motor 2880 and five rotatable cams 2853–2857, which close and open contacts S1–S5. This rotary switch with its contacts S1–S5 will be described more in detail later with the description of FIG. 31. Motor operated switches of this type are very well known to the prior art.

The back wall of the control box 2849 is illustrated in FIG. 28B. Three solenoid-operated valves 3111, 3112 and 3120 and one solenoid-operated four-way valve 3118 are mounted on the back panel 2860 of the box 2849. These valves are all connected in parallel to a source of compressed air through a pipe 2862.

CHOPPING MACHINE OPERATING CYCLE

The operation of the chopping machine is as follows: Switch 3100 is closed, which energizes light 3131 and busses 3102 and 3101. All manually operated switches, such as S6–S10 are presumed to be in a closed position, since automatic operation of the machine is desired. Switch S10, therefore, is also now in a closed position and strip conveyor motor 2837 becomes energized. With no rubber on the strip conveyor, the lever arm 2836, closes contacts 3104, which energizes timer motor 2880 of the cam switch 2852, which has five cams 2853–2857. The cams open and close their respective contacts S1–S5, FIG. 31, in the sequence illustrated in the table of FIG. 32. When contacts 3104 close, the timer motor 2880 begins to rotate and it continually rotates the five cams 2853–2857 until the motor 2880 is stopped upon the opening of contacts 3104 or S5. After the rotation of the cams is started, which takes place upon closing of contacts 3104, the cams are rotated from position #1 through all the ten positions illustrated in FIG. 32. The timer has a cycle of ten seconds.

The circuit is also provided with manually operated switches S6, S7, S8 and S9, which normally are connected in series with their respective automatically operated contacts S, S2, S3 and S4 of the timer switch. For manual operation, the switches are transferred to contacts 3106, 3107, 3108 and 3109, which shunt the automatic operation contacts S1–S4. Normally, the switches S6, S7, S8 and S9 are in the automatic operation position. Therefore, the machine is controlled by the timer and upon closing of the circuit of the timer motor 2880, by closing contacts 3104, motor 2880 begins to rotate the five cams of the timer switch. According to FIG. 32, timer switch S2 is closed at the beginning of the cycle which means that the tear strip circuit 3110 is energized through contacts S2, and switch S7, both being in the closed position. This means that three-way solenoid valve 3111 is also energized, and door 3015 is placed into the partially open position by means of actuator 2916 connected to valve 3111. This is the position of door 3015 which is normally used for tearing off the new strip of rubber cut off by knife 3020, but at the very beginning of the cycle the positioning of the door in the tear strip position has no practical significance, because there is no rubber strip on top 3019 of door 3015. In position #2, contacts S5 become closed, which means that the circuit of the timer motor 2880 becomes closed and remains closed for the remainder of the cycle. It is to be noted that this circuit remains closed even if contacts 3104 in the parallel circuit become open. This means that the rotary switch always completes the cycle once it has been started by the closing of contacts 3104. Contacts S5 become again open at the end of the cycle when the rotary switch is again in position #1. If, at the end of the cycle, the lever arm 2836 is in the upper position because there is no strip of rubber or conveyor 2801, then contacts 3104 are still closed and the cycle continues as before. The five cams continue to revolve, and according to FIG. 32, the next step corresponds to position #2, in which contacts S1, S2 and S5 are closed. Closing of S1 and S2 energizes the solenoid operated valves 3112 and 3111, admitting compressed air to actuators 2914 and 2916, which open the door fully and if a rubber strip is resting on top 3019 of door 3015 at this moment, then this strip is dropped on conveyor 2801. Conveyor 2801 is now in operation because of closing of circuit 3114 of the strip conveyor motor 2837 upon closing of switch 3100.

Contacts S1 and S2 remain closed during position #2 and are opened during positions #3 through #7. The next step of the timer switch is step No. 3, which produces opening of contacts S1 and S2 and closing of S3 in circuit 3116, and energization of the solenoid operated four-way valve 3118 which connects first the inner end 2909a of cylinder 2909 to compressed air so that rod 2907 moves outwardly and winds the ratchet pawl 2905 around ratchet 2902 until it engages the next tooth, and then it admits air to the opposite end 2909b and vents the first end 2909a which rotates ratchet 2902 and moves conveyor 3022 one step. This advances sheet 2714 under the knife by the amount equal to the width of the strips 3010 and 3010a. Energization of the solenoid operated four-way valve 3118 thus makes piston 2908 travel a full stroke and turn ratchet 2902 one notch, and advance conveyor 3022 one step. At this time, knife 3020 is in the raised position, and therefore, the rubber is advanced under the knife to the extent determined by the revolution of ratchet cam 2902.

The next position is position #4, at which time contacts S4 become closed, which energizes the three-way solenoid operated valve 3120 which admits compressed air to the four cylinders 2870, 2871, 2872 and 2873. These cylinders energize the four pistons connected to the cutting knife 3020, and knife 3020 cuts off a segment 3010a from sheet 2714. The knife remains in closed position through positions #4, #5, #6, #7, #8 and #9 of the rotary switch 2852 to insure the fact that strip 3010a is cut off completely from slab 2714. In position #8, switch S2 becomes closed, which energizes valve 3111 and circuit 3110. Valve 3111 admits compressed air to cylinder 2916 which produces the rotation of door 3015 to its intermediate position. At this time, knife 3020 is in its downward position, and therefore, the sharp ends 2825a of pins 2825, FIG. 30, are imbedded in segment 3010a and pins 2823 and 2822 pass through the orifices 3014 in door 3015. Therefore, when door 2015 travels to its intermediate position, it also swings the two cross-bars 2812 and 2813 around their pivots 2827 and 2828. Therefore, when cross-bar 2813 is rotated in the counter-clockwise direction, as viewed in FIG. 4, the cut-off segment 3010a of rubber is pulled away from knife 3020 and is then held on top 3019 of door 3015 directly above conveyor belt 2801. The cycle operation is completed at position #2 in FIG. 31, when switch S1 is again closed, at which time door 3015 is swung to the wide open position by means of the three-day solenoid operated valves 3112 and actuator 2914, at which time the cut-off strip of rubber drops on conveyor 2801 and is conveyed to the extruder. The above cycle repeats itself continuously as long as contacts 3104, operated by the lever arm 2836, remain in a closed position which corresponds to the upper position of the lever arm 2836 in FIG. 28. Arm 2836 is in the upper position only when there is no rubber strip 3010 resting on top of it. However, if the extruder has been stopped and conveyor 2801 is not able to feed the rubber into the extruder, then the cut-off strip 3010 depresses lever arm 2836 and contacts 3104 become open and motor 2880 of the timer switch 2852 stops the very moment it reaches position #1, at which time locking contacts S5 become also open, and therefore, motor 2880 is de-energized until such time as contacts 3104 are reclosed. The chopping machine then again resumes its operating cycle. In this manner, the rate of chopping of the chopping machine is synchronized, or kept in step, with the operation of the extruder 13 and the entire ribbon-winding machine.

What I claim as new is:

1. A method of winding a ribbon of tread material on a tire casing comprising the steps of spinning said casing around its axis and simultaneously producing intermittent transverse movements between said casing and ribbon, each of said movements being of a controllable amount and of short duration less than a single period of revolution of the casing, and said movements being varied in amount to deposit a variable layer of tread on the casing.

2. A method of depositing a variable thickness layer of an elastomer by winding a ribbon on a tire casing, said method including the steps of attaching the free end of said ribbon to said casing, rotating said casing around its spin axis, subdividing said casing into a plurality of sectors, producing a fixed rate of transverse displacement between said casing and said ribbon during each rotation of said casing about its spin axis for an interval of time which is less than the time required for each complete rotation of said casing, said interval of time being fixed for each sector, and varying said interval of time from sector to sector as a function of the desired thickness of said layer in the respective sectors.

3. The method of depositing an elastomeric layer on a tire casing which includes the step of locally producing an elastomeric ribbon, rotating said casing around its rotational axis to wind said ribbon around the outer surface of said casing, producing a transverse intermittent movement between said casing and said ribbon prior to the winding of said ribbon on said casing, making the duration of said movement a fraction of the time it takes said casing to make a 360° revolution around said rotational axis, automatically increasing said duration to make said layer thinner, automatically decreasing said duration to make said layer thicker, and automatically controlling the increases and decreases in said duration as a function of the desired thickness of said layer.

4. A method of depositing a variable thickness elastomeric layer on a toroidal tire casing by winding an elastomeric ribbon on said casing, said method including the steps of producing said ribbon, winding a continuous spiral from edge to edge of said casing by spinning said casing around a spin axis, controlling the speed of said spinning by continuously making said speed of spinning equal to the speed of producing said ribbon, simultaneously moving said casing in azimuth around a vertical axis passing substantially through a geometric center of the transverse section of the toroid formed by said casing, said vertical axis being also tangent to the circular center line of said toroid, moving said casing in azimuth only during a variable fraction of the period of time required for each complete revolution of said casing around said spin axis, and varying said fraction as a function of the desired thickness of said layer.

References Cited by the Examiner

UNITED STATES PATENTS

| | | | |
|---|---|---|---|
| Re. 25,459 | 3/1963 | Hanson | 156—130 |
| 1,335,879 | 4/1920 | Darrow | 156—130 |
| 1,865,540 | 7/1932 | Reid et al. | 156—421 |
| 2,351,962 | 6/1944 | Harrison | 83—157 |
| 2,358,935 | 9/1944 | Leguillon | 156—408 |
| 2,369,998 | 2/1945 | Bateman | 156—408 |
| 2,394,464 | 2/1946 | McChesney | 156—352 |
| 2,404,449 | 7/1946 | McChesney | 156—367 |
| 2,422,652 | 6/1947 | Bacon | 156—130 |
| 2,555,343 | 6/1951 | Jones | 156—366 |
| 2,565,071 | 8/1951 | Frazier | 156—350 |
| 2,581,933 | 1/1952 | Stevens | 156—421 |
| 2,637,394 | 5/1953 | Fey | 83—157 |
| 2,955,970 | 10/1960 | Rice et al. | 156—244 |
| 2,994,024 | 7/1961 | Vanzo et al. | 156—366 |
| 3,008,862 | 11/1961 | Haine et al. | 156—244 |
| 3,072,834 | 1/1963 | Mottu | 318—162 |
| 3,079,522 | 2/1963 | McGarrell | 318—162 |
| 3,099,780 | 7/1963 | Morgan | 318—162 |
| 3,104,193 | 9/1963 | Hibbert et al. | 156—350 |
| 3,177,918 | 4/1965 | Holman | 156—96 X |

EARL M. BERGERT, *Primary Examiner.*

HAROLD ANSHER, ALEXANDER WYMAN,
*Examiners.*